US010482361B2

(12) United States Patent
Yanson et al.

(10) Patent No.: US 10,482,361 B2
(45) Date of Patent: Nov. 19, 2019

(54) OPTICAL IDENTIFICATION AND CHARACTERIZATION SYSTEM AND TAGS

(71) Applicant: THEWHOLLYSEE.Ltd., Haifa (IL)

(72) Inventors: Dan Yanson, Haifa (IL); Avraham Yoffe, Haifa (IL)

(73) Assignee: THEWHOLLYSEE LTD., Haifa (IL)

( * ) Notice: Subject to any disclaimer, the term of this patent is extended or adjusted under 35 U.S.C. 154(b) by 0 days.

(21) Appl. No.: 15/741,299

(22) PCT Filed: Jul. 4, 2016

(86) PCT No.: PCT/IL2016/050715
§ 371 (c)(1),
(2) Date: Jan. 2, 2018

(87) PCT Pub. No.: WO2017/006314
PCT Pub. Date: Jan. 12, 2017

(65) Prior Publication Data
US 2018/0197052 A1 Jul. 12, 2018

Related U.S. Application Data

(60) Provisional application No. 62/188,681, filed on Jul. 5, 2015.

(51) Int. Cl.
*G06K 19/06* (2006.01)
*G01J 3/28* (2006.01)

(52) U.S. Cl.
CPC ... *G06K 19/06037* (2013.01); *G06K 19/0614* (2013.01); *G06K 19/06028* (2013.01); *G01J 2003/2826* (2013.01)

(58) Field of Classification Search
CPC ...... G01J 2003/2826; G06K 19/06028; G06K 19/06037; G06K 19/0614
USPC ..................................................... 235/462.11
See application file for complete search history.

(56) References Cited

U.S. PATENT DOCUMENTS 3,684,868 A  8/1972  Christie et al.
3,705,294 A * 12/1972  Kuehnle .......... G06K 19/06009
                                                      235/487
4,015,465 A *  4/1977  Scott ..................... G01B 11/18
                                                      116/212

(Continued)

FOREIGN PATENT DOCUMENTS

EP    0771858 A1    5/1997
EP    0961475 A3   12/1999

(Continued)

OTHER PUBLICATIONS

Hien Van Nguyen et al., "Tracking and Identification via Object Reflectance Using a Hyperspectral Video Camera." In book: Machine Vision: Beyond Visible Spectrum. 2011. http://citeseerx.ist.psu.edu/viewdoc/download?doi=10.1.1.467.6950&rep=rep1&type=pdf.

(Continued)

*Primary Examiner* — Seung H Lee
(74) *Attorney, Agent, or Firm* — Mark M. Friedman

(57) ABSTRACT

A system is disclosed capable of automatic and remote identification, tracking, sensing, and characterization of physical entities (objects and subjects) using structural-color tags. Optical encoding is performed in the spectral domain using photonic engineering. Several embodiments are provided for the imaging, tagging and processing aspects of the system.

28 Claims, 19 Drawing Sheets

(56) References Cited

U.S. PATENT DOCUMENTS

| | | |
|---|---|---|
| 4,705,356 A | 11/1987 | Berning et al. |
| 4,780,383 A | 10/1988 | Garrett et al. |
| 5,003,600 A | 3/1991 | Deason et al. |
| 5,059,245 A | 10/1991 | Phillips et al. |
| 5,502,799 A | 3/1996 | Tsuji et al. |
| 5,851,604 A | 12/1998 | Muller-Rees et al. |
| 5,888,444 A | 3/1999 | Dannenhauer et al. |
| 5,923,380 A * | 7/1999 | Yang ............... H04N 5/272 348/586 |
| 6,024,455 A | 2/2000 | O'Neill et al. |
| 6,154,139 A | 11/2000 | Heller |
| 6,157,490 A | 12/2000 | Wheatley et al. |
| 6,249,751 B1 | 6/2001 | Asaba et al. |
| 6,262,830 B1 | 7/2001 | Scalora |
| 6,343,167 B1 | 1/2002 | Scalora et al. |
| 6,345,765 B1 | 2/2002 | Wiklof |
| 6,507,441 B1 | 1/2003 | Eisenberg et al. |
| 6,570,648 B1 | 5/2003 | Müller-Rees et al. |
| 6,578,712 B2 | 6/2003 | Lawandy et al. |
| 6,756,115 B2 | 6/2004 | Fu et al. |
| 6,810,279 B2 | 10/2004 | Mansfield et al. |
| 6,874,639 B2 | 4/2005 | Lawandy |
| 6,922,208 B2 | 7/2005 | Shniberg et al. |
| 6,939,605 B2 | 9/2005 | Frese et al. |
| 6,978,896 B2 | 12/2005 | Budd et al. |
| 7,130,041 B2 | 10/2006 | Bouzid et al. |
| 7,204,419 B2 | 4/2007 | Lizotte et al. |
| 7,204,428 B2 | 4/2007 | Wilson |
| 7,280,204 B2 | 10/2007 | Robinson et al. |
| 7,304,300 B2 | 12/2007 | Partin et al. |
| 7,317,576 B2 | 1/2008 | Nutt et al. |
| 7,341,189 B2 | 3/2008 | Mossberg et al. |
| 7,349,158 B2 | 3/2008 | Moon et al. |
| 7,559,481 B2 | 7/2009 | Treadway et al. |
| 7,599,544 B2 | 10/2009 | Moshe |
| 7,619,823 B2 | 11/2009 | Tao et al. |
| 7,743,642 B2 | 6/2010 | Chiba et al. |
| 7,744,964 B2 | 6/2010 | Phillips et al. |
| 7,874,490 B2 | 1/2011 | Thomas |
| 7,874,495 B2 | 1/2011 | Masalkar |
| 7,920,049 B2 | 4/2011 | Dunlap |
| 7,936,901 B2 | 5/2011 | Jancke |
| 8,031,227 B2 | 10/2011 | Neal et al. |
| 8,113,434 B2 | 2/2012 | Thomas |
| 8,174,694 B2 | 5/2012 | Bodkin |
| 8,233,148 B2 | 7/2012 | Bodkin et al. |
| 8,511,557 B2 | 8/2013 | Learmonth et al. |
| 8,517,274 B2 | 8/2013 | Ciurczak et al. |
| 8,520,074 B2 | 8/2013 | Wang et al. |
| 8,547,504 B2 | 10/2013 | Guo et al. |
| 8,792,098 B2 | 7/2014 | Dewald et al. |
| 8,810,651 B2 | 8/2014 | Calnegru |
| 9,501,670 B2 * | 11/2016 | Learmonth ............ G06K 19/06 |
| 2001/0024512 A1 | 9/2001 | Yoronka et al. |
| 2003/0062422 A1 | 4/2003 | Fateley et al. |
| 2004/0190117 A1 | 9/2004 | Kubaink et al. |
| 2004/0217298 A1 | 11/2004 | Bawendi et al. |
| 2005/0017079 A1 * | 1/2005 | Psaltis ............... B82Y 10/00 235/468 |
| 2005/0087605 A1 * | 4/2005 | Auslander ............ G06K 1/123 235/491 |
| 2005/0224716 A1 | 10/2005 | Armentrout et al. |
| 2006/0000911 A1 | 1/2006 | Stekel |
| 2006/0027662 A1 * | 2/2006 | Baradi ............... G06K 7/12 235/469 |
| 2006/0087735 A1 * | 4/2006 | Nilsen ............... G02B 5/124 359/530 |
| 2006/0180672 A1 * | 8/2006 | Chu ............... G06K 7/1417 235/487 |
| 2007/0023521 A1 | 2/2007 | Wildey et al. |
| 2007/0092699 A1 * | 4/2007 | Luong ............... C08G 18/10 428/172 |
| 2007/0119951 A1 * | 5/2007 | Auslander ........ G06K 19/06046 235/491 |
| 2007/0139775 A1 | 6/2007 | Reich et al. |
| 2008/0116276 A1 * | 5/2008 | Lo .................... G06K 19/06018 235/462.01 |
| 2008/0210476 A1 | 9/2008 | Silverbrook et al. |
| 2008/0290175 A1 * | 11/2008 | Chen ............... G06K 19/16 235/487 |
| 2009/0001164 A1 | 1/2009 | Brock et al. |
| 2009/0032599 A1 | 2/2009 | Rusman et al. |
| 2009/0066513 A1 | 3/2009 | Kondo et al. |
| 2009/0086208 A1 | 4/2009 | Kang et al. |
| 2009/0149925 A1 * | 6/2009 | MacDonald ............ A61F 7/034 607/96 |
| 2009/0200384 A1 | 8/2009 | Masalkar |
| 2009/0295910 A1 | 12/2009 | Mir et al. |
| 2010/0012728 A1 | 1/2010 | Rosset et al. |
| 2010/0079481 A1 | 4/2010 | Zhang et al. |
| 2010/0086235 A1 | 4/2010 | Loughrey et al. |
| 2010/0208951 A1 * | 8/2010 | Williams ............ G06K 9/00604 382/117 |
| 2010/0282856 A1 | 11/2010 | Bulan et al. |
| 2011/0303564 A1 | 12/2011 | Pearson et al. |
| 2011/0303744 A1 | 12/2011 | O'Neill et al. |
| 2012/0040091 A1 | 2/2012 | Grayson et al. |
| 2012/0062697 A1 | 3/2012 | Treado et al. |
| 2012/0067955 A1 | 3/2012 | Rowe |
| 2012/0099199 A1 | 4/2012 | Vasylyev |
| 2012/0127301 A1 | 5/2012 | Imai |
| 2012/0140224 A1 | 6/2012 | Switkes et al. |
| 2012/0211567 A1 * | 8/2012 | Herzig ............... G06K 7/1093 235/488 |
| 2012/0274775 A1 | 11/2012 | Reiffel |
| 2012/0320216 A1 | 12/2012 | Mkrtchyan et al. |
| 2013/0161396 A1 | 6/2013 | Ming et al. |
| 2013/0190192 A1 | 7/2013 | Lowe |
| 2013/0243693 A1 | 9/2013 | Omenetto et al. |
| 2014/0022629 A1 | 1/2014 | Powell |
| 2014/0050352 A1 | 2/2014 | Buehler et al. |
| 2014/0050405 A1 | 2/2014 | Amo et al. |
| 2014/0085622 A1 | 3/2014 | Wong |
| 2014/0268332 A1 | 9/2014 | Guo et al. |
| 2015/0301234 A1 * | 10/2015 | Bin-Nun ............ H04N 1/00201 359/619 |
| 2017/0026633 A1 * | 1/2017 | Riza ............... H04N 5/2254 |

FOREIGN PATENT DOCUMENTS

| | | |
|---|---|---|
| EP | 1403333 A1 | 3/2004 |
| EP | 1625185 A1 | 2/2006 |
| EP | 1798670 A1 | 6/2007 |
| EP | 1880165 A2 | 1/2008 |
| EP | 2287399 A1 | 2/2011 |
| EP | 1972463 B1 | 8/2013 |
| EP | 2667588 A2 | 11/2013 |
| EP | 2711730 A1 | 3/2014 |
| EP | 2749210 A1 | 7/2014 |
| GB | 2373943 A | 10/2002 |
| JP | 2007004439 | 1/2007 |
| WO | 1997021186 A1 | 6/1997 |
| WO | 1999021123 A1 | 4/1999 |
| WO | 2006089247 A2 | 8/2006 |
| WO | 2007035597 A2 | 3/2007 |
| WO | 2008018826 A2 | 2/2008 |
| WO | 2008113962 A1 | 9/2008 |
| WO | 2009018616 A1 | 2/2009 |
| WO | 2012164580 A3 | 3/2013 |
| WO | 2014037941 A1 | 3/2014 |
| WO | 2014044158 A1 | 3/2014 |
| WO | 2014207742 A2 | 12/2014 |

OTHER PUBLICATIONS

M. R. Ackermann. "A brief examination of optical tagging technologies," Sandia National Laboratories, Albuquerque. New Mexico 2003. https://pdfs.semanticscholar.org/d90a/e1fb7b8506cc316e92f354841672852c2d8f.pdf.

* cited by examiner

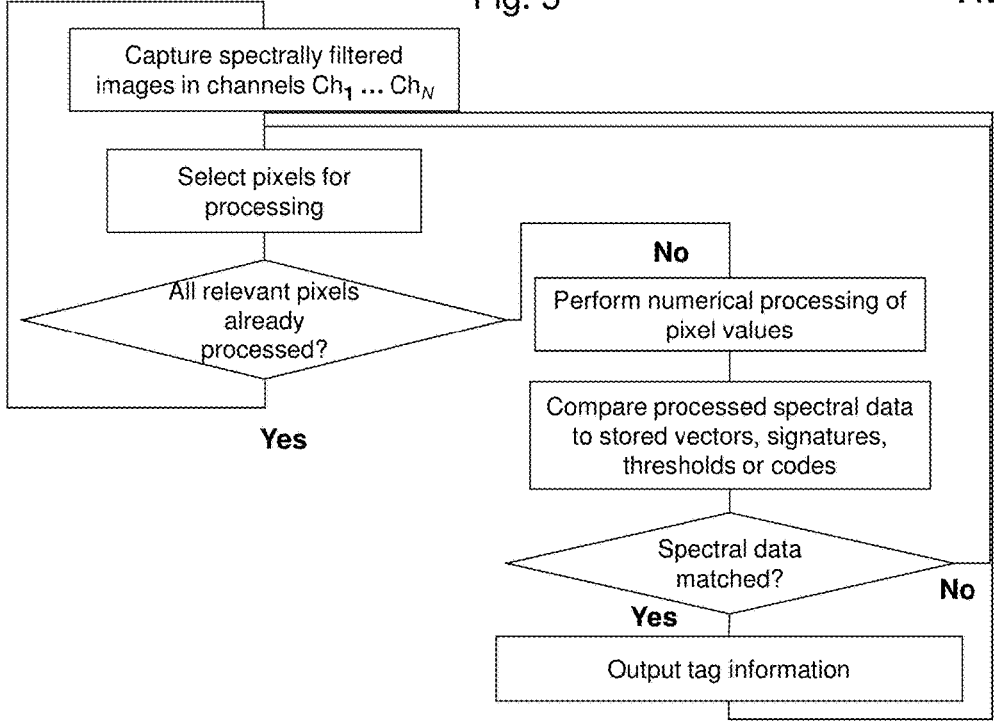
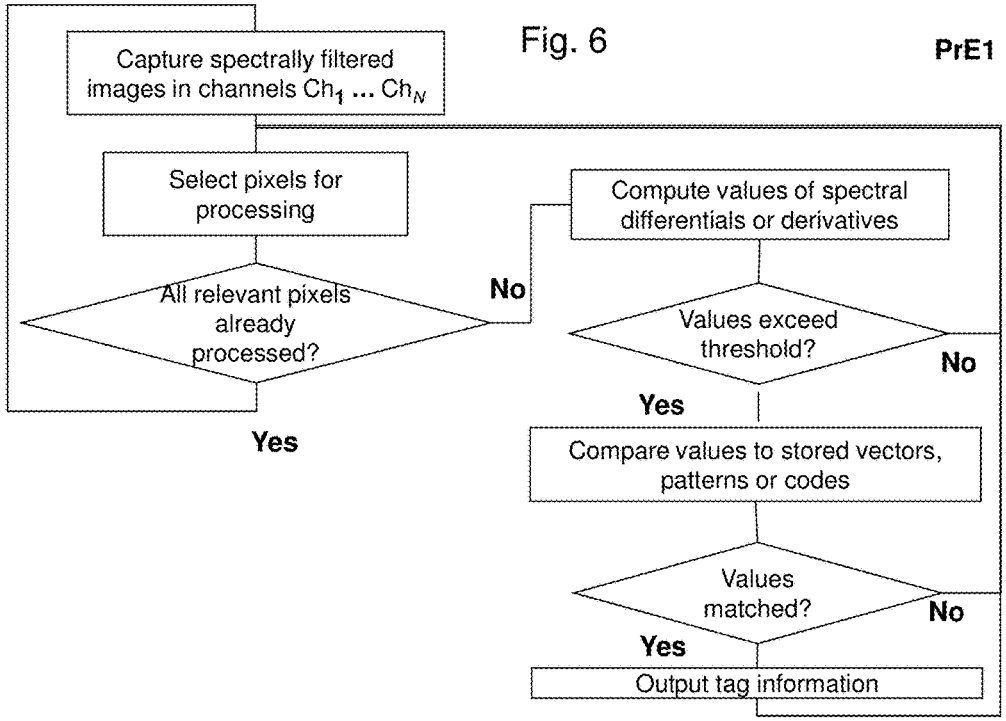

— Tag pixel
----- Background pixels

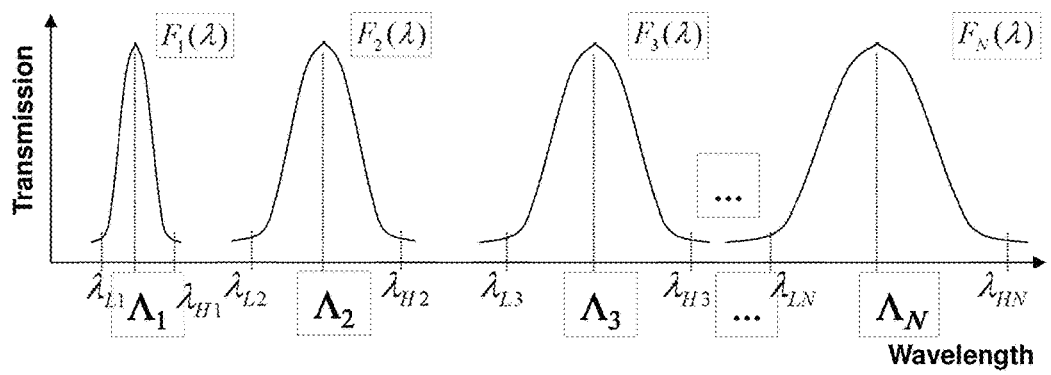
Fig. 9
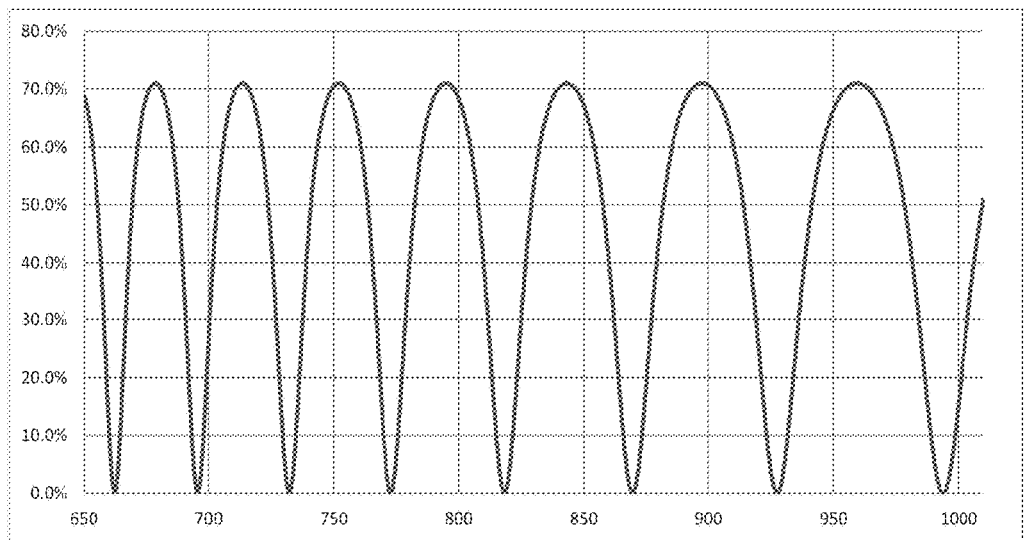
Fig. 10
(a)
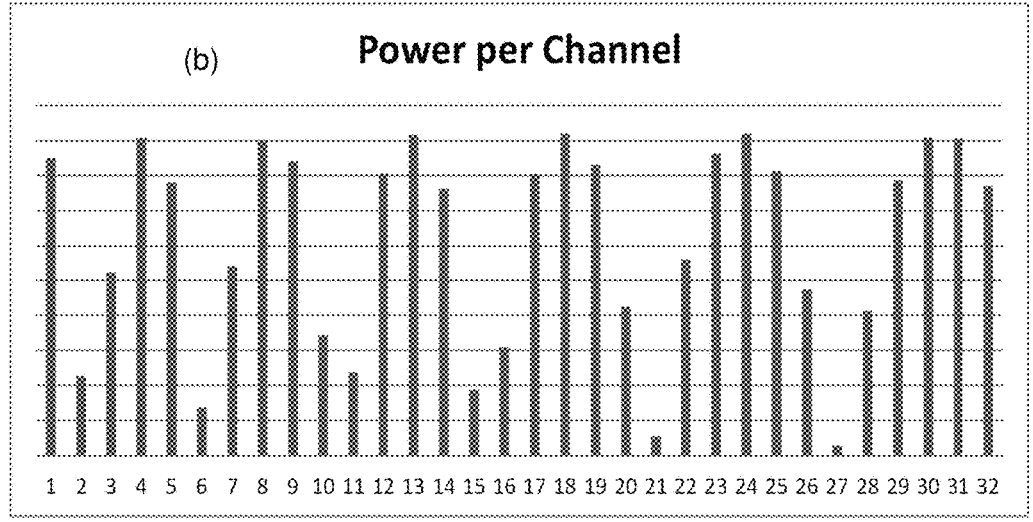
(b) Power per Channel

Fig. 11 ImE2
(a) 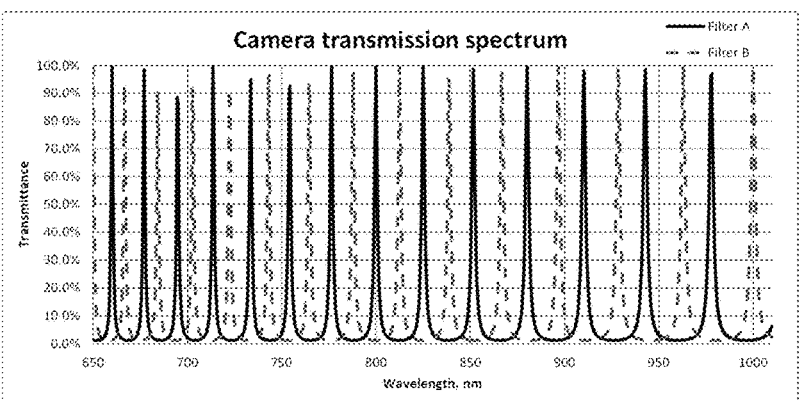
(b) 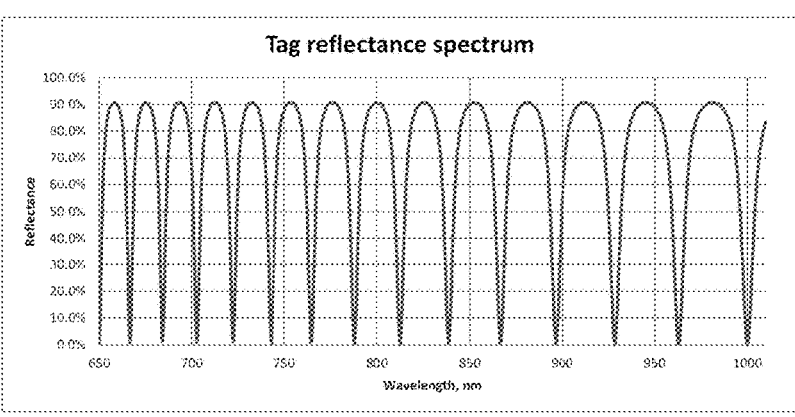
(c) 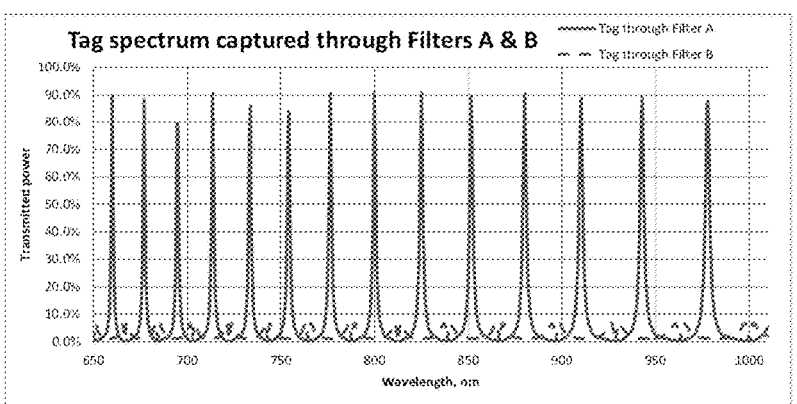
(d) 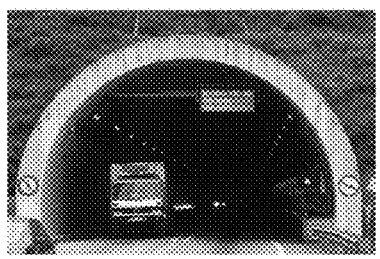
(e) 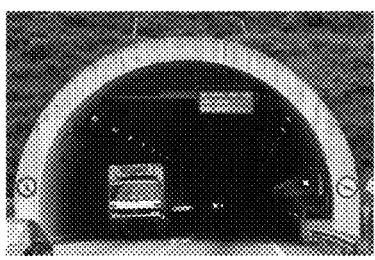
(f) 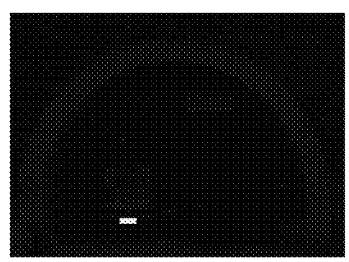

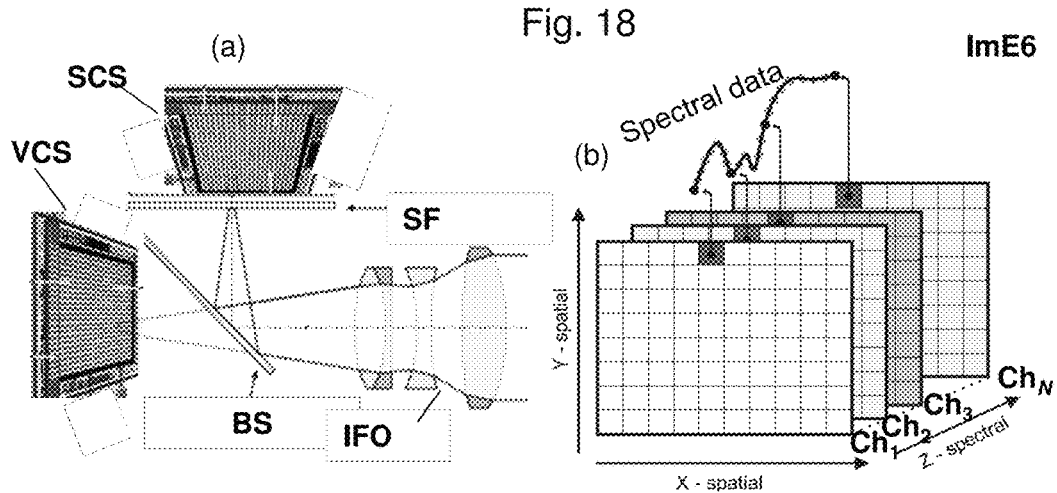
Fig. 18
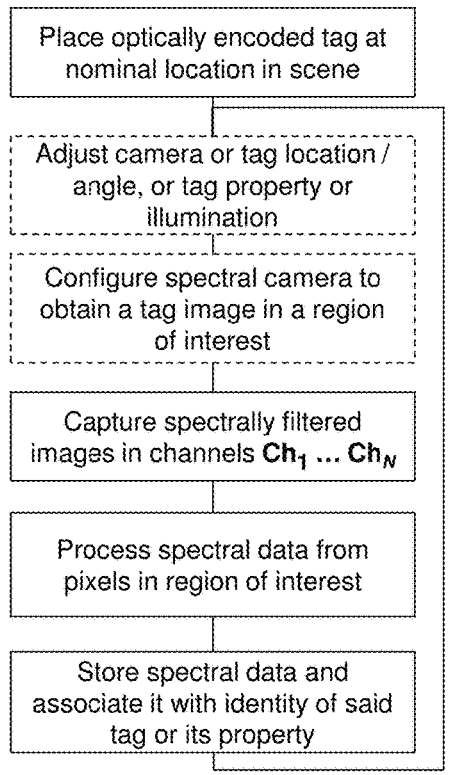
Fig. 19 PrE6

Prior art, US 5,059,245

*J. Heat Transfer* 127(6), pp. 588-597, 2005, doi:10.1115/1.1915388

Prior art, US 6,756,115          TgE8
(a)                     (b)

Prior art          TgE9
(a)                     (b)

Tan, S. J. (2014). Plasmonic Color Palettes for Photorealistic Printing with Aluminum Nanostructures. *Nano Letters, 14*(7), 4023–4029.

(a) Sports broadcast  (b) Clickable video (hypervideo)
(c) Searchable video  (d) Body movement / gesture recognition

OPTICAL IDENTIFICATION AND CHARACTERIZATION SYSTEM AND TAGS

FIELD & BACKGROUND OF THE INVENTION

Field

The Invention relates to the automatic identification, tracking and/or characterization of macroscopic entities by means of spectral imaging and optically encoded tags, markers or labels worn by, painted over or attached to the entities. The entities may include subjects such as human beings and animals, items such as bags and packages, manufacturing or catalogue parts, road vehicles, traffic signs, or any other macroscopic objects, which makes the invention suited to a broad range of applications.

The invention is applicable to fields such as: object identification and tracking, logistics, warehousing, supply chain management, Internet of Things, personnel identification in hospitals, cleanrooms, production facilities, attendee tracking & profiling at conferences, trade shows and events, surveillance, defense & security (friend or foe ID, airport passenger tracking & security, access control), manufacturing, assembly, construction (alignment, position & orientation control), remote sensing, social networks (automatic person tagging on Facebook), advertising & promotion, disabled access & safety (audio warnings for the blind), automotive (assisted driving, traffic & law enforcement), virtual/augmented reality (3D filming, reconstruction & depth perception), clickable hypervideo, digital rights management, and more.

It can be seen from the above examples that the Invention can benefit a great many aspects of the physical environment where machines need to remotely interpret and analyze entities that surround them by means of a computer vision and object tagging system. Ultimately, the Invention has the potential to create a self-describing world that will be intelligible to computers enabling them to respond to various events and situations, thereby unlocking innumerable computer and machine vision applications in many environments such as buildings (airports, train and bus stations, offices, hospitals, prisons, police stations, conferences, exhibitions), urban settings (traffic, parking, congestion charging), operations centers (mail sorting, logistics, transport hubs), manufacturing (factories, cleanrooms, assembly floors, construction sites), and military (secure facilities, army bases, theaters of operations).

Background

In a plethora of applications, intelligent computer systems require information about the physical environment that they interact with. Such information often needs to contain the identities and properties of various entities of interest at or around a particular location. Of all sensor data that can feed inputs into a computer system, computer vision (and its special case, machine vision) often provides the highest information value, as it can describe objects and subjects in reference to their surroundings observed in a direct, line-of-sight fashion.

Many applications from face recognition to CCTV monitoring rely on automatic image classification and pattern recognition. A significant improvement in the recognition reliability and accuracy can be achieved by placing tags on entities of interest. Optical tags can be provided as, e.g., barcodes, QR codes or other features with data storage capacity. Passive optical tags are typically encoded in the spatial domain, as in ubiquitous bar codes and QR codes. However, it requires that the spatial code be either in direct proximity to the scanner, or well-focused and accurately positioned in front of a camera.

None of the available solutions provide an encodable optical identification solution for macroscopic physical entities (objects and subjects) that can be reliably and accurately decoded by an imaging solution as a low-cost, real-time, video-rate system under relaxed acquisition conditions such as arbitrary distance and observation angle.

SUMMARY OF THE INVENTION

Teachings of the present Invention can overcome the above limitations by providing both a spectral imaging solution and an encodable optical identification solution that (a) are spectrally matched to each other, i.e., the imaging solution is highly selective to the tagging solution and uniquely identifies it against the background or other materials, and (b) the tagging solution uses photonic and structural colors, rather than natural or chemical pigment ones, to engineer unique spectral signatures allowing ample information to be encoded through a photonic spectral coding scheme.

Here, structural coloration refers to purpose-engineered photonic materials and metamaterials whose optical spectral properties (collectively referred to as "color", even though they may include invisible wavelengths) are defined by their structural parameters such as the size, fill factor, and periodicity of nanoscale layers, features, patterns and arrays thereof. Structural coloration is found in nature, with the example of the reflection spectrum of pigeon neck feathers shown in FIG. 2($a$) [1], while FIG. 2($b$) demonstrates the same effect using man-made material structures [2]. Both FIGS. 2($a$) and ($b$) serve to illustrate the significant spectral shift, or color travel, caused by a variable angle of observation (gonio-dependence). Other techniques of imparting structural coloration (here, colors may extend beyond the visible spectrum) include nanostructure-patterned surfaces as reported in [3].

The Invention teaches how to provide information encoding in the spectral, rather than spatial, domain by use of structural coloration and information decoding by a remote imaging system. Structural colors arise from specific light-matter interaction mechanisms such as interference, diffraction, refraction, iridescence, photonic crystal phenomena, photonic bandgap phenomena, and plasmonic phenomena, and are different by nature from commonplace pigment colors that are defined by selective absorption of light in materials. Pigment colors require different chemical recipes and are therefore limited to established material compositions; by contrast, structural colors can be photonic-engineered and allow substantially greater freedom in generating unique spectra by structural design within a common material system and manufacturing technology. A further advantage is that high-contrast, sharp spectral features can be generated by structural coloration, which are typically absent from the spectra of most background materials.

For the implementation of spectral tagging for remote macroscopic entities, the Invention makes non-obvious adaptations of various elements of the art that have been developed or proposed for use in unrelated applications or different fields. For example, silk particles as proposed for use in cosmetics and medical applications by US Pat. App. 20130243693; optically variable paints and dyes for color shift effects and iridescence as per U.S. Pat. No. 5,059,245 and thin films as per U.S. Pat. No. 4,705,356; photonic crystals for visual effects as per U.S. Pat. No. 6,939,605; quasi-periodic filters for detection of substances as per U.S. Pat. Nos. 5,059,026 and 5,218,422; complementary comb filters for night vision as per U.S. Pat. No. 6,885,504; retro-reflecting beads for decorative articles as per U.S. Pat. Nos. 6,060,157 and 6,978,896; plasmonic nanostructures for a display device as in U.S. Pat. No. 8,547,504 and for pigment-free structural colors as reported in US Pat. App. 20140268332 and [4], [5], [6]; high-contrast metastructures for tunable coloration [7].

Other aspects of the Invention also make alternative and more advantageous implementations of earlier disclosures in the art such as multi-wavelength active imaging, which was originally proposed for use in pseudo-color covert night vision as per U.S. Pat. No. 8,810,651; plasmonic tagging as per US Pat. App. 20130190192; automatic tagging of individuals on social networks like Facebook as per US Pat. App. 2014086457.

In some embodiments of the Invention, spectral tags with a high gonio-dependence are used to provide angular and volumetric imaging. In the prior art, spectrally-resolved 3-dimensional imaging by means of spectrocolorimetry is disclosed in U.S. Pat. No. 5,502,799, or by means of time-in-flight LIDAR at different wavelengths in US Pat. App. 20140085622. A technique of gonio-spectral imaging to record the reflectance spectra, gloss and texture of 3D objects is taught in U.S. Pat. No. 6,249,751. Plenoptic and light-field cameras are also used for 3D and multi-focus imaging as in U.S. Pat. No. 8,400,555.

In another embodiment of the Invention, spectral tags with a temperature dependence are used to provide stand-off temperature sensing of tagged objects, which is advantageous over high-cost thermal imagers that are conventionally deployed in this application.

Certain implementations of the Invention, through its aspects and embodiments, allow transformation of entity recognition and characterization from a spatial image (such as a QR/barcode, or any form of spatial pattern matching) into an optical spectral code. Through photonic engineering of the disclosed tagging media, tailor-made spectral signatures, or codes, can be realized by structural design alone without the limitations of conventional formula-dependent colorants, pigments or dyes. Moreover, the unique, high-contrast features in the spectral signatures achievable by structural coloration, afford straightforward differentiation of the tagging media from all common background materials. The Intention teaches specific types of structural coloration that can provide the spectral properties necessary for such differentiation.

To analyze image data, in lieu of spatial image processing, certain aspects of the Invention make use of imaging spectroscopy, where the imaged scene need not be in focus and as little as one areal pixel suffices to identify and decode a spectral code. At the same time, some of the disclosed spectral decoding methods are different from conventional hyperspectral data processing, where large swathes of land or material are classified by their spectral appearance.

Furthermore, by functionalizing tagging media designs to respond to environmental parameters, a static identity code can be traded for a dynamic property code that carries information on angle, strain, humidity, temperature, gas or chemical substance concentration, paving the way for passive and low-cost sensors for a myriad of applications.

Specifically, the invention in its various aspects typically offers one or more of the following advantages over incumbent object identification, tracking, and characterization technologies:

The imaging and tagging system disclosed is able to remotely and automatically recognize, identify and track tagged subjects and objects whenever and wherever they appear within its field of view, over a large distance range and without human intervention, which is in contrast to the prior art where either operator control is required to locate, position and scan an optical tag, barcode or other information carrier, or such scanning can only take place automatically under very restricted conditions (such as distance, location, and orientation);

No requirement that a tagged object or subject be well focused on the camera sensor to be identified allowing for relaxed image acquisition conditions and substantially focus-free operation;

Information is encoded within the surface (optical) properties of the disclosed structural-color tags, hence such information can be decoded from a single areal pixel of a spectral image;

Real-time image-processing is possible with low computing power thanks to an efficient thresholding algorithm, in contrast to conventional hyperspectral analysis techniques and computation-intensive image pattern recognition algorithms employed to identify objects or subjects;

The optical tagging disclosed allows simultaneous knowledge of the identity and location of a tagged object or subject, as opposed to wireless beacons which suffer from significant location ambiguity, or RFID technology which severely restricts the distance over which a tag can be read;

The structural-color tags disclosed in some aspects of the Invention can be provided in a variety of convenient formats such as stickers, tapes and paints for easy application, and are robust, lightweight, low cost and fully passive requiring no power supply or servicing;

Structural-color tags need not have a specific shape;

The structural-color tags offer high encoded data capacity per pixel of a spectral image, with hundreds of unique encodable symbols per pixel;

Photonic spectral encoding offers high security and can only be interpreted using specialized instruments, and is hard to reproduce or clone without high-end manufacturing facilities;

Structural-color tags use photonic taggants with purpose-engineered spectral signatures, which both afford better detectability and allow a significantly greater coding capacity than most prior-art tag solutions relying on chemical pigments (non-structural coloration) to provide spectral signatures;

For identification applications, structural-color tags are offered in an embodiment as gonio-independent identifiers where spectral signatures undergo little or no drift within a range of angular observation conditions, as opposed to many prior-art implementations where encoded spectral signatures are angle-dependent;

For rotational encoding, profilometry and angular measurement applications, structural-color tags are offered in an embodiment with a very strong gonio-dependence allowing high angular resolution to be achieved;

The structural-color tags disclosed in some embodiments of the invention can provide angular, orientation and/or positional information about tagged objects or surfaces, allowing remote surface profiling, 3D scanning and volumetric imaging.

For remote sensing, structural-color tags are offered with a dependence of their spectral signatures on strain, deformation, temperature, humidity, elapsed time, gas and chemical substance concentration, allowing non-contact and wireless measurement;

Structural-color tags can only be decoded or identified by a spectral camera with suitably engineered spectral properties. By engineering the properties of the tags and the camera to complement each other, one can build a two-component high-security system where the camera can only read specific tags and specific tags can only be decoded by a specific camera.

Certain preferred embodiments of the Invention make use of low-cost silicon CMOS or CCD image sensors with additional filters operated in the visible and near-IR spectra, as opposed to high-end, high-cost HgCdTe, MCT, Ge, InGaAs, InSb, InAsSb focal plane arrays employed for imaging in the mid- and far-infrared;

Certain embodiments of the invention teach a system for an automatic line-of-sight identification and/or characterization of remote macroscopic entities and their properties by means of structural-color tags worn by, painted over or attached to the entities. The entities may include subjects such as human beings and animals, items such as bags and packages, manufacturing or catalogue parts, road vehicles, signs, or any other macroscopic objects, which makes the invention suited to a broad range of applications. The structural-color tags are defined by photonic taggants with spectral signatures engineered by structural coloration using Fabry-Perot, interference, diffraction and plasmonic effects. The tags encode information through their spectral properties, and are identified and interpreted using a spectral camera. Spectrally matched active illumination is also provided to identify and distinguish the tags from the background. Tags with a gonio-dependent spectral signature can be used to remotely reconstruct the profile of a surface or orientation of an entity. The invention can thus provide stand-off object characterization and tracking based on the associated tag or tags including the identity, location, orientation, speed, temperature, strain, deformation, humidity, elapsed time, gas and chemical substance concentration, shape and surface profile.

NOMENCLATURE

The following part numbers, abbreviations and nomenclature are used throughout the drawings and description:

| Abbreviation | Meaning |
| --- | --- |
| AI | Active Illuminator |
| BI | Binder or epoxy |
| BS | Beam Splitter/dichroic mirror |
| CCD | Charge-coupled device |
| CCTV | Closed Circuit Television |
| Ch$_1$, Ch$_2$ . . . Ch$_N$ | Spectral channels #1 . . . N |
| CMOS | Complementary metal-oxide-semiconductor |
| CPU | Central Processing Unit |
| CTE | Coefficient of Thermal Expansion |
| FC | Frequency Comb |
| FL1,2,3 . . . | Photonic taggant Flakes #1, 2, 3 . . . |
| FoV | Field of View |
| FSR | Free Spectral Range |
| GA | Groove Array |
| HSI | Hyper-Spectral Imaging |
| IFO | Image-Forming Optics |
| ImE1,2,3.. | Imaging Embodiment #1, 2, 3 . . . |
| LA | Lens Array |
| LED | Light-Emitting Diode |
| LIDAR | Light Detection and Ranging |
| NA | Numerical Aperture |

-continued

| Abbreviation | Meaning |
| --- | --- |
| Oa, Ob, Oc | Objects a, b, c |
| OLED | Organic Light-Emitting Diode |
| PET | Polyethylene Terephthalate |
| PhC | Photonic Crystal |
| PrE1,2,3 | Processing Embodiment #1, 2, 3 . . . |
| PS1,2 | Prismatic Surface #1,2 |
| PT1,2,3 . . . | Photonic Taggant #1,2,3 . . . |
| PU | Processing Unit |
| PVD | Physical Vacuum Deposition |
| RB | Reflective Bead |
| RC | Reflective coating |
| RGB | Red, Green, Blue |
| RL | Reflecting Layer |
| SCS | Spectral Camera Sensor |
| SF | Spectral filter(s) |
| SL | Sensing Layer |
| SRF | Spectral Rangefinder |
| SSR | Specific Spectral Range |
| SUB | Substrate |
| T1, T2, T3 | Structural-color tag 1, 2, 3 |
| Ta, Tb | Structural-color tags associated with objects a, b |
| TgE1,2,3 | Tagging Embodiment #1, 2, 3 . . . |
| TL1,2 | Transparent layer #1, 2 |
| TLC | Thermochromic Liquid Crystals |
| VCS | Visible Camera Sensor |
| VCSEL | Vertical-cavity surface-emitting laser |
| VLC | Visible Light Camera |

The term "tag" as used herein in the description and claims refers to an object, or a region of an object that has properties allowing it to perform as a tagging element according to an aspect of the teachings of the present invention. This may be a stand-alone structure, a sticker, tape, powder, fabric or other element applied to a surface of an object, or may be provided by processing or applying a material to a surface of an object, such as by application of a paint, which imparts the required properties to the surface.

The terms "color" or "structural color" denote spectral properties of an object or surface and may include wavelengths in the infrared region. The use of such terms is borrowed from visible light terminology, although clearly no "color" is visible at infrared wavelengths

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings.

The drawings below are provided to convey the concept and various embodiments of the Invention and principles of operation thereof but are not drawn to scale due to a large difference in the dimensions of the components involved (from meters to nanometers).

FIG. 5 describes the operation of embodiment PrE1 of a processing aspect of the Invention disclosing the image acquisition and processing steps to identify and characterize structural-color tags that may be present in the imaged scene.

FIG. 6 details an alternative implementation of processing embodiment PrE1 to enable an optimized and improved processing aspect of the Invention.

FIG. 9 further details the same imaging embodiment (ImE1) of an implementation of the Invention wherein the spectral camera acquires images through a series of discrete, narrow spectral bands defined by narrowband spectral filters.

FIG. 10 illustrates the operation of the same imaging embodiment ImE1 of an implementation of the Invention wherein a structural-color tag with a Fabry-Perot spectral signature (a) is imaged through the discrete spectral channels of a spectral camera to produce a sampled spectrum (b).

FIG. 11 details another imaging embodiment ImE2 of an implementation of the Invention wherein the spectral camera contains at least one pair of complementary spectral filters with transmission spectra as in graph (a), which, when used to image a specific structural-color tag with a spectral signature as in graph (b), will produce a spectral response as in graph (c). This is further illustrated by image (d) containing the structural-color tag on a truck's number plate and recorded through the first filter, image (e) recorded through the second filter, and a differential image (f) obtained by subtracting image (e) from image (d).

FIG. 18($a$) presents imaging aspect embodiment ImE6 of the Invention in a cross-sectional view, wherein a spectral camera is used alongside a conventional visible light camera to image substantially the same scene. ($b$) provides a graphic representation of a plurality of spectral images recorded by a spectral camera in a plurality of channels to form a data set for spectral analysis; ($c$) represents the same method for a visible light RGB color camera. A combination of methods ($b$) and ($c$) serve to illustrate the multi-spectral imaging capability using a combination of data sets ($b$)+($c$), which is referenced as processing embodiment PrE5 of the Invention for complementing imaging embodiment ImE6.

FIG. 19 lists the steps of a method, referenced as processing embodiment PrE6 of the Invention, to train an imaging aspect of the Invention to recognize a structural-color tag by using a spectral camera to image said tag under various conditions and recording the observed spectral data.

In FIG. 34(c), the baggage labels contain structural-color tags associated with flight numbers allowing automatic tracking and verification of baggage. In (d), an illustration of a possible deployment of the Invention in a warehouse or distribution center is provided. (e) exemplifies the remote identification and vetting of security personnel by worn tags.

DETAILED DESCRIPTION

Various aspects of the Invention encompass a system comprising three complementary aspects, namely, a tagging aspect, an imaging aspect, and a processing aspect. The tagging aspect is provided by one or more optically coded tags (markers or labels) T1, T2, . . . defined by photonic taggants PT1, PT2, . . . placed on an object or subject; the imaging aspect is provided by a spectral camera SC for imaging a scene possibly containing an object or subject marked with tags T1, T2, . . . ; and the processing aspect is a method performed by a processing unit PU for the decoding and analysis of said tags and, by association, of the tagged object or subject.

The addition of further components, such as active illuminator AI, subject-selective spectral range-finder SRF, visible light camera VLC, allows the system to be tailored to specific applications and operation requirements.

Figure 3:
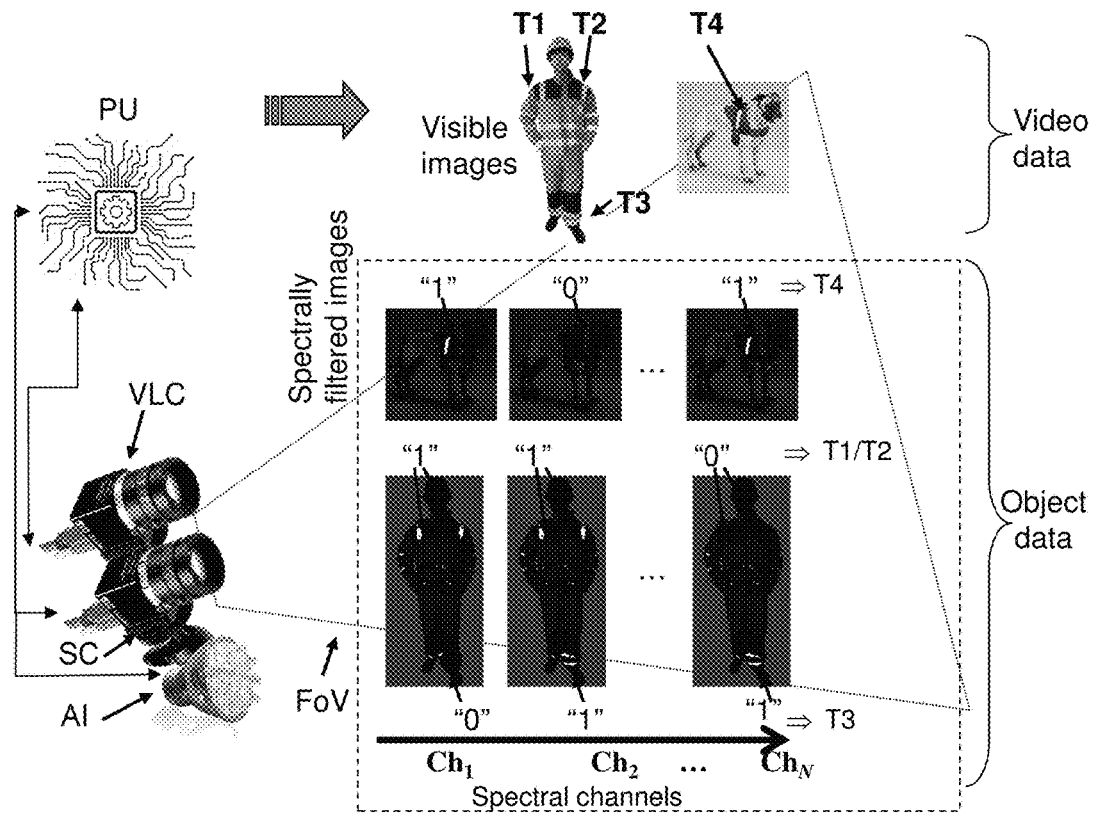
FIG. 3 provides a simplified illustration of the principle of operation of certain embodiments of the Invention for ease of understanding. The disclosed system comprises subjects wearing structural-color tags T1, T2, T3, T4, a visible light camera VLC, a spectral camera SC, an active illuminator AI, and a processing unit PU.

Several embodiments are disclosed for each aspect of the Invention. There are six key embodiments pertinent to the imaging aspect of the Invention that will be referred to as ImE1-ImE6; nine key embodiments pertinent to the tagging aspect of the Invention that will be referred to as TgE1-TgE9; and six key embodiments pertinent to the processing aspect of the Invention that will be referred to as PrE1-PrE6. The Invention can therefore be realized in several best modes combining various imaging, tagging and processing embodiments depending on the intended applications as specified by the table below:

The system of FIG. 3 includes spectral camera SC that is capable of imaging a scene in N distinct spectral channels $Ch_1 \ldots Ch_N$, where each channel represents either a single or multiple spectral bands. The spectral camera SC is operatively connected to processing unit PU for acquisition control and image processing. Located at a distance of several meters (typically, 3-300 meters) from camera SC are two subjects, a man and a dog, wearing structural-color tags T1 . . . T3 (man) and T4 (dog), with the tags' optical properties, including their spectral signature, defined by the photonic-engineered taggants they contain. The use of taggants with structural color, or structure-defined optical properties as opposed to chemically or compositionally defined ones, allows a large plurality of custom spectral signatures to be created by photonic engineering.

The scene is illuminated by active illuminator AI, which provides an illumination cone substantially filling the field of view FoV of the spectral camera SC. The tags T1 . . . T4 may be provided in retro-reflective format to maximize the return efficiency of the illumination impinging on the tags in a wavelength-selective fashion, said illumination having an optical spectrum associated with some or all spectral channels $Ch_1 \ldots Ch_N$ and/or the tags' spectral signatures. Multiple tags can be placed on a subject or object to increase the reliability of detection, e.g., T1 and T2. The tags'

TABLE 1

Best modes of the Invention.

| Best mode | Fig. | Applications | Imaging aspect options | Processing aspect options | Tagging aspect options |
|---|---|---|---|---|---|
| 1a | 3-14, 18-25, 32-35 | Identification, tracking, range-finding, authentication, security, suitable for working distance up to 10 meters | ImE1-ImE3, ImE6 | PrE1-2, Pr4-E6 | TgE1-TgE3, TgE8-TgE9 |
| 1b | 3-14, 18-21, 23-25, 34-35 | Identification, tracking, range-finding, authentication, security, suitable for working distance up to 300 meters | ImE1-ImE3, ImE6 | PrE1-2, PrE4-6 | TgE2-TgE3 |
| 2 | 14-16, 25-33, 35 | Object characterization, sensing, surface profiling/reconstruction, 3D/ volumetric imaging, positioning/ orientation control, virtual reality | ImE4, ImE5 | PrE1- PrE6 | TgE1, TgE4-TgE7 |
| 3 | 17, 35 | Augmented video, on-screen object labels, hypervideo, digital rights management, advertisement, in-video text search, social networking, news reporting, event broadcast, gaming | ImE6 | PrE1-2, Pr4-E6 | TgE1-TgE3, TgE8-TgE9 |

Note that some best modes in the above table can be combined to achieve enhanced functionality, e.g., by combining Modes 1 a/b and 3 one can obtain a system that both tracks subjects and provides a video output showing their location. Some imaging embodiments can be combined too, e.g., spectral range-finder SRF of embodiment ImE3 can be added to any other embodiment. Similarly, a combination of tag embodiments can be placed on a subject or object, e.g., one tag for identification and another for characterization, which will combine the functionalities of Modes 1a/b and 2.

Figure 4:
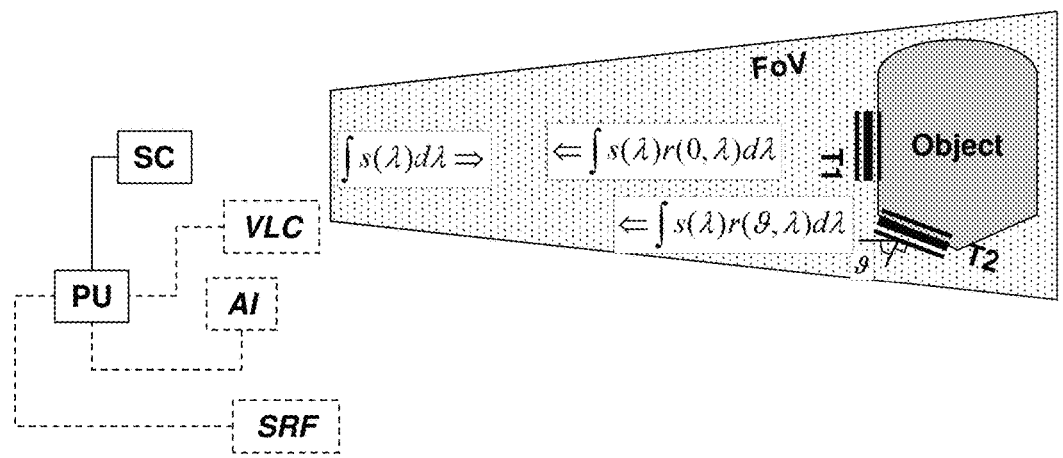
FIG. 4 presents a preferred embodiment of the invention suited to the identification and tracking of objects and subjects, shown in a side or top view. The components outlined with solid lines are indispensable constituents of the system, whereas the parts outlined with dashed lines are optional and their inclusion in the system is warranted by application requirements.

The system disclosed in FIG. 3 is a demonstrative, non-limiting schematic exemplifying a preferred embodiment of the Invention. It should be noted that the schematic of FIG. 3 is provided as an aid to understanding the concept and operation of a preferred embodiment, while a more formal presentation will be given in FIG. 4. With reference to Table 1, the system configuration of FIG. 3 represents a combination of Best Modes 1a/b and 3, whereas the system configuration of FIG. 4 represents a combination of Best Modes 1a/b, 2 and 3.

spectral signatures, the spectral characteristics of the channels $Ch_1 \ldots Ch_N$, and the emission spectrum of the active illuminator AI are so engineered as to provide a maximum modulation of the tags' visibility in images recorded in different spectral channels $Ch_1 \ldots Ch_N$. In the example of FIG. 3, tags T1 and T2 have a high visibility when viewed in spectral channels $Ch_1$ and $Ch_2$ but little or no visibility in $Ch_N$. The variation in the tags' visibility across different spectral channels allows information to be encoded in analog or binary format, with a Boolean "1" assigned when the visibility in a specific spectral channel exceeds a certain threshold, or a "0" when below threshold ("11 . . . 0" associated with tag T1). Some channels may be used for reference, verification and/or error correction. By extension, more digital levels (e.g., visibility or intensity grades from 0 to 9) could be used to identify or characterize a tag with a substantially higher information capacity.

Alternatively, thresholding can be performed by comparing (subtracting and/or dividing) images recorded in different spectral channels to quantify the tag visibility modulation between them. Mathematical operations such as computation of the first or second derivatives of the spectral data can be used to highlight sharp visibility variation across different spectral channels. Such image analysis and thesholding are performed by the processing unit PU, which can not only establish the presence of a tag (if specific threshold conditions are met), but also output the tag's identity or properties based on the information encoded therein, which, in turn, can be augmented by the look-up of the tag's information in a local or remote database or resource, e.g., over the Internet. Additional details can also be provided, e.g., the tag's location, size, pattern, movement and speed. In subsequent embodiments, it will be shown how yet further information can be obtained about objects or subjects from their tags, which may include their orientation, tilt, depth, distance, surface profile, temperature, humidity, elapsed time, gas or chemical agent concentration, deformation and strain.

A monochrome image for human observation can be obtained by outputting a specific spectral channel of the spectral camera SC. A false or real-color image can be generated using SC's specific spectral channels mapped as red, green, blue (RGB) components. According to Best Mode 3 of Table 1, it may also be desirable to simultaneously image the same scene using a conventional visible light camera VLC (either color or monochrome), which can be achieved by co-locating the two cameras VLC and SC, or even by having them share common image-forming optics so that their fields of view are substantially identical. Such a system can generate a video stream ("Video data" in FIG. 3) provided by the visible light camera VLC and enrich it with tag data provided by the spectral camera SC, said data ("Object data" in FIG. 3) containing information about the tagged objects and/or subjects referenced to their position within the video frames.

Moreover, knowledge of the identity of an object or subject of interest and its location or movement may be used to control either or both cameras VLC and SC, e.g., by providing a motorized mount to tilt or pan a camera for real-time tracking. Either camera can perform actions for image acquisition improvement such as auto-focus or flash activation, e.g., using information on the position of a subject of interest. A computer or processing unit associated with a camera can execute transmission of an image or alert message. Therefore, such a system will possess advanced computer/machine vision capabilities whereby the processing unit PU can obtain and process information about the identity and properties of tagged entities by image acquisition of remote scenes in a straightforward, line-of-sight manner. Such capabilities lie beyond the reach of state-of-the art vision systems and are afforded by a non-trivial integration, and non-obvious adaptation of, spectral imaging and photonic engineering technologies as will be explained in the following sections.

A similarly operated configuration is illustrated in FIG. 4, which provides a more formal and generalized presentation of the preferred embodiment of the Invention. The components outlined with solid lines are indispensable constituents of the system, whereas the parts outlined with dashed lines are optional and their inclusion in the system is warranted by application requirements. For example, spectral range-finder SRF may be used to determine the distance to the tagged object based on a unique spectral response of structural-color tags T1 and/or T2 and also double as an auto-focus device to enhance the image quality. The visible light camera VLC may be provided if video output is desired in addition to tagged object data. Illumination is preferentially provided by active illuminator AI co-located with the spectral camera SC but can also come from another suitable light source, e.g., controlled ambient lighting.

Referring again to the setup of FIG. 4, the active illuminator AI emits optical radiation of power $\int s(\lambda)d\lambda$, where $s(\lambda)$ is the power spectral density of the radiation and $\lambda$ is the wavelength. The wavelength integration limits are associated with a specific spectral range SSR, which may be defined by one or more of the following techniques: by a filter integrated with camera SC, by spectral channels $Ch_1 \ldots Ch_N$, by the spectral sensitivity of camera SC, by the spectral bandwidth of active illuminator AI.

Observed within the field of view FoV is an object marked with structural-color tags T1 and/or T2, which reflect some of the illumination impinging thereon in a wavelength-selective fashion. The tags contain structural-color taggants to provide spectral signatures in the form of variable reflectivity $r(\vartheta,\lambda)$ that is dependent on wavelength $\lambda$ and possibly angle $\vartheta$, the latter defined as the angle of incidence (or reflection) of illumination versus a normal to wavelength-selective elements within the structural-color taggant. For the structural-color tag T1, which is illuminated substantially at normal incidence ($\vartheta=0$), the optical power returned to the camera SC is proportional to $\int s(\lambda)r(0,\lambda)d\lambda$. For the structural-color tag T2, which is illuminated at substantially oblique incidence ($\vartheta>0$), the optical power returned to the camera SC is proportional to $\int s(\lambda)r(\vartheta,\lambda)d\lambda$. The gonio-dependence of spectral response $r(\vartheta,\lambda)$ on angle $\vartheta$ can be either an undesirable feature (as in object or subject identification) or a desirable one (as in stand-off profilometry and characterization of orientation, rotation or tilt), therefore different imaging and tagging embodiments will be provided that either suppress or enhance this feature.

In the block diagrams of FIG. 5 and FIG. 6, a method is described for processing unit PU to analyze image data and retrieve tag information. The method is generic to a wide range of modes of the Invention and will be referred to as processing embodiment PrE1. Spectral camera SC captures N spectrally-discriminated images of a scene possibly containing a structural-color tag or tags with a spectral signature substantially defined by $s(\lambda)r(\vartheta,\lambda)$, which results in variable visibility in accordance with the spectral properties of its spectral channels $Ch_1 \ldots Ch_N$. The captured image data are analyzed by processing unit PU, which performs a spectral analysis of an areal portion of the spectrally-discriminated images that may be as small as one pixel in size or as large as the whole camera sensor area. The image data are subjected to numerical processing, which may include operations on pixel values such as scaling, subtraction, normalizing, binning, unmixing, denoising, Fourier transform, thresholding, including a comparison (e.g., subtraction, division, differentiation) of images recorded in different spectral channels. A high difference, differential, derivative or ratio between specific spectral channels may indicate the presence of a structural-color tag and can be used to screen pixels or areas of a scene prior to detailed classification, identification or characterization and as illustrated in the optimized algorithm of FIG. 6.

Figure 7:
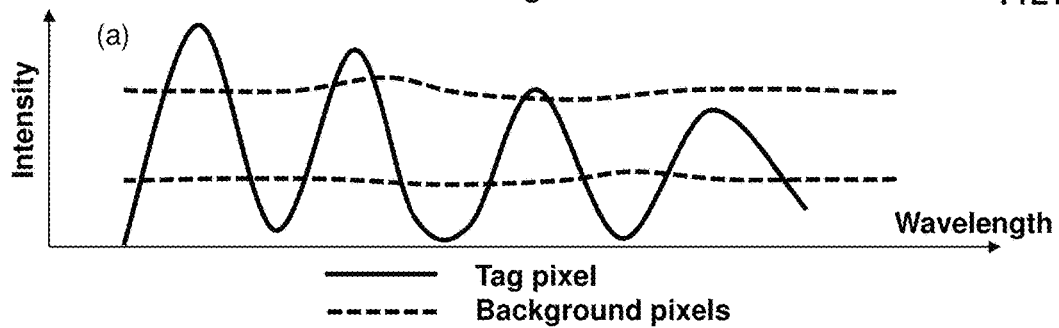
FIG. 7 illustrates the application of processing embodiment PrE1 to a scene (b) containing a rotating shaft bearing a round tag, whose spectral signature is formed by the solid line of spectrum (a). Typical background materials exhibit smooth spectra such as the dashed lines in (a). The image (c) is formed by differentiation of scene (b) in the spectral domain.

The algorithm according to the block diagram of FIG. 6 is particularly suitable if high differentials, derivatives or ratios are sought between specific spectral bands defined by respective spectral channels where the tag spectral signatures are expected to exhibit a high modulation of visibility, as illustrated in FIG. 7. Here, speed and efficiency optimization can be achieved by screening the spectral image data for above-threshold differentials [as in FIG. 7(c)] or ratios prior to performing the tag identification or characterization cycle.

The application of processing embodiment PrE1 to a real-life scene is demonstrated in FIG. 7. A rotating shaft bearing a round structural-color tag T1 is shown in FIG. 7(b), with the tag's spectral signature having a sharp spectral modulation represented by the solid line of FIG. 7(a). Conversely, typical background materials exhibit smooth or slow-varying spectra such as the dashed lines in FIG. 7(a). The brightness of background materials merely affects their intensity level in the spectrum, but not their spectral modulation. The image of FIG. 7(c) is formed by differentiation (first derivative) of scene (b) in the spectral domain, which only highlights pixels having a high spectral modulation or contrast, while all the pixels belonging to background materials cancel to zero due to their insignificant first derivative values. It is therefore possible to detect and identify pixels belonging to tag T1 against the background with high discrimination and with low computational effort thanks to the high spectral modulation they exhibit.

The processing diagrams of FIG. 5 and FIG. 6 further include matching the resulting spectral data to stored thresholds, differentials, derivatives, codes or signatures and, if a match is obtained, outputting information associated with the identified tag. Such information may include any digital identifier, value, reference or index conveying the identity of an entity in an areal portion of the scene as well as its spatial extent and coordinates. Alternatively or additionally, the angular dependence of the imaged spectral signature $s(\lambda)r(\vartheta,\lambda)$ may be used to infer the orientation and rotation of the tag and of the object or subject it is attached to. In a similar fashion, the tag's temperature t can be inferred if its spectral signature $r_t$ contains a known thermal dependence $r_t(\vartheta,\lambda,t)$. Other physical characteristics such as humidity, elapsed time, gas or chemical agent concentration, strain and deformation can be associated with the respective spectral signature dependence of the tag.

In the context of FIG. 4, processing unit PU obtains illuminated spectral signatures $s(\lambda)r(0,\lambda)$ and $s(\lambda)r(\vartheta,\lambda)$ of structural-color tags T1 and T2, respectively, in the respective areal portions of the imaged scene, processes and identifies them by matching them to stored data, and outputs information pertaining to tags T1 and T2. The nature of processing, identification and output information may differ depending on the application and specific imaging and tagging embodiments.

For operation in Best Mode 1a/b of Table 1, the tags' gonio-dependence should be minimized (as will be taught in tagging embodiments TgE2 and TgE3), in which case both tags T1 and T2 will point to a common identifier substantially defined by $s(\lambda)r(\lambda)$. The spectral signature $r(\lambda)$ can be deconvolved by calibrating the spectral camera against a known illumination spectrum $s(\lambda)$ obtained, e.g., by imaging a uniformly illuminated white area. Using a unique spectral signature $r(\lambda)$ associated with a tag, processing embodiment PrE1 can thus provide tag information that includes the identity, position, size, orientation, speed of a tagged entity, with further information obtainable from a local or remote storage or network resource based on the identity of the subject or object. For example, such tag information may contain a website link to a social network like Facebook, where more details about the tagged person may be retrieved. Alternatively, the person's image may be automatically highlighted or tagged on a social network.

For operation as orientation sensors (included in Best Mode 2 of Table 1), the tags' gonio-dependence should be maximized (as will be taught in tagging embodiment TgE4), in which case the system will recognize tag T2 as a rotated version of tag T1 tag by matching an angle $\vartheta$ to the imaged signature $s(\lambda)r(\vartheta,\lambda)$. Processing embodiment PrE1 can thus provide tag information that includes tilt, angle, orientation, shape, and even depth profile of a tagged surface. Similar processing can be performed for any temperature, humidity, elapsed time, time, gas or chemical agent concentration, strain and deformation dependence of a tag's spectral signature, allowing the tag to be used as a sensor for measuring such dependence.

Therefore, the system of FIG. 4 operating according to embodiment PrE1 as described in FIG. 5 or FIG. 6 is capable of both automatically identifying one or several of a set of known structural-color tags within its field of view and outputting information pertaining to the identified tags and/or the objects/subjects associated with them.

In order to achieve the functionality described above, specific exemplary but non-limiting embodiments of the imaging, processing and tagging aspects of the Invention will be disclosed in the following sections.

Embodiments of Imaging and Processing Aspects

In this section, various embodiments pertaining to the imaging and processing aspects of the Invention will be described in detail.

A spectral camera SC can be realized by modification of some of the designs of hyperspectral and multispectral imagers developed for medical and remote sensing applications. It is important that, unlike most of the prior art employing (hyper)spectral cameras in scanning regime, or single shot regime, the present Invention is advantageously practised using spectral imagers operating in real-time at substantially video rates, video rate being defined for real-time purposes as 1 frame per second or higher. Such imagers are disclosed, for example, in U.S. Pat. Nos. 7,130,041, 8,233,148, and US Pat. App. 20120327248.

In a key imaging embodiment referred to ImE1, spectral camera SC acts substantially as a hyperspectral imager producing images in spectral channels $Ch_1 \ldots Ch_N$ that are formed by an image sensor or focal plane array disposed behind either a plurality of narrowband transmission filters or, in some hyperspectral imager designs, a single tunable passband transmission filter that is tuned through a plurality of spectral configurations. In either case, each spectral channel $Ch_k$, where k=1 ... N, forms a single continuous spectral window, or band, characterized by its center wavelength $\Lambda_k$ and bounded by the wavelengths $\lambda_{Lk}$ (lower limit) and $\lambda_{Hk}$ (upper limit). In hyperspectral imaging, the acquired spatio-spectral dataset is commonly represented as a hyperspectral cube, which comprises a plurality of spatial X-Y images obtained in spectral bands $Ch_1 \ldots Ch_N$ as illustrated in FIG. 18(b). In the art, such spectral bands are usually engineered to be of substantially equal spectral width with a uniform spacing to provide a regular spectral sampling of a specific spectral region of interest, with a hyperspectral camera operating substantially as an imaging spectrometer for acquiring a hyperspectral cube in spatial axes (X, Y) and one spectral axis (wavelength or frequency). By contrast, in embodiment ImE1, both the center positions $\Lambda_k$ of the spectral windows and their bandwidths ($\lambda_{Hk}-\lambda_{Lk}$) may be at least partially matched to high and low intensity wavelength components within the spectral signatures of the tags to be imaged.

Figure 8:
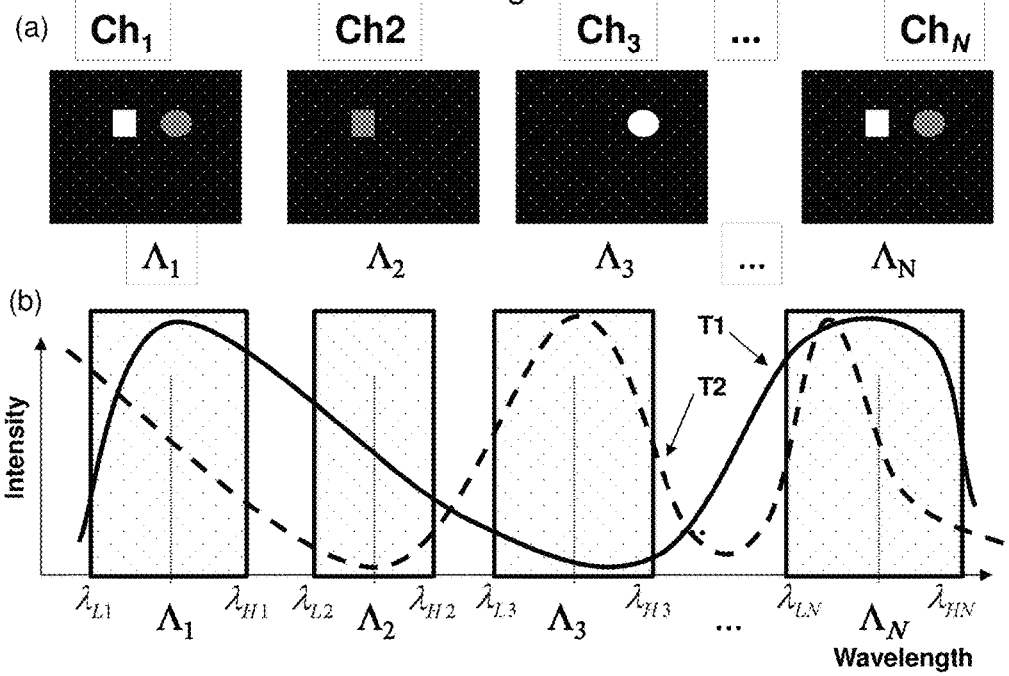
FIG. 8 illustrates the operation of imaging embodiment ImE1 of an implementation of the Invention showing the visibility of two different structural-color tags (square T1 and round T2) as observed through the discrete spectral channels of the spectral camera(a), and the corresponding tag spectral signatures (b).

The operation of embodiment ImE1 is illustrated in FIG. 8(a), where two structural-color tags, square (T1) and round (T2), are imaged with a hyperspectral camera having spectral channels $Ch_1 \ldots Ch_N$ with spectral properties as illustrated in (b). Unlike in a conventional hyperspectral imager, the spectral channels $Ch_1 \ldots Ch_N$ may have unequal bandwidths $(\lambda_{Hk+1}-\lambda_{Lk+1}) \neq (\lambda_{Hk}-\lambda_{Lk})$ and/or irregular spacing $(\Lambda_{k+1}-\Lambda_k) \neq (\Lambda_k-\Lambda_{k+1})$, where $k=2 \ldots N-1$, so as to obtain a better rendering of the characteristic features in the spectra of structural-color tags. In the example of FIG. 8(b), the peak intensity of T2's spectral signature falls within the spectral channels centered at $Ch_3$ and $Ch_N$, while it is almost invisible in $Ch_2$. Conversely, the square tag T1 displays intensity peaks at $Ch_1$ and $Ch_N$, with a dark reading in $Ch_3$. The tag visibility in the corresponding spectral images per channel is illustrated in (a). Through a careful design of both spectral signatures of the tags and channels $Ch_1 \ldots Ch_N$ of the spectral camera, one should try to obtain preferential or exclusive transmission of intensity peaks and troughs from the tag spectra in as many spectral channels as possible, with a view to obtaining spectral images that are either substantially bright or dark, just as the tags T2 and T1, respectively, appear in the image of $Ch_3$ in FIG. 8(a). Intermediate or grayscale images, such as T1's appearance in $Ch_2$, should be avoided as these possess insufficient contrast and are more prone to classification errors.

For unambiguous discrimination of tags against the background, tags should have spectral signatures consisting of one or more characteristic spectral feature. Such a feature should include at least one sharp transition between a high-intensity level and a low-intensity level differing by 20% or more, as can be seen in the tag spectra of FIG. 8(b). The sharpness of such a transition can be defined in reference to a spectral bandwidth covering adjacent two or more spectral channels, e.g., tag T2 (dashed line) exhibits a high spectral modulation between $Ch_2$ and $Ch_3$, while tag T1 (solid line) between $Ch_1$ and $Ch_3$. The narrower the transition bandwidth (but not narrower than $(\Lambda_{k+1}-\Lambda_k)$ for the respective spectral channels) and the higher the spectral modulation depth, the better the discrimination against common background materials that can be achieved. It is estimated that transition bandwidths of 80 nm or smaller centered at a wavelength of 900 nm, or 50 nm or smaller at 700 nm, provide sufficiently sharp spectral modulation for easy differentiation against the background. Expressed in wavenumber terms, such a bandwidth corresponds to 1000 inverse centimeters or less.

A mathematical description of the above principles is provided in FIG. 9, where the spectral transmission of the k-th channel is represented by the filter transfer function $F_k(\lambda)$ defined within the limits $[\lambda_{Lk}, \lambda_{Hk}]$. In embodiment ImE1, the filter transfer function $F_k(\lambda)$ should ideally approach 1 within the interval $[\lambda_{Lk}, \lambda_{Hk}]$, and 0 outside, i.e., behave like a boxcar function. In reality, however, the filter transfer function $F_k(\lambda)$ typically exhibits sloped edges as illustrated in FIG. 9. The total power sliced by the k-th channel $Ch_k$ from an illuminated tag's spectral signature $s(\lambda)r(\vartheta,\lambda)$ is therefore $\int_{\lambda_{Lk}}^{\lambda_{Hk}} s(\lambda)r(\vartheta,\lambda)F_k(\lambda)d\lambda$. The task of photonic engineering is therefore to both maximize this integral in some spectral channels, and minimize it in different spectral channels, by an appropriate choice of channel boundaries $[\lambda_{Lk}, \lambda_{Hk}]$, and spectral signatures $r(\vartheta,\lambda)$ of structural-color tags.

In order to solve the above photonic engineering task, an implementation of the Invention makes use of the Fabry-Perot etalon effect in some of its imaging and tagging embodiments. An ideal Fabry-Perot etalon is formed by two parallel, reflecting surfaces separated by physical thickness d filled with a transparent medium of refractive index n. A Fabry-Perot effect can also be achieved where the reflecting surfaces are formed by periodic structures, such as quarter-wavelength stacks or Bragg mirrors. When illuminated at angle $\vartheta$ to its normal by collimated light at wavelength $\lambda$, the etalon acts like a quasi-periodic comb filter defined by the Airy function in $\lambda$, providing reflection peaks when its optical thickness D=nd meets the condition $$D = \left(M - \frac{1}{2}\right)\frac{\lambda}{2\cos\vartheta}, \quad \text{(Eq. 1)}$$

and transmission peaks when $$D' = M'\frac{\lambda}{2\cos\vartheta}, \quad \text{(Eq. 2)}$$

where M or M' is a positive integer, sometimes referred to as a fringe order or order of interference. In spectroscopy, such spectra are often referred to as frequency combs. Here, the effects of phase shift due to reflection within the etalon are omitted (as in most textbooks) but can be accounted for by a material-specific scaling factor in M and M', which is equivalent to using fractional M or M' values. Such a filter is used in transmission mode with M'=1 (single transmission peak) in Eq.2 by US Pat. App. 20120327248 to define the filter transfer function $F_k(\lambda)$ for the k-th channel $Ch_k$ of a hyperspectral imager.

In a tagging aspect of the Invention, a structural-color tag may contain a photonic-engineered taggant whose reflective spectral signature $r(\vartheta,\lambda)$ is defined by a Fabry-Perot etalon with optical thickness D according to Eq.1. Note that the tag structure may contain multiple layers of different thicknesses and materials as will be explained later, but at least one of the layers can form a Fabry-Perot etalon with a characteristic optical thickness D and spectral signature $r(\vartheta,\lambda)$. Such a spectral signature is illustrated in FIG. 10(a) with fringe order M=20 at $\lambda$=700 nm and $\vartheta$=0. When imaged under spectrally uniform illumination $s(\lambda) \approx 1$ through a conventional hyperspectral imager with 32 uniformly spaced spectral channels spanning from 600 nm to 1000 nm in wavelength, e.g., as developed by IMEC, Belgium, the spectral signature is represented by the intensities recorded in individual channels as shown in FIG. 10(b). One can see that the spectral signature is well-resolved in higher channels/longer wavelengths, but is under-sampled in lower channels/shorter wavelengths resulting in poor tag visibility modulation. A modified spectral camera design using narrower spectral bandwidths with a smaller spacing in lower channels would allow the spectral signature to be adequately resolved.

Therefore, imaging embodiment ImE1 can employ conventional hyperspectral imaging technology but with preferable customization of spectral channel bandwidths and spacing to match the spectral signatures of imaged tags.

In a further improvement, henceforth referred to as embodiment ImE2, both the imaging and tagging aspects of the Invention can be spectrally matched to each other by using similarly defined spectral signatures by means of optically similar Fabry-Perot comb etalons, or frequency combs. A structural-color tag whose reflective spectral signature $r(\vartheta,\lambda)$ is defined by a Fabry-Perot etalon, in reflection mode, with optical thickness D according to Eq.1, can be imaged by a spectral camera containing a first image filter transfer function $F'(\vartheta',\lambda) \propto r(\vartheta,\lambda)$ also defined by a Fabry-Perot etalon, in transmission mode, with a different optical thickness D' and M' as in Eq.2, wherein Eqs.1 and 2 are used with substantially similar or identical M'≈M and angles ϑ≈ϑ'. However, for a perfectly matched F'(θ',λ)∝r(ϑ,λ), the first image filter will provide high transmission to all high-intensity wavelength components of r(ϑ,λ), which would be equivalent to imaging a highly reflective or white area, or a broadband light source with no spectral signature at all. In order to discriminate against spectrally broadband scenes, a second, half-period shifted image filter is provided with a function F"(θ',λ) defined by a Fabry-Perot etalon formed in one or more layer, in transmission mode, with a different optical thickness D" obtained by substituting M'-0.5 in Eq.2, thereby transforming it into Eq.1. Therefore, the transmission peaks of the first image filter F'(θ',λ) spectrally overlay the reflection peaks of the second image filter F"(θ',λ), and vice versa. By assigning the first image filter to the k-th channel $Ch_k$ of a spectral camera, and the second image filter to its (k+1)-st channel $Ch_{k+1}$, one can obtain a high-contrast image of a tag with spectral signature r(ϑ,λ) as defined by Eq.1 by subtracting from the image in channel $Ch_k$ (high intensity) the image in channel $C_{k+1}$ (low intensity). Therefore the tag can be easily detected by image subtraction between specific spectral channels. A scaling, division or normalization operation on the two images can also be used to produce a ratio indicative of high image contrast.

The operation of such a spectrally matched tag and camera system is illustrated in FIG. 11. In (a), the first image filter transfer function F'(θ',λ) (solid line, Filter A) according to Eq.2 is plotted together with the second image filter transfer function F"(0',λ) (dashed line, Filter B) according to Eq.1, both for M'=37 at λ=700 nm and ϑ=0. A structural-color taggant is provided with a reflective spectral signature according to Eq.1, which is plotted in FIG. 11(b) for identical M=37 at λ=700 nm and ϑ=0. Note that the spectral signature contains varying quasi-periodic reflection peaks and is substantially dissimilar to typical reflection spectra exhibited by most natural-color, non-photonic engineered materials. When the data of FIG. 11(b) are filtered by the transmission profiles of Filters A and B in FIG. 11(a), the resulting transmitted powers are plotted in FIG. 11(c). One can see that the total power ∫s(λ)r(ϑ,λ)F'(θ', λ)dλ transmitted through the peaks of Filter A is much higher than the power ∫s(λ)r(ϑ,λ)F"(θ',λ)dλ transmitted through Filter B, which will produce a highly differential output if the spectral components filtered through filters A and B are subtracted from, or divided by, each other. By contrast, if the imaged scene contains broad or unmodulated spectra, or a spectral signature obtained with a substantially different fringe order M, the readings through filters A and B will be similar and will cancel on subtraction or division, resulting in low or zero differential output.

Note that the two filters whose transmission peaks are defined by Eqs. 1 and 2 for the same M=M', λ and ϑ are complementary in that their optical spectra are shifted by half-period, with the optical thickness different by a quarter wavelength λ/4 at ϑ=0. However, their complementarity will only persist over a specific spectral range SSR. This is due to the different peak-to-peak spacing, also known as the free spectral range (FSR), which for Eq. 2 is given by λ/M, and for Eq.1, by λ/(M±0.5). In frequency space, they form frequency combs with different free spectral ranges (teeth spacing) given by $$\frac{c}{2D\cos\vartheta} \text{ and } \frac{c}{2D'\cos\vartheta}$$

for their respective optical thicknesses D and D', where c is the speed of light. The difference in peak spacing between the two filters will accumulate over a number of free spectral ranges (fewer than M/2) causing a loss of overlap between their transmission and reflection peaks. This can be avoided by using an additional broadband spectral filter to delimit a specific spectral range SSR over which filter complementarity is maintained, and/or using active illumination whose emission spectrum is contained within such a specific spectral range SSR. Another consideration for the selection of SSR lies in the coherence length of the light (and its bandwidth) used for imaging, which will be addressed in a later section. Consequently, the integration of the filtered light ∫s(λ)r(ϑ,λ)F(θ',λ)dλ should be performed within the limits of the specific spectral range SSR.

To appreciate the operation of embodiment ImE2 in an imaging application, one is referred to the optical simulation in the example of FIG. 11(d-f), which shows a truck exiting a tunnel. The truck's number plate contains a Fabry-Perot photonic taggant so engineered as to produce a spectral signature similar to that of FIG. 11(b). When imaged through Filter A in (d), the number plate is highly visible, as are most bright areas in the image, e.g., the lights in the tunnel. When imaged through Filter B in (e), the number plate appears dark, but the other bright areas in the image remain bright as they contain no spectral modulation for Filter B to discriminate against. When image (e) is subtracted from (d), or (e) is divided by (d), a high-contrast differential image (f) will be obtained wherein all background components, no matter bright or dark, are cancelled and only the pixels pertaining to the number plate are preserved. It should be emphasized that the Fabry-Perot encoded number plate can only be identified and decoded in this fashion for a specific combination of optical thicknesses D, D', and D", which allows for a large plurality of unique Fabry-Perot codes.

To further extend the application of embodiment ImE2, a spectral camera configuration is disclosed wherein spectral channels $Ch_1 \ldots Ch_N$ are defined by a sequence of Fabry-Perot transmission filters according to Eq.2 with $M'_k = M'_0 + (k-1)/2$, where $k=1 \ldots N$ and $M'_0 > 0$. In this configuration, any two adjacent filters in the spectral sequence, e.g., $M'_{k+1}$ and $M'_k$, or $M'_k$ and $M'_{k-1}$, are complementary to each other and differ in their optical thickness by a quarter wavelength λ/4 at normal incidence. Therefore, a differential image obtained with any adjacent filter pair may be used to decode a tag with a Fabry-Perot spectral signature defined by an identical or similar fringe order M. As either filter within a complementary filter pair can be used as a spectral counterpart to the other, one Fabry-Perot tag per camera spectral channel can be allocated according to its M value, which would imply that the total number of identifiable tags will be similar to the number N of spectral channels $Ch_1 \ldots Ch_N$.

Figure 12:
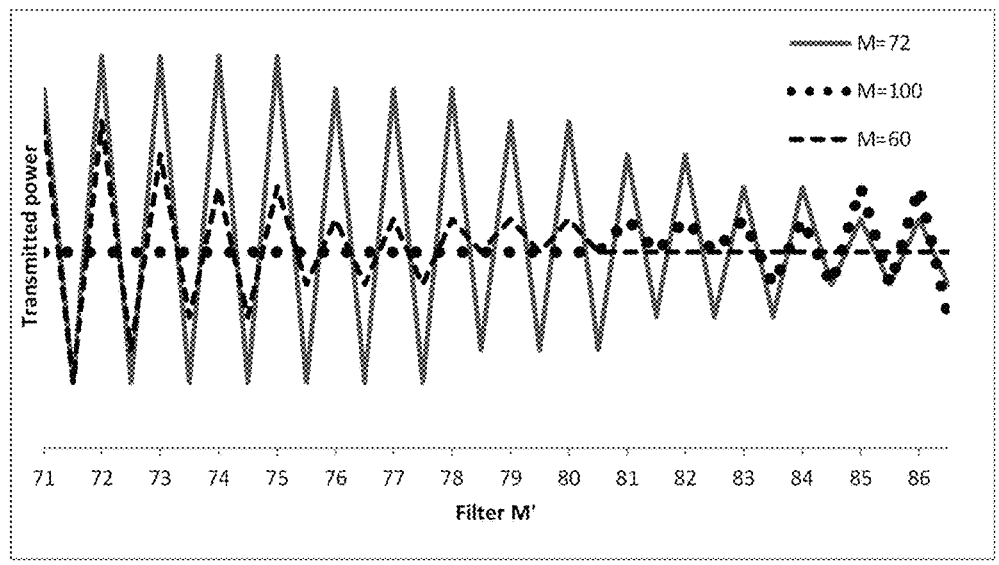
FIG. 12 provides an illustration of processing embodiment PrE2 of an implementation of the Invention, which further improves the imaging embodiment of FIG. 11 (ImE2), wherein the spectral camera contains multiple complementary spectral filters defined by parameter M' marked along the abscissa of the graph. The ordinate shows the calculated relative intensity of images of specific structural-color tags defined by parameter M (marked by the different line types in the graph) as viewed through each filter. A large intensity modulation between neighboring filters around a specific value of M' indicates the presence of a structural-color tag defined by parameter M≈M'.

However, according to the simulation of FIG. 12, a spectral camera based on embodiment ImE2 will recognize a plurality of structural-color tags that is much larger than the camera's channel count N. Along the X axis of the chart, the fringe orders M' of 32 complementary, half-period shifted filters defined by Eq.2 are enumerated as {71.0, 71.5, 72.0, 72.5, . . . 86.5}. Plotted in the chart are the filtered powers ∫s(λ)$r_M$(ϑ,λ)$F_{M'}$(θ',λ)dλ of a Fabry-Perot tag's spectral signature $r_M$(ϑ,λ) corresponding to a certain M value, as imaged in the spectral channels defined by $F_{M'}$(θ',λ) with different M' values. One can see that for a tag with M=72 (solid line), a very high contrast, modulation depth, ratio or differential, can be obtained not only between adjacent filters with M'=72 and 71.5, or M'=72 and 72.5 where M'≈M, but also between filters with higher M' values. This is due to the fact that the oscillating nature of spectral signature $r_M(\vartheta,\lambda)$ will still exhibit a partial correlation with the transmission peaks and troughs of a complementary filter pair detuned from the signature to M'≠M. Similarly, a tag with M=100 (dotted line) maintains a limited but increasing contrast when imaged with filters from M'>81. A tag with M=60 (dashed line) exhibits a decreasing contrast when imaged with filters with M' from 71 to 81.

In this embodiment, the spectral channels are configured as a series in M' defining filter thicknesses according to Eq.2 with an increment of ΔM'=½, while the fringe orders M associated with Fabry-Perot tags need not be continuous, regular or even integer, the only requirements being that their fringe orders are sufficiently spaced apart to avoid aliasing and that there are sufficiently close to filter fringe orders M' to provide detectable image differentials. In the above example of the spectral channels given by M'={71.0, 71.5, 72.0, 72.5, . . . 86.5}, one may want to use Fabry-Perot tags with M={50, 53, 57, 62, . . . 105}. For a filter set M'={5, 5.5, 6.0, 6.5, . . . 20.5}, an irregular tag set M={4, 4.3, 4.6, 5.0, 5.5, 6.0, 6.8, . . . 25} could be suitable. As these two examples demonstrate, it is possible to create matching camera filter and tag sets, which can be used to provide spectral cameras sensitive to a particular library of tags, and vice versa, a library of tags that can only be interpreted by a specific camera, to the benefit of many security applications.

The above property of variable tag contrast when imaged across a series of complementary filter channels $Ch_1 \ldots Ch_N$. is exploited in processing embodiment PrE2 to greatly augment the number of identifiable tags. Instead of associating a single tag with a single spectral channel by commonality of their M and M' values, one can correlate a tag's signature with a plurality of its visibility differentials or contrasts between adjacent channels across the whole channel series. Such a plurality may form, for example, a one-dimensional array or vector P indexed by channel number k with values containing absolute differentials $\{|P_1-P_2|, |P_2-P_3|, |P_3-P_4|, \ldots |P_{N-1}-P_N|\}$, derivatives $\{(P_2-P_1)/(\Lambda_2-\Lambda_1), (P_3-P_2)/(\Lambda_3-\Lambda_2), (P_4-P_3)/(\Lambda_4-\Lambda_3), \ldots (P_N-P_{N-1})/(\Lambda_N-\Lambda_{N-1})\}$, or ratios $\{P_1/P_2, P_2/P_3, P_3/P_4, \ldots P_{N-1}/P_N\}$, where $P_{k-}$ is the optical power or signal captured by the k-th channel. Other definitions may be used, e.g., using a second derivative in the spectral domain. Such an array or vector $\vec{P}$ resembles materials classifiers or "spectral signatures" used in hyperspectral and multispectral imaging, however, its physical implementation is very different.

It should be noted that, with M'>1 in Eq.2 the Fabry-Perot filter transfer function $F_k(\lambda)$ for a k-th channel $Ch_k$ of a spectral camera no longer defines a continuous spectral band or window, but rather a quasi-periodic sequence of variable and discontinuous spectral bands or windows, hence such a camera no longer meets the definition of a hyperspectral imager. Furthermore, the plurality of spectral windows in a single channel of such a spectral camera will admit considerably more light and provide a higher signal-to-noise ratio than in conventional hyperspectral imager designs, wherein narrowband channel filters are used. Such a spectral camera can, nonetheless, be realized using conventional hyperspectral imager designs by simply increasing the thicknesses of internal Fabry-Perot filters to achieve the required values of M'. A method for the fabrication of complementary comb filters taught in U.S. Pat. No. 6,885,504 could be applied to the manufacturing of spectral channel filters in this Invention.

The processing embodiment PrE2 is fully compatible with PrE1 described earlier in FIG. 5 and FIG. 6, with the above differentials, derivatives or ratio vector $\vec{P}$ used for comparison with and identification of imaged tags. As with PrE1, embodiment PrE2 can also provide a significant improvement in processing speed and efficiency by first screening an imaged scene for pixels where at least some elements in the above vector $\vec{P}$ are non-zero or exceed a certain threshold (which may vary from channel to channel), as illustrated in the block diagram of FIG. 6. Fulfillment of the threshold condition would only imply the presence of a tag or tags and will trigger a more computationally intensive comparison cycle where the vector $\vec{P}$ is matched to stored patterns to identify the tag(s). If the threshold condition is not satisfied, the nugatory comparison cycle is not performed, which improves the system's speed and efficiency.

In the following sections, implementation of active illumination for the interrogation of remote structural-color tags will be disclosed.

The bandwidth of optical radiation used for imaging tags according to embodiment ImE2, wherein a tag's spectral signature is defined by a Fabry-Perot etalon using Eq.1 with fringe order M>1, should cover several reflection peaks, or free spectral ranges FSR, to achieve maximum contrast within a specific spectral range where filter complementarity is maintained. At the same time, narrowband radiation can be used to interrogate specific peaks and troughs within a tag's spectral signature in embodiments ImE1 and ImE2. In this case, if a Fabry-Perot etalon tag design is employed, the tags must be interrogated by light whose coherence length $L_c$ is greater than double the etalon's optical thickness D, where $L_c$ is related to the bandwidth $\Delta\lambda$ of the interrogating source at center wavelength $\lambda$ as $L_c \sim \lambda^2/\Delta\lambda$. Coherent sources such as laser diodes can be used to perform narrowband tag interrogation, however, the problem of laser speckle in the imaged data would have to be addressed.

Figure 13:
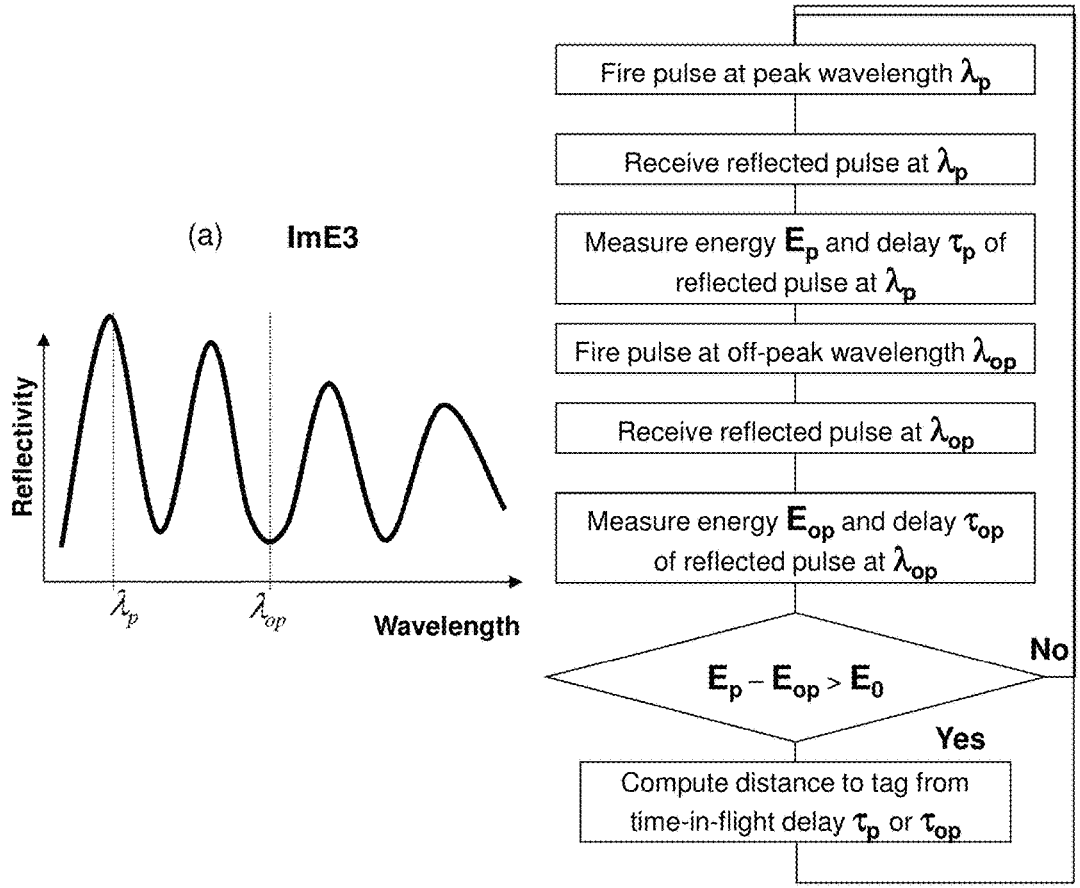
FIG. 13($a$) illustrates the operation of imaging embodiment ImE3 providing a subject-specific range-finding device by firing pulses of light that are spectrally matched to the spectral signature of the tagged subject. The block diagram of ($b$) lists the steps of a method to implement spectrally-selective range-finding for a tagged subject or object according to processing aspect PrE3 of the Invention.

Nevertheless, laser tag interrogation can prove useful not for imaging but rather for range-finding applications, which are covered by imaging and processing embodiments ImE3 and PrE3, respectively. If a tag's spectral signature is known to contain specific peaks and troughs as shown in FIG. 13(a), a laser pulse fired at a peak wavelength $\lambda_p$ will have a high reflective return efficiency. Conversely, a laser pulse fired at an off-peak wavelength $\lambda_{op}$ will have a low reflective return efficiency. The differential return signal between the two wavelengths can be used to measure the distance to the tagged object with high discrimination against the other entities in the background. In the processing embodiment PrE3 of FIG. 13(b), a method is disclosed to measure both the return energy $E_p$, $E_{op}$ and the round-trip time-in-flight delay $\tau_p$, $\tau_{op}$ of the interrogation laser pulses at wavelengths $\lambda_p$, $\lambda_{op}$, respectively, and if the differential return energy $|E_p-E_{op}|$ (or ratio $E_p/E_{op}$) exceeds a threshold, to compute the distance l to the tag either as $l=\tau_p c/2$ or $l=\tau_{op} c/2$, where c is the speed of light.

In a more general case, a directed light source whose spectrum is likely to have a high return efficiency when reflected by a tagged object, and a light source with a low reflective return efficiency, can be used to perform selective range-finding in reference to the specific tagged object of interest. For example, pulsed time-of-flight distance measurement technology at pixel level with a specific active illuminator, as disclosed by International Pat. App. WO2014096157 and WO2014068061, can be spectrally matched to an object of interest. The selective range-finding functionality can be added to a spectral camera as an auto-focus apparatus to enable a camera to record an image of a specific object in sharp focus based on its distance. Applications in target-selective Light Detection and Ranging (LIDAR) are also possible. In another possible application in traffic speed enforcement, if a vehicle's registration plate contains a structural-color tag, a spectral speed camera can both identify the vehicle and measure its speed by firing interrogation pulses at characteristic wavelengths within its spectral signature, thereby singling out the vehicle for a speed check amongst all other traffic. Other approaches may include use of custom interrogation spectra such as disclosed by U.S. Pat. No. 8,406,859, which uses a spatial light modulator to configure a spectrum for active illumination.

It has already been mentioned that control over both the angle of incidence and spectral properties of tag illumination is requisite for unambiguous tag interrogation by the spectral camera. Neither of these two requirements can be guaranteed under ambient illumination, which may come from multiple sources with uncontrolled radiation patterns and spectra. Even when controlled illumination is provided by active illuminator AI as diagrammatized in the setup of FIG. 4, the background illumination may interfere with or even overwhelm the spectral signature $s(\lambda)r(\vartheta,\lambda)$ received by the spectral camera and should therefore be discriminated against. A method for reducing the contribution of ambient light by providing active illumination for imaging with a non-spectral camera is disclosed in US Pat. App. 20090295910.

Figure 14:
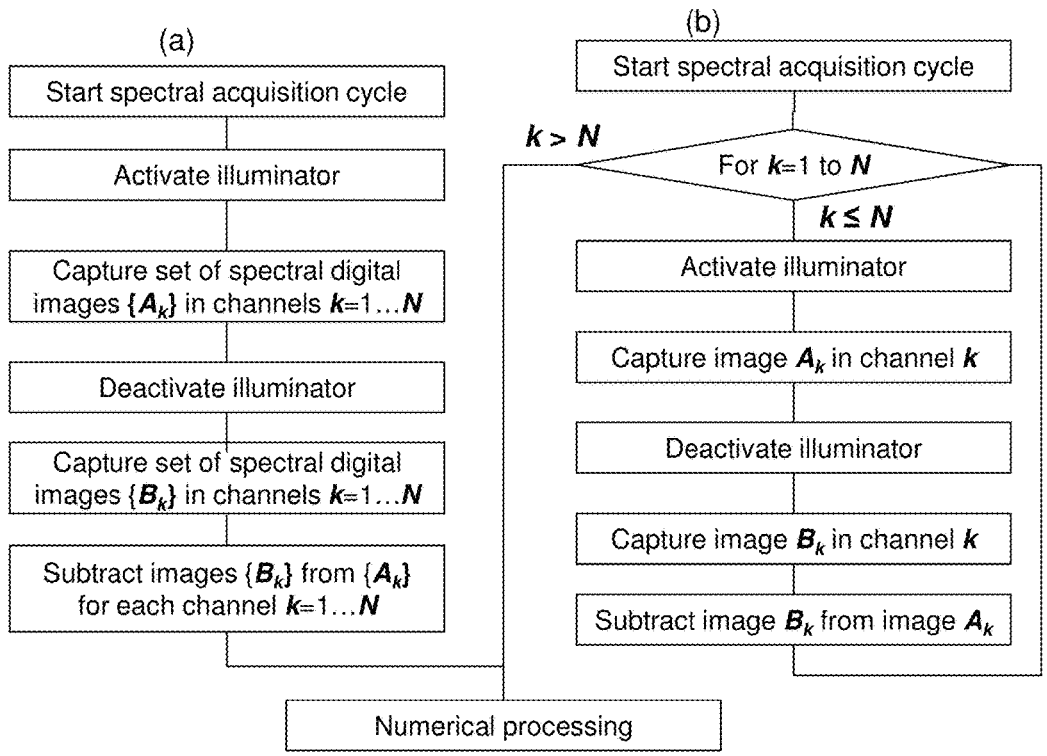
FIG. 14($a$, $b$) provides methods to implement background subtraction by means of processing embodiment PrE4 of the Invention. In ($a$), a first data set $\{A_k\}$ containing all spectral channels is acquired under active illumination, followed by a second data set $\{B_k\}$ acquired without illumination, and a differential data set is obtained by subtracting the images within $\{B_k\}$ from $\{A_k\}$. In an alternative implementation in ($b$), illuminated $A_k$ and unilluminated $B_k$ images of the same scene are acquired and subtracted sequentially for each spectral channel k.

The issue of ambient light immunity is addressed by processing embodiment PrE4 disclosed herein and schematized in FIG. 14. The principle of operation lies in the intensity modulation of the active illuminator AI synchronized with the image acquisition cycle of the spectral camera, so as to obtain spectral images of both an illuminated and unilluminated scene, and then subtract the latter from the former to eliminate the background lighting. The exact algorithm depends on the implementation of the spectral camera, which can be classified in two broad operation modes. The first operation mode will be referred to as snapshot acquisition mode, wherein the camera obtains a complete set of spectral images in channels $Ch_1 \ldots Ch_N$ within a single frame acquisition cycle. Such spectral cameras are disclosed in US Pat. App 20140267849 and 20120327248. Typically, such cameras feature spectral filter arrays overlaying a digital image sensor and associate different pixel groups on the sensor with different spectral channels.

In said snapshot acquisition mode, with reference to the block diagram of FIG. 14(a), a first data set $\{A_k\}$ containing all spectral channels is acquired simultaneously under active illumination, followed by a second data set $\{B_k\}$ acquired without illumination, and a differential data set is obtained by subtracting the images within the second data set from the first.

The second operation mode will be referred to as sequential acquisition mode, wherein the camera obtains a single spectral channel $Ch_k$ within a frame acquisition cycle. Such systems may use a filter wheel as in U.S. Pat. No. 7,835,002 or 8,174,694, or liquid crystal variable filters as in U.S. Pat. No. 8,406,859, or a tunable Fabry-Perot filter that is tuned through different configurations, each defining a spectral channel, as exemplified by WO2014207742. In this approach, a hyperspectral data set is assembled over time. This type of system is useful for ground-based applications wherein the sensor is stationary; a moving platform will cause spectral mis-registration as the spectrum for each pixel is collected over time. Moving objects in the scene will cause mis-registration as well.

In said sequential acquisition mode, with reference to the block diagram of FIG. 14(b), the illuminated $A_k$ and unilluminated $B_k$ images of the same scene are acquired and subtracted sequentially for each spectral channel k.

In the above operations to obtain a differential image between lit and unlit scenes in either snapshot or sequential acquisition mode, division or scaling can also be used in place of subtraction. The acquired spectral data set may form a hyperspectral cube, where images can be stacked according to their wavelength or according to their spectral channel as illustrated in FIG. 18(b), which may or may not be associated with a single spectral band or wavelength as in embodiments ImE1 and ImE2, respectively.

The method of processing embodiment PrE4 requires active illuminator AI to be intensity modulated and synchronized with the image acquisition cycles of the spectral camera. Such modulation can be achieved by precise electronic control to trigger the activation and deactivation of the active illuminator with reference to the readout circuitry of the image sensor or focal plane array of the spectral camera. Furthermore, the type of source used as AI must lend itself to modulation on the millisecond scale, with suitable semiconductor emitters including light-emitting diodes (LED), diode lasers, vertical-cavity surface-emitting lasers (VCSELs), etc., preferably covering the relevant portions of the visible and near-infrared spectral ranges (400-1100 nm in wavelength) where well-established silicon-based image sensors (CCD or CMOS) provide low-cost imaging solutions. Operation in the near-IR range (700-1900 nm) may be preferred with active illuminator AI used as a covert source or to avoid visual disturbance due to stroboscopic effects. Emerging sensor technologies using nanowires or covalent polymer pixels may enable low-cost imaging solutions at infrared wavelengths beyond those of silicon-based sensors. In some applications, it may be advantageous to use laser-based optical frequency combs, with the comb spectrum matched to the characteristic spectral features within the spectral signatures of structural-color tags to be imaged. If operation in the mid-IR range is desired, quantum cascade lasers could be used for active illumination. It is preferable that the divergence of the active illuminator source AI be matched to the field of view FoV of the spectral camera SC. A combination of a hyperspectral imager with a filter wheel and an image projector for active illumination is disclosed in European Pat. EP 2749210. Dichroic filters are proposed for filtering active illumination sources in U.S. Pat. No. 8,792,098.

Figure 1:
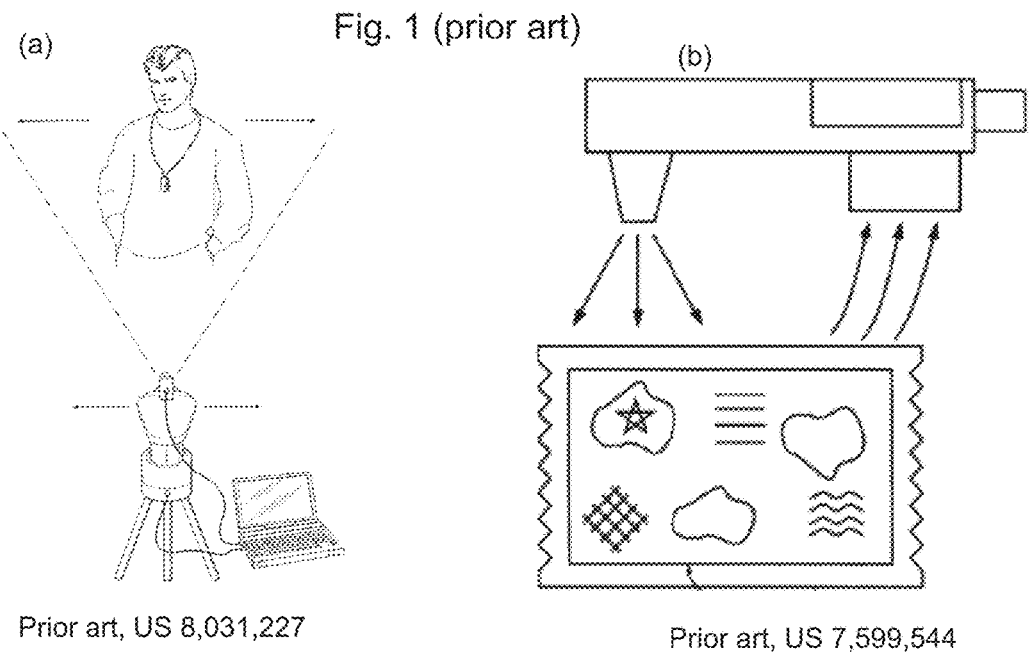
FIG. 1(a) is an illustration of the prior art showing a wearable structural-color tag as per U.S. Pat. No. 8,031,227, while (b) depicts the spectral authentication system disclosed in U.S. Pat. No. 7,599,544.
Figure 2:
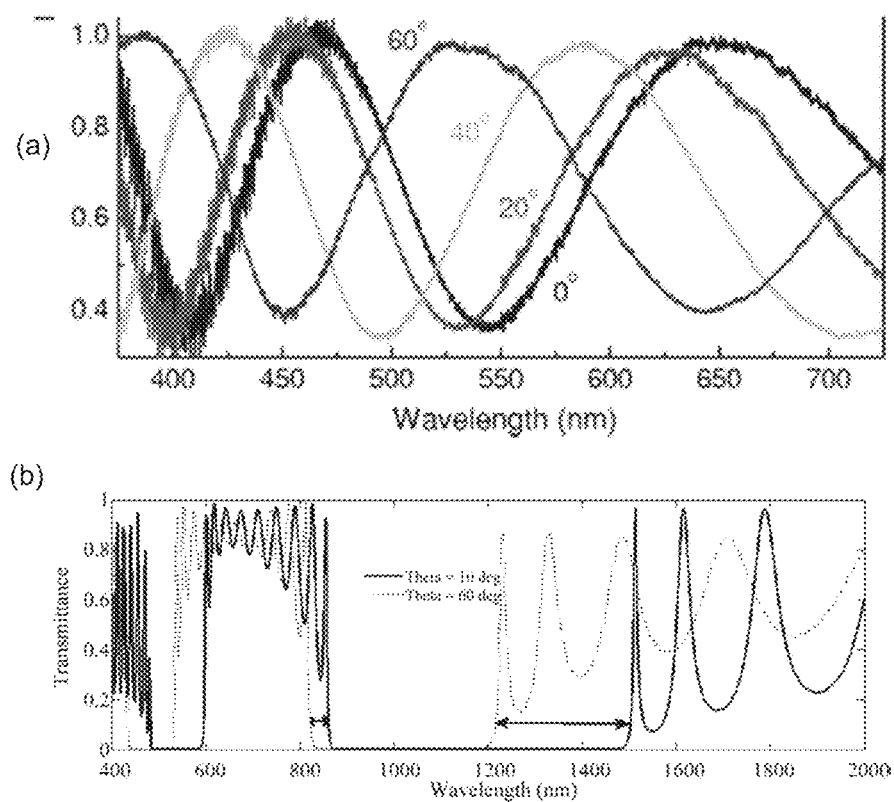
FIG. 2(a) provides an illustration of naturally occurring iridescence, or structural coloration (taken from [1]), while (b) demonstrates the same effect using man-made materials [2]. Both (a) and (b) serve to illustrate the significant spectral shift, or color travel, caused by a variable angle of observation (gonio-dependence).

In the following paragraphs, suitable configurations of the imaging aspect of the Invention will be presented for use in applications requiring orientational or surface profile characterization of tagged entities rather than their identification. Such configurations take advantage of the gonio-dependence of the spectral signatures, with spectral features in the signature drifting towards shorter wavelengths with increasing angle $\vartheta$ as illustrated in FIG. 2. In the specific example of a Fabry-Perot structural-color tag whose spectral signature is defined by Eq.1 with a specific fringe order M, it is possible to correlate the spectral signature shift towards a lower M with the angle of illumination, with the plot of FIG. 15(a) showing a substantially cosine dependence. FIG. 15(a) illustrates the simulated gonio-spectral drift for three Fabry-Perot tags of optical thicknesses D1, D2, D3, each corresponding to a fringe order M at normal incidence, allowing the apparent identification in M of the tag on the ordinate axis to be decoded as an angular reading on the abscissa. A refractive index of the tag medium n=1.5 is assumed. As is evident from the plot, one can choose appropriate Fabry-Perot thicknesses to obtain a desired angular resolution, e.g., large thicknesses with high M would provide a higher angular resolution, especially at small angles.

At the same time, the fringe visibility or contrast, defined as the ratio of a visibility maximum to a visibility minimum (a ratio of unity meaning no contrast), rapidly deteriorates with the angle of illumination as seen in the plot of FIG. 15(b). While many imperfections can contribute to a reduction in the fringe contrast (e.g., a finite reflectivity of the Fabry-etalon surfaces, surface defects or non-parallelism, losses within the etalon medium, illumination beam divergence, etc.), the lateral beam "walk-off" within the etalon has the strongest detrimental effect under oblique illumination as reported in [8]. The walk-off effect depends on the aspect ratio of the resonator (ratio between its thickness D and width W) and is strongest for high D/W ratios. The resulting fringe contrast decay with increasing angle is illustrated in the example of FIG. 15(b) for a case where all Fabry-Perot tag widths are equal to thickness D3 of the thickest of the three tags. It can be seen that the tag geometry and aspect ratio can be optimized to ensure sufficient fringe visibility under illumination within an angular range of interest.

Therefore, the combined requirements of angular resolution of FIG. 15(a) and fringe visibility of FIG. 15(b) should be considered when designing Fabry-Perot structural-color tags for different gonio-resolving applications. For example, a narrow angular interrogation range may be desired to preclude off-axis tag identification for security reasons, or to limit the gonio-spectral drift of FIG. 15(a) by the vanishing tag contrast of FIG. 15(b) so as to prevent tag misidentification at high angles. For applications requiring orientational or surface profile characterization, a combination of several tags with different Fabry-Perot thicknesses or aspect ratios on the same surface or object can be used to obtain surface profile, rotational or orientational information in different angular ranges.

Figure 15:
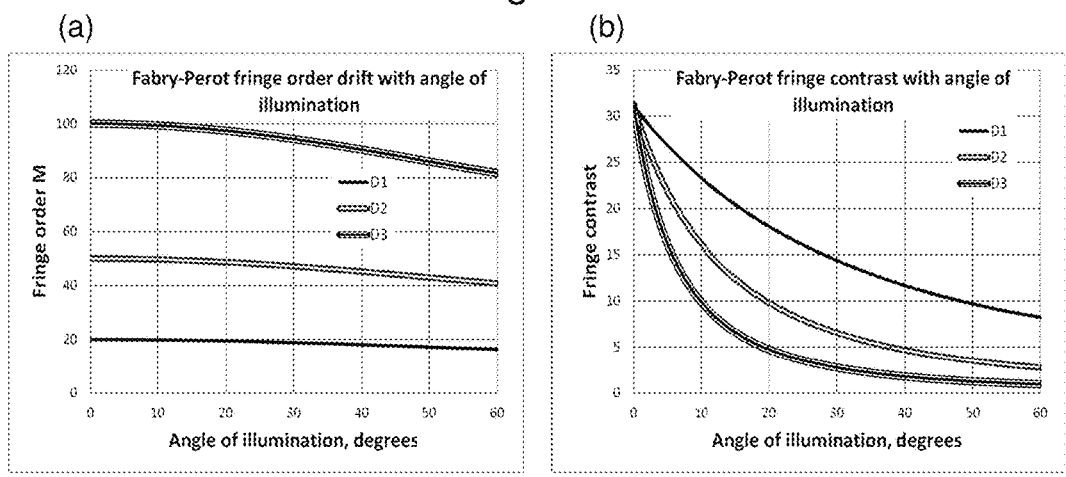
FIG. 15 illustrates the dependence of the fringe order (a) and fringe visibility (b) of Fabry-Perot structural-color tags of various thicknesses on the angle of illumination.
Figure 16:
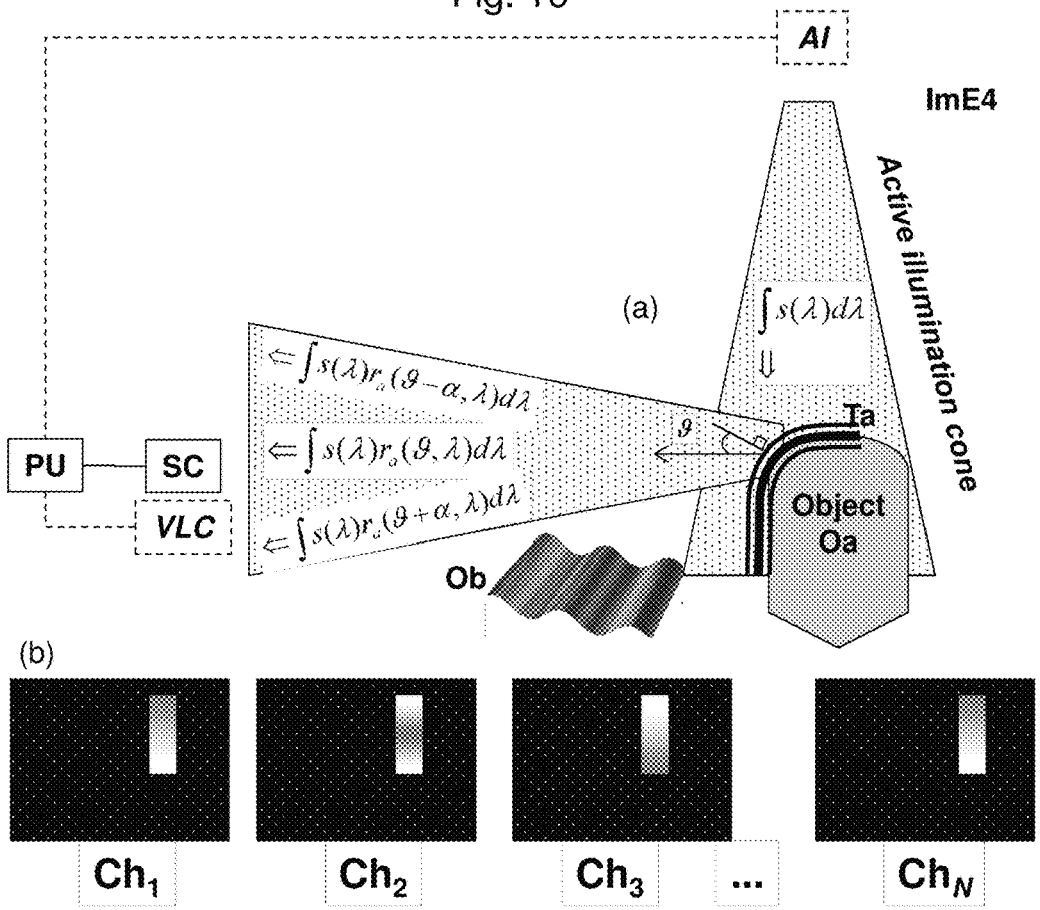
FIG. 16($a$) discloses embodiment ImE4 that enables the stand-off surface or shape profiling of a subject or object Oa whose exterior is covered (e.g., painted over) by a structural-color tag Ta, shown in a side or top view. With active illuminator AI separated from spectral camera SC, graded tag images ($b$) captured in spectral channels $Ch_1$, $Ch_2$ ... $Ch_N$ can be processed to reconstruct the orientation, surface or depth profile of the tag-covered exterior. More complex surface profiles as in object Ob can also be characterized and reconstructed.

The schematic of FIG. 16 presents the forthcoming imaging embodiment ImE4 to demonstrate how the remote angular characterization capability described above could be practised in a real system. In FIG. 16(a), object Oa bears structural-color tag Ta, with a gonio-dependent spectral signature $r_a(\vartheta,\lambda)$, over a whole or part of its surface. It is preferable for such a structural-color tag to cover an extended area of the surface to be characterized, with the tags defined by a structural-color taggant in the format of paint, film, flakes, glitter and the like. In contrast to the setup of FIG. 4, the system of FIG. 16(a) has spectral camera SC (with optional visible light camera VLC) and active illuminator AI observing and illuminating object Oa along substantially different axes, so as to image tag Ta at non-zero angles of illumination and observation. At every illuminated and observable point on tag Ta, there exists a specular reflection angle $\vartheta$ at which the illumination $s(\lambda)$ is deflected towards the spectral camera SC delivering a power proportional to $\int s(\lambda) r_a(\vartheta,\lambda) d\lambda$. In the example of FIG. 16(a), the spectral response of a structural-color tag may be observable over an angular range $2\alpha$ around specular reflection angle $\vartheta$. Any local deformations, protrusions, depressions, shapes, or features of the surface will therefore produce variable-intensity components from $\int s(\lambda) r_a(\vartheta-\alpha,\lambda) d\lambda$ to $\int s(\lambda) r_a(\vartheta+\alpha,\lambda) d\lambda$ that will be readily recorded as variation in the visibility of the corresponding surface features in the spectral images of camera SC as illustrated in FIG. 16(b). In the example of FIG. 16(b), one can see what the spectrally discriminated images of the rounded shape of tag Ta may look like in different spectral channels, with a gradation in visibility corresponding to a variation in angle. From the knowledge of the positions of camera SC and illuminator AI, it is then possible to infer the angular profile of the tagged surface or object on the basis of the spectral signature of every pixel in its image with reference to the gonio-spectral plots of FIG. 15.

The imaging embodiment ImE4 of FIG. 16 can be generalized to cover many different scenarios, e.g., using other forms of structural coloration that, like the Fabry-Perot effect utilized here, exhibit gonio-dependent spectral signatures, in which case a corresponding gonio-spectral plot should be used instead of FIG. 15 for angular decoding. The operation can be extended to imaging complex surface profiles such as those borne by object Ob, which may benefit from having visible light camera VLC provide the illumination intensity distribution to calibrate the spectral images of camera SC.

Figure 17:
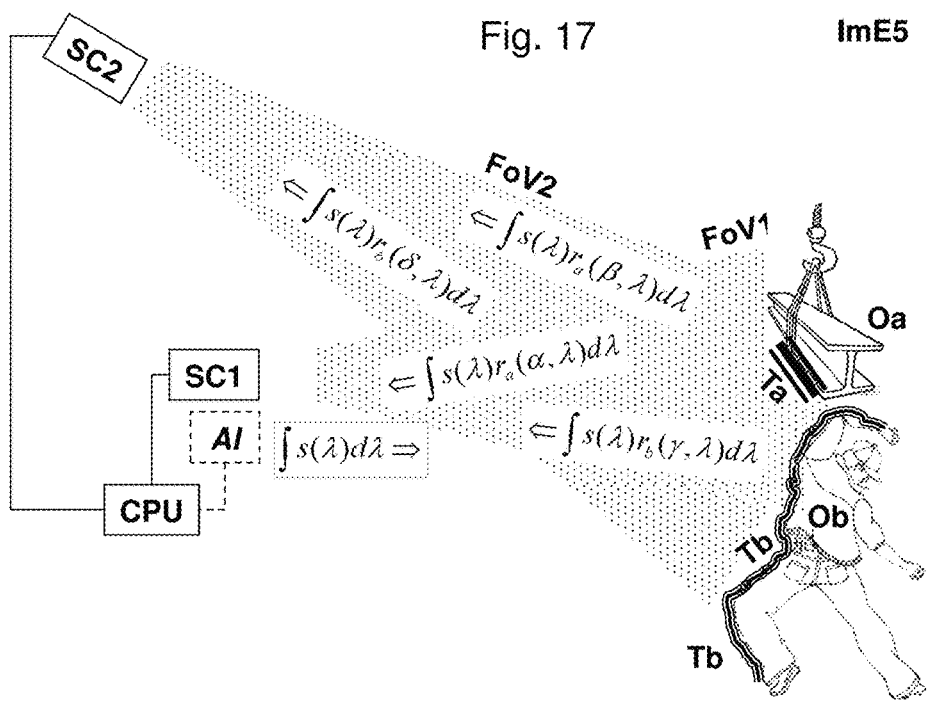
FIG. 17 provides a further imaging improvement ImE5 to the embodiment ImE4 of FIG. 16 by observing a tag-covered object (flanged beam Oa, marked with structural-color tag Ta) and subject (dancer Ob, wearing deformable structural-color tag Tb) with multiple spectral cameras SC1, SC2. The combined tag visibility data from the cameras can provide additional information, such as precise 3D coordinates and angular orientation, to ensure an accurate positioning of beam Oa. Observing a scene with multiple spectral cameras, each imaging dancer Ob at different angles, can provide complementary data to reconstruct his body shape and posture based on the surface or depth profile of his wearable structural-color tag Tb (e.g., as part of clothing).

In a further improvement, it may be desirable to deploy multiple spectral cameras SC1, SC2 . . . with a single active illuminator AI, which is covered by the forthcoming imaging embodiment ImE5 of FIG. 17. The spectral cameras SC1 and SC2 are operatively connected to a central processing unit CPU that performs an analysis of spectral image data acquired from both camera locations. Object Oa (flanged beam) marked with planar structural-color tag Ta having spectral signature $r_a(\vartheta,\lambda)$ is observed by both cameras SC1 and SC2 by virtue of its presence within both of their fields of view FoV1 and FoV2, respectively. Owing to the different angles of observation $\alpha$ and $\beta$, respectively, the two cameras will receive different spectral visibilities of the tag as $\int s(\lambda) r_a(\alpha,\lambda) d\lambda$ optical powers and $\int s(\lambda) r_a(\beta,\lambda) d\lambda$, where the angles $\alpha$ and $\beta$ need not lie in the same plane, i.e., an arbitrary orientation about any axis of rotation is possible. From the knowledge of the positions of cameras SC1 and SC2 and illuminator AI, it is then possible to infer the angular orientation of the tagged surface or object on the basis of the received spectral signatures, e.g., with reference to the gonio-spectral plots of FIG. 15. Furthermore, the combined angular and positional knowledge makes it possible to infer the distance to the tagged object, e.g., by triangulation, thereby providing full 3D positional characterization including all 3 spatial coordinates and 3 rotational coordinates. In the example of object Oa depicted as a flanged beam being loaded by a crane, the observation of its planar structural-color tag Ta by both cameras SC1 and SC2 can remotely provide complete positional information about all six degrees of freedom of the beam (X, Y, Z, pitch, yaw, and roll orientation), which can facilitate its precise loading and placement by the crane operator (or, potentially, render the loading process fully automatic).

The operation of imaging embodiment ImE5 can also apply to non-planar or deformable tags such as distributed tag Tb (e.g., glitter) having spectral signature $r_b(\vartheta,\lambda)$ and covering the clothing of dancer Ob in FIG. 17. Each point on the tagged clothing is perceived as either $\int s(\lambda) r_b(\gamma,\lambda) d\lambda$ or $\int s(\lambda) r_b(\vartheta,\lambda) d\lambda$ corresponding to the observation angles $\gamma$ and $\delta$ of cameras SC1 and SC2. By analogy with the above method, the positional and orientational information on the dancer's body and posture can be deduced from the spectral image data, allowing the dancer's movements to be remotely tracked and recorded, e.g., for dance recreation or gait analysis in a virtual reality environment, or for gesture recognition and control in a human-machine interface. It may also be advantageous to have a visible light camera (shown as VLC in FIG. 16) record the scene from a spectral camera location to complement the spectral image data.

It is desirable that a spectral camera and a visible light camera share a common field of view in the imaging embodiments mentioned above, which will allow the tagged objects identified or characterized by the spectral camera to be associated with their visual appearance in the images captured by the visible light camera. While the two cameras can be placed next to each other, their observation points and fields of view will be somewhat different. UK Pat. GB 2,373,943 teaches a method of combining image sensors with an infrared field of view and a visible field of view to share a common field of view, but where the infrared image sensor is not a multi-channel spectral camera. This type of design is conceptually similar to the well-established single lens reflex camera technology (see, e.g., U.S. Pat. No. 4,047,206) where a common field of view is shared by the image sensor (or photographic film) and the viewfinder.

In this Invention, an option for the integration of a spectral camera and a visible light camera in a single imaging apparatus is provided by the forthcoming imaging embodiment ImE6 and illustrated in FIG. 18. A spectrally broadband image of a scene is formed by imaging optics IFO that may include lenses, apertures, image replicators, filters. The image rays are divided by beamsplitter BS between visible camera sensor VCS and spectral camera sensor SCS, which are both located in the image planes of imaging optics IFO. Disposed between BS and SCS are a plurality of spectral filters SF, or a single filter tunable through a plurality of spectral configurations (e.g., a filter wheel or a tunable Fabry-Perot etalon), to define the spectral channels on spectral camera sensor SCS.

The spectral range analyzed by spectral camera sensor SCS determines the spectral properties of beamsplitter BS. When combined with imaging embodiment ImE2, beamsplitter BS can provide high reflection at angles of incidence of around 45° for wavelengths within specific spectral range SSR, with a high transmission for wavelengths outside this range, i.e., act as a spectrally selective mirror. In another example, if the spectral range analyzed by the spectral camera covers parts of both visible and infrared spectra, beamsplitter BS can be partially transmitting and reflecting to feed the same wavelengths both for imaging by visible camera sensor VCS and spectral analysis by spectral camera sensor SCS. In a case where the spectral ranges perceived by the two image sensors VCS and SCS overlap fully or partially, the reflection spectrum of beamsplitter BS can be engineered to provide higher reflectivities to feed more power to SCS (which typically requires longer exposures due to the spectral filtering involved) within the spectral overlap region, and either maximum transmission (in the visible) or maximum reflection (in the infrared) outside the spectral overlap region. Without loss of generality, the locations of the two image sensors VCS and SCS in FIG. 18 can be swapped with a corresponding reversal of the transmission and reflection requirements for beamsplitter BS.

In summary, imaging embodiment ImE6 enables a registration of tagged objects and their properties as identified by spectral camera sensor SCS onto the image output produced by visible camera sensor VCS. This capability can provide enriched video streams with associated object data, e.g., video frames with metadata on entities present within each frame as well as their properties and location.

The availability of visible spectrum images in imaging embodiment ImE6 can be exploited to augment the amount of spectral data for structural-color tag identification or characterization, which is covered by processing embodiment PrE5 diagrammatized in FIG. 18(b,c). The schematic of FIG. 18(b) provides a graphic representation of a plurality of spectral images recorded in channels $Ch_1 \ldots Ch_N$ of a spectral camera used to form a data set for spectral analysis. If the camera is a hyperspectral one and its k-th channel is associated with a single narrow spectral band centered at wavelength $\Lambda_k$, then such a data set is typically called a hyperspectral data cube, where spatial (X-Y) images of a scene are arrayed along a spectral axis in wavelength $\Lambda$. In the present invention, the channels $Ch_1 \ldots Ch_N$ may define spectral windows of variable spectral width and at irregular intervals as taught in imaging embodiment ImE1, or even a plurality of quasi-periodic spectral windows for each channel as in embodiment ImE2. The variable visibility of a particular spatial pixel in different spectral channels is then used to identify or characterize a structural-color tag in processing embodiments PrE1 and PrE2.

FIG. 18(c) illustrates a much spectrally smaller data set obtained by a visible light color camera. With only 3 primary colors (red, green and blue, or RGB), three further spectral channels are made available for the same pixel (or substantially the same spatial area of the imaged scene), similarly to the larger data cube of FIG. 18(b). Higher spatial resolution and higher frame rates are also usually available with conventional color cameras than with spectral or hyperspectral ones, which is advantageous for providing human-perceptible video output. Visible light cameras with higher color resolution than afforded by conventional RGB imagers can be used here to an advantage, too. Both (b) and (c) serve to illustrate a multi-spectral imaging capability obtained by a combination of data sets (b)+(c). By using the combined data sets obtained with different imagers, especially in different spectral ranges, one can increase the accuracy and reliability of the detection, identification, or characterization of structural-color tags.

In all foregoing imaging embodiments of the Invention, it may be desirable to train the spectral camera in recognizing structural-color tags under different operating conditions as may be encountered in the field. Various tag locations in the field of view, tag angle, orientation, temperature, and illumination conditions should not preclude accurate identification or characterization of structural-color tags. It is therefore the object of the forthcoming processing embodiment PrE6 to teach a method of associating one or more spectral manifestations of a structural-color tag with its identity or property.

In the block diagram of FIG. 19, a camera training cycle implementing the above method is explained. A known structural-color tag is placed at a known spatial location of a scene so that the tag's image occupies known spatial pixel(s) (or region of interest) in the acquired spectral images as FIG. 18(b). The tag's manifestation in the region of interest across different spectral channels may be subjected to numerical processing, which may include operations on pixel values such as scaling, subtraction, normalizing, binning, unmixing, denoising, thresholding, Fourier transform and the like. The resulting spectral data is then stored as a threshold, pattern, code, signature, vector, array or sequence and associated with the tag's identity and/or any of its properties such as angle, orientation, illumination or temperature. Next, any of the tag's properties or conditions are modified, e.g., the tag is rotated through a known angle, or the illumination conditions are changed, or the tag is moved to a different position or distance, and the spectral data acquisition and association process is repeated, and so on. Not all changes or adjustments may need to be performed at each iteration, with optional steps shown in the dashed boxes in FIG. 19. The same training cycle can be performed for all or most parameter variations within the anticipated operational ranges, e.g., of distance and temperature, and for all tags that require accurate identification or characterization.

On completion of the above training mode, the processing unit of a spectral camera can then match newly acquired spectral data with stored data with reference to the identity or property of a known tag to identify or characterize any new instances of the same tag using processing embodiments PrE1 or PrE2.

Tagging Aspect Embodiments

In what follows, various embodiments of the tagging aspect of the Invention will be disclosed with a view to teaching a person skilled in the art to provide structural-color tags for practising the Invention. The term "tag" as used herein in the description and claims refers to an object, or a region of an object that has properties allowing it to perform a tagging, labeling or sensing function. This may be a standalone structure, a sticker, tape, powder, fabric or other element applied to a surface of an object, or may be provided by processing or applying a material to a surface of an object, such as by application of a paint, which imparts the required properties to the surface.

Tag embodiments of the Invention typically contain a photonic taggant, which is formed by one or more photonic structures that impart structural coloration to the tag and define its spectral signature. In some tagging aspect embodiments, a tag may be synonymous with a taggant and simply refer to a quantity of, or surface coverage by, such a taggant. In other embodiments, a tag may include a photonic taggant and other elements such as optics or reflective surfaces.

As noted at the outset, the terms "coloration" and "color" are used here to refer to the generic spectral properties or signatures that may or may not include visible colors. Several methods of imparting structural coloration are known is the art, and some of them will be adapted for use in the tagging aspect of the Invention in the embodiments below.

Figure 20:
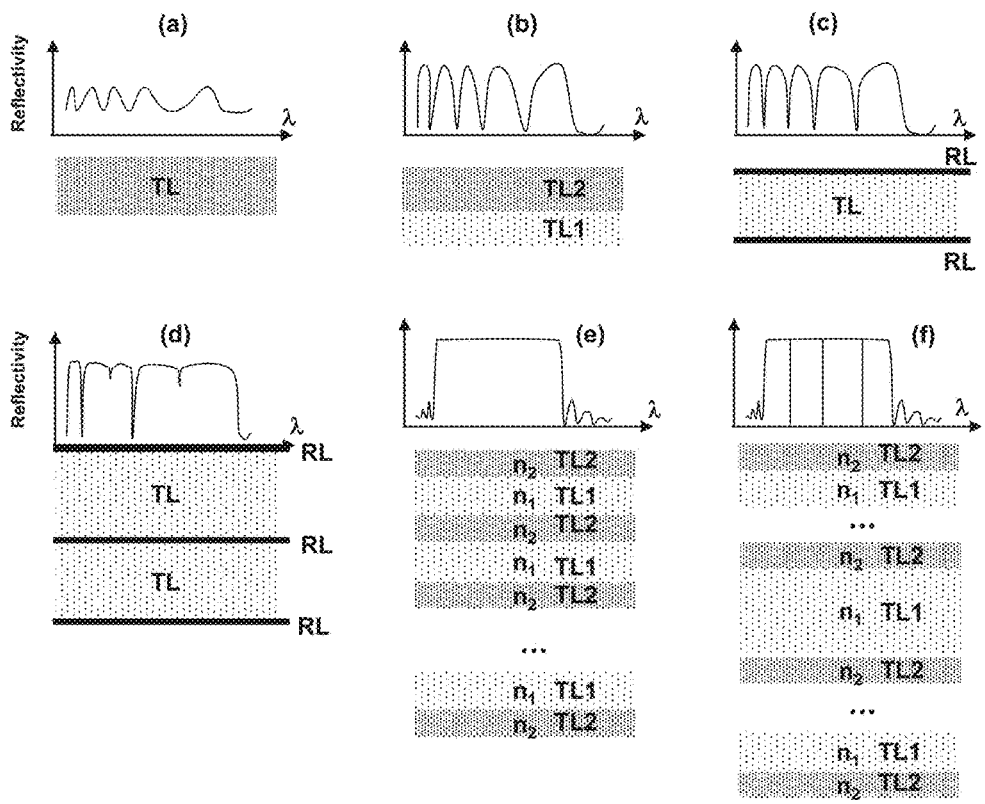
FIG. 20 provides a cross-sectional view (not to scale) of common interferometric thin film and photonic bandgap structures from the prior art, with indicative spectral envelopes achievable with each design. Various photonic structure embodiments are disclosed, where (a) depicts a simple thin film sample formed by a homogeneous transparent layer TL such as polymer or mica; (b) illustrates a Fabry-Perot cavity formed by layer TL1 on top of layer or substrate TL2; (c) shows a Fabry-Perot thin film cavity formed by a transparent spacer TL such as a dielectric bounded by two reflective layers RL of metal such as Al or Cr; (d) shows a stack of transparent layers TL and reflective layers RL, (e) depicts a multilayer structure of periodic alternating layers TL1 and TL2, and (f) is a modification of structure (e) containing an aperiodic layer ("photonic defect") within a stack of alternating layers TL1 and TL2.

One approach includes light interference phenomena that occur in thin films and layers, with principal methods represented in the cross-sectional views and corresponding spectral patterns of FIG. 20. Depicted in (a) is a thin transparent layer TL having a refractive index that is different from that of the surrounding medium, so at to effect a light reflection at its top and bottom interfaces. Its optical thickness may range from a quarter-wavelength to multiple wavelengths according to Eq.1. When illuminated by a substantially collimated optical source, the layer will act as a Fabry-Perot etalon providing quasi-periodic transmission and reflection spectra. Examples of such films include polymer layers such as polyamide and polyurethane, dielectric films such as silica, titanic (anatase or rutile) and zirconia, and thin crystalline plates and platelets, e.g., of natural mica or synthetic mica. However, the reflectivity of the interfaces is insufficient to produce sharp spectra or frequency combs, with only a limited spectral modulation as illustrated in FIG. 20(a).

FIG. 20(b) shows how coating a substrate such as a platelet or flake TL1 with a thin transparent layer TL2 can also create a more pronounced light interference effects, with a larger spectral modulation depth and sharper transitions. Metal oxides of Cu, Zn, Zr, Fe, Cr deposited onto mica, alumina, silica, calcium, aluminum, borosilicate substrates or flakes are now commercially available as interference media, e.g., from Glassflake Ltd., UK, under the name of Moonshine series. Lamellar glass flakes can be processed with wet chemical coating technologies such as Sol-Gel dip coating to apply dielectric and metallic layers for desired optical effects. E.g., AMIRAN glass for architectural applications contains an anti-reflection interferometric coating applied by Sol-Gel technology.

In order to enhance the contrast of the interference fringes produced by a Fabry-Perot etalon, the reflectivity of its mirrors must be increased with a corresponding increase in the etalon's finesse. For this purpose, additional reflecting layers RL can be provided on one or both optical surfaces of the transparent layer TL as shown in FIG. 20(c). Transparent layer TL may be formed by a dielectric layer of $Al_2O_3$, $TiO_2$, $SiO_2$, $MgF_2$, $Nb_2O_5$, BiOCl, $BaTiO_3$, ZnO or a polymer layer of 2-methyl-4-nitroaniline, polystyrene/collodion, polystyrene/polyvinyl alcohol, polymethylmethacrylate, PMMA, PET, polyethylene, polyethylene 2,6 naphthalate (PEN), polyethylene terephthalate, polybutylene naphthalate (PBN), polyester, polyamide, polyurethane. A reflecting layer RL may be formed by thin layers of metals such as Al, Ag, Au, Cu, Cr, Fe, Ni, Zn.

Several such structures can be sandwiched together as in FIG. 20(d), which can provide rarified spectra with fewer spectral lines or sharper features using the models reported in [9]. By using periodic or aperiodic stacks of $MgF_2$ interleaved with thin Ag reflectors as in U.S. Pat. Nos. 6,262,830 and 6,343,167, it is possible to build one-dimensional metal-dielectric photonic bandgap structures with desired spectral properties.

High-reflectivity mirrors can be formed not just by highly reflective metal layers but also stacked combinations of dielectric layers, as taught in US Pat. App. 20130155515. In general, stacked dielectric coatings containing multiple quarter-wavelength pairs of low and high refractive index transparent layers, shown as TL1 and TL2, in FIG. 20(e), have found widespread use in various spectral coating designs, e.g., as taught in U.S. Pat. No. 8,630,040. Their design and implementation are well understood in the art, with many textbooks available, e.g., [10]. With a high index contrast between alternating layers and a large layer count, very high-reflectivity, large-bandwidth reflection bands (known as photonic bandgaps) can be created as illustrated in FIG. 20(e). Such periodic layer stacks are known as Bragg minors and form volume, or bulk, diffraction gratings, where constructive light interference leads to high diffraction efficiencies.

Two quarter-wave stacks combined with a TL1 "spacer" layer between them (typically an integer number of half-wavelengths thick) can be used to form a Fabry-Perot cavity or etalon as explained in [11]. In this design, illustrated in FIG. 20(f), multiple narrow transmission notches can be created inside a broad reflection band. Where the "spacer" layer is half-wavelength thick, a single extremely narrow transmission feature can be defined (known as a "defect" inside a photonic bandgap).

It is worth noting that many other spectral filter and coating designs may also exhibit Fabry-Perot-like spectral modulation in certain spectral regions, e.g., typical bandpass or dichroic thin-film coatings can provide quasi-periodic reflection spectra [known as spectral "ringing" or "ripple" similar to FIG. 10(a)] outside of their specified operational spectral band. In a further example, a quarter-wave stack may exhibit harmonic stopbands at odd harmonics of its main stopband, providing both ripple between the stopbands and a harmonic pattern of multiple stopbands. Therefore, such thin-film designs can also be used to achieve the functionality of "Fabry-Perot tags" according to Eqs.(1) and (2), provided that they are confined to a specific spectral range SSR as discussed previously in several imaging aspects of the Invention.

In order to define a spectral signature, thin film coatings may be operated in reflection as well as transmission mode. In U.S. Pat. No. 5,699,188, stacks of multiple dielectric layers are operated in transmission mode and disposed over a metal mirror to define a specific spectral reflection profile.

A particularly suitable method for the manufacturing of structural-color tags is by roll-to-roll, or web coating technology, where dielectric and/or thin metal layers are evaporated or sputtered onto a roll of polymer film spun at high speed. This technology has been developed for packaging film applications and allows high-throughput coated film production at very low cost. In this technology, the polymer film is typically a PET one, and the materials deposited may include dielectrics such as Al2O3, TiO2, Nb2O5, SiO2, and metals such as Al, Cu, Cr.

Multilayer interference coatings are commonly used for special color travel effects as taught in U.S. Pat. No. 4,705,356. Films containing multiple polymer layers exhibiting dramatic color travel effects when viewed at angles up to 60° are available from 3M Converter Markers under the name of Radiant Light Films. They are formed by hundreds of alternating polymer (PMMA and PET) layers. However, as with most commercially available products, they are designed for operation in a single reflection peak with M=1 in Eq.1 across the visible range, which requires an optical thickness of the order of a quarter wavelength in that range.

To be practicable for use in a tagging aspect of the Invention, the generic interferometric designs of FIG. 20 need to be provided in a format allowing for ease of interrogation by an imaging aspect of the Invention. For example, a configuration where a structural-color tag is defined by a continuous and homogeneous thin film or coating deposited over a surface or area is very inefficient as the tag's surface can only be interrogated under specular observation conditions, i.e., only when the surface or area is so oriented as to reflect any incident optical illumination towards the spectral camera. To resolve this shortcoming, it is an object of tagging embodiment TgE1 to provide a taggant format that allows for much broader interrogation conditions. Tagging embodiment TgE1 takes advantage of the well-established effect pigment technology, where a large plurality of particles such as flakes or platelets suspended in an organic or plastic binder, resin or carrier, can produce spectacular visual appearance changes arising from light interference within the particles. Such pigments are used to create paints, topcoats, sprays, films, etc., and are known as color-shifting, structural color, pearlescent, chameleon, iridescent, opalescent, gonio-apparent, gonio-chromatic, schemochromic, metamaterial, pearl luster, interference, optically variable, or effect pigments. An overview of such pigments can be found in [12].

Figure 21:
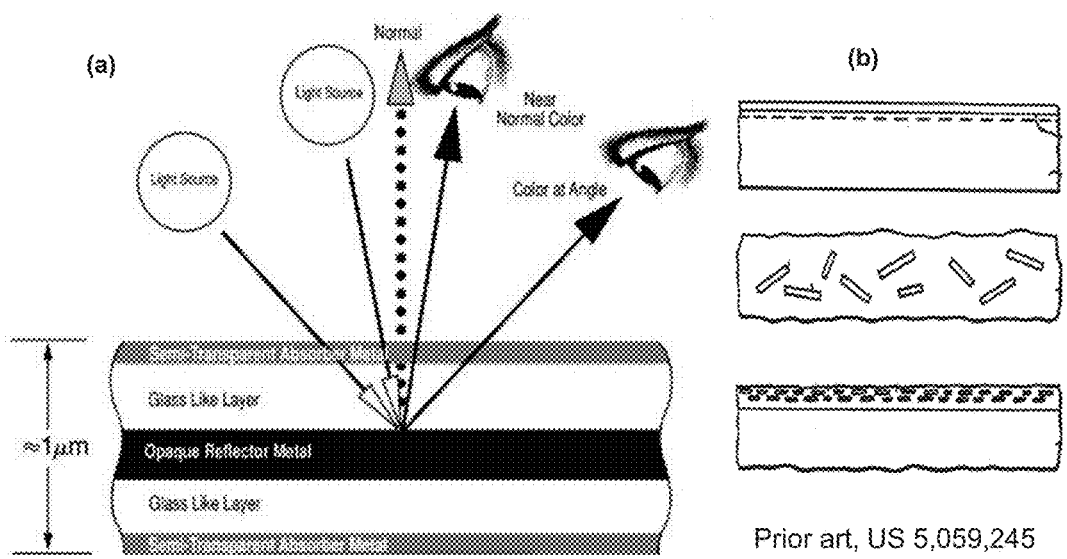
FIG. 21(a) is an illustration of the prior art showing a photonic structure as a flake of an optically variable pigment and the resulting color travel effect, while (b) depicts a process of providing a plurality of flakes on a coated or painted surface as per U.S. Pat. No. 5,059,245.

The operation of a single flake to provide a color travel effect with variable angle of observation is illustrated in a cross-sectional view of FIG. 21(*a*) using the example of the ChromaFlair™ pigment series produced by Viavi, Inc. (formerly, JDSU). It can be seen that the constructive light interference condition is only satisfied for a single color (or wavelength band) given a fixed observation angle. Once the angle is changed, the interference condition selects a different wavelength, or color, to be directed towards the viewer.

Such pigments are available from a number of manufacturers and are an established commercial technology as reviewed in [13]. The fabrication of such pigments is taught in U.S. Pat. No. 5,059,245 and illustrated in FIG. 21(*b*), also in a cross-sectional view. The manufacturing process involves the deposition of ultra-thin layers onto a substrate using physical vacuum deposition (PVD), grinding of the resulting film to produce flakes, suspending the flakes in a binder or carrier, and finally applying the suspended flakes onto a surface or area.

Tagging embodiment TgE1 can employ any interferometric designs of FIG. 20 in structural color pigment format (e.g., as in FIG. 21) but requires several non-trivial and non-obvious modifications to standard effect pigment technology as listed below:

1. The optical thickness of the flakes or platelets in the pigment is increased to effect light interference in high orders with M>1 in Eq.1 across a specific spectral range SSR, which may or may not include the visible range. For operation in the visible to near-infrared SSR and using typical dielectric materials, the physical thickness will be >500 nm, which exceeds the values in conventional effect pigments developed for the visible range;
2. The resulting pigment no longer possesses any decorative appeal or visual color travel effect due to the presence of multiple interference peaks;
3. The lateral size and aspect ratio of the flakes are optimized for specific angular interrogation conditions according to the gonio-spectral plots of FIG. 15;
4. The fabrication and application process should allow for a plurality of orientations of the flakes or platelets with respect to the underlying surface, e.g. by modifying the viscosity of the binder in which flakes are suspended.

Figure 22:
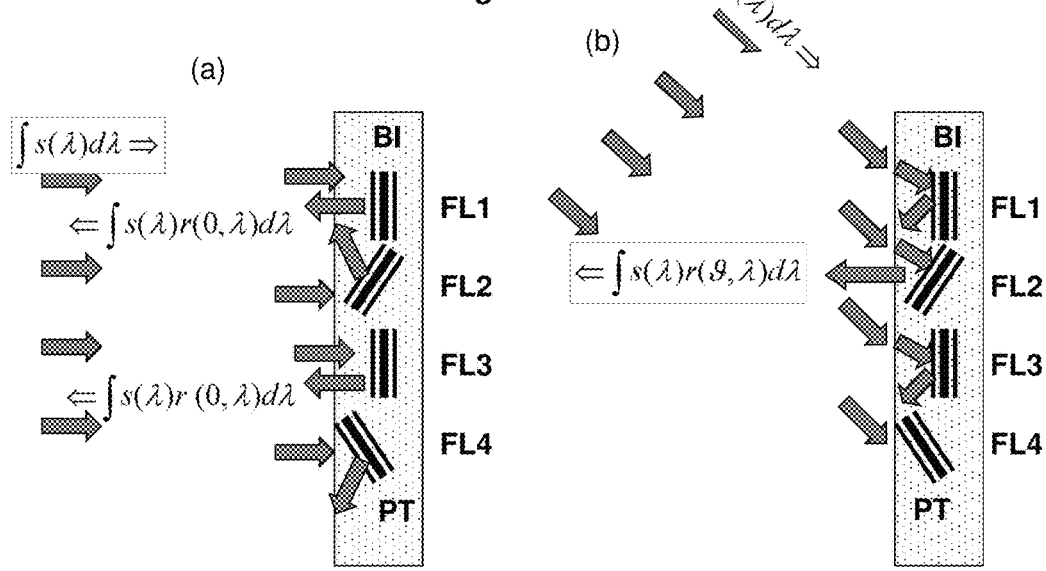
FIG. 22 provides a cross-sectional view (not to scale) illustrating the operation of a photonic pigment referenced as tagging embodiment TgE1, wherein photonic structures are provided as a plurality of flakes FL1,2,3,4 suspended in transparent binder or epoxy BI. In (a), the randomly oriented flakes are illuminated and observed along the same axis resulting in reflection from normally oriented flakes only, thus recording a specific spectral signature associated with normal incidence of illumination. In (b), the flakes are illuminated and observed along different axes resulting in reflection from suitably oriented flakes only, thus recording a different spectral signature associated with angled incidence of illumination.

The last point is illustrated in the schematics of FIG. 22, which shows the operation of photonic taggant PT defined by a structural pigment-coated surface under different illumination/interrogation conditions. The taggant contains a plurality of flakes FL1 . . . FL4 having a spectral signature $r(\vartheta,\lambda)$ and randomly oriented in transparent binder BI. When irradiated by an active illuminator of power $\int s(\lambda)d\lambda$ and observed by a spectral camera along the same axis, only flakes FL1 and FL3 in FIG. 22(*a*) will reflect their spectral signature at normal incidence ($\vartheta=0$) with a return power proportional to $\int s(\lambda)r(0,\lambda)d\lambda$. It is preferable for the flakes to have multiple orientations with respect to the underlying surface, so that the retro-reflection condition can be met by at least some flakes regardless of the surface orientation to the viewer and the return power will remain proportional to $\int s(\lambda)r(0,\lambda)d\lambda$, thus solving the problem of the gonio-dependent drift of structurally colored spectral signatures.

In applications such as imaging embodiments ImE4 and ImE5 where the gonio-dependent drift of structurally colored spectral signatures is desirable for angular measurement, illumination along a different axis from the observation axis will provide a gonio-dependent return power proportional to $\int s(\lambda)r(\vartheta,\lambda)d\lambda$ as is the case for flake FL2 in FIG. 22(*b*). Here, too, a plurality of flake orientations are desirable to ensure a high reflection signal arriving at a spectral camera and carrying a specific angular-shifted spectral signature defined by the illumination and observation directions relative to suitably oriented flakes. The variations in the angular shift of the reflected spectral signatures resulting from the various positions of the flakes on the surface or area can be correlated with the surface profile and/or its orientation as elucidated by imaging embodiments ImE4 and ImE5.

As described above, tagging embodiment TgE1 employs a plurality of reflective flakes or platelets to obtain a spectral signature that is gonio-independent provided that tag illumination and observation are performed substantially along the same axis (retro-reflection) as is the case in FIG. 22(a). However, the number of suitably oriented flakes or platelets can be small resulting in a low return signal $\int s(\lambda) r(0,\lambda) d\lambda$, which may limit the reading range of such a tag to just a few meters, probably, 10 meters. It is an object of forthcoming tagging embodiment TgE2 disclosed herein to provide a structural-color tag with both a high return efficiency for an extended reading range of up to 300 meters and a spectral signature free of angular drift.

Figure 23:
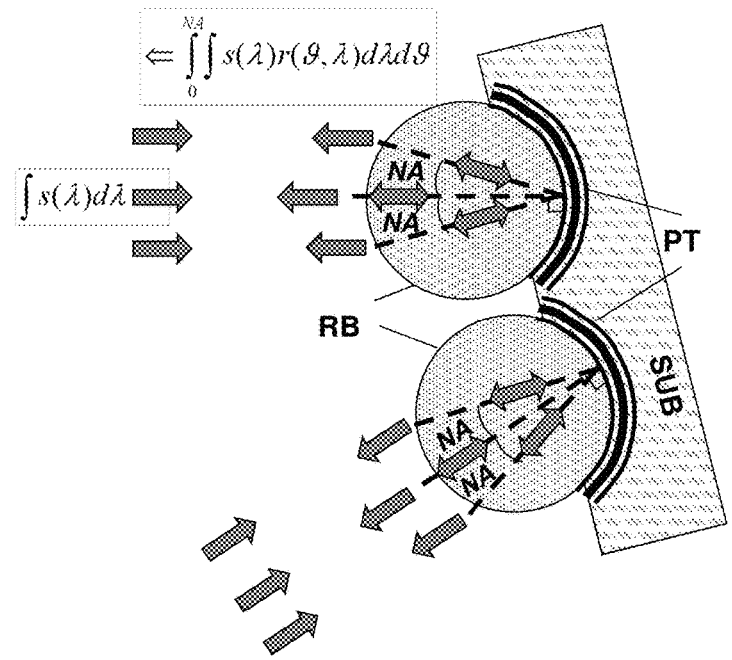
FIG. 23 provides a cross-sectional view (not to scale) of another tagging embodiment TgE2 of the Invention incorporating photonic taggant PT covering the rear surface of retroreflecting glass beads RB attached to substrate SUB.

Tagging embodiment TgE2 is illustrated in FIG. 23 and is suited to a retro-reflecting configuration, i.e., when the tag illumination and observation directions are substantially coaxial, which is achieved when active illuminator AI is co-located with spectral camera SC as illustrated in FIG. 3 and FIG. 4.

In the tag construction of FIG. 23, photonic taggant PT (preferably, of thin film coating type) having a reflective spectral signature $r(\vartheta,\lambda)$ is deposited over the rear surface of retroreflecting glass beads RB embedded in substrate SUB. The tag is constructed from a large plurality of retro-reflective beads RB. If the beads are manufactured of high-index glass with refractive index n approaching 2 (e.g., n≈1.9 for barium titanate glass), then the beads will act like spherical lenses and exhibit a cat's eye behavior, with the refracting rays focused onto and reflected from taggant PT with high efficiency. The two beads in the drawing receive illumination from two different directions, and retro-reflect spectrally filtered light defined by a superposition of the reflection spectra of taggant PT under illumination over the angular range corresponding to the numerical aperture NA of the bead lens. Such a superposition results in a high return signal that is proportional to $$\int_0^{NA} \int s(\lambda) r(\vartheta, \lambda) d\lambda d\vartheta,$$

where the inner integral is taken in wavelength over specific spectral range SSR and the outer integral is taken in angle over the range of angles of incidence onto the taggant PT within the confines of the bead NA. For small NA, the angular smearing of the taggant's spectral signature within the outer integral is insignificant and will produce an angle-averaged spectral signature $$\int_0^{NA} r(\vartheta, \lambda) d\vartheta.$$

Figure 24:
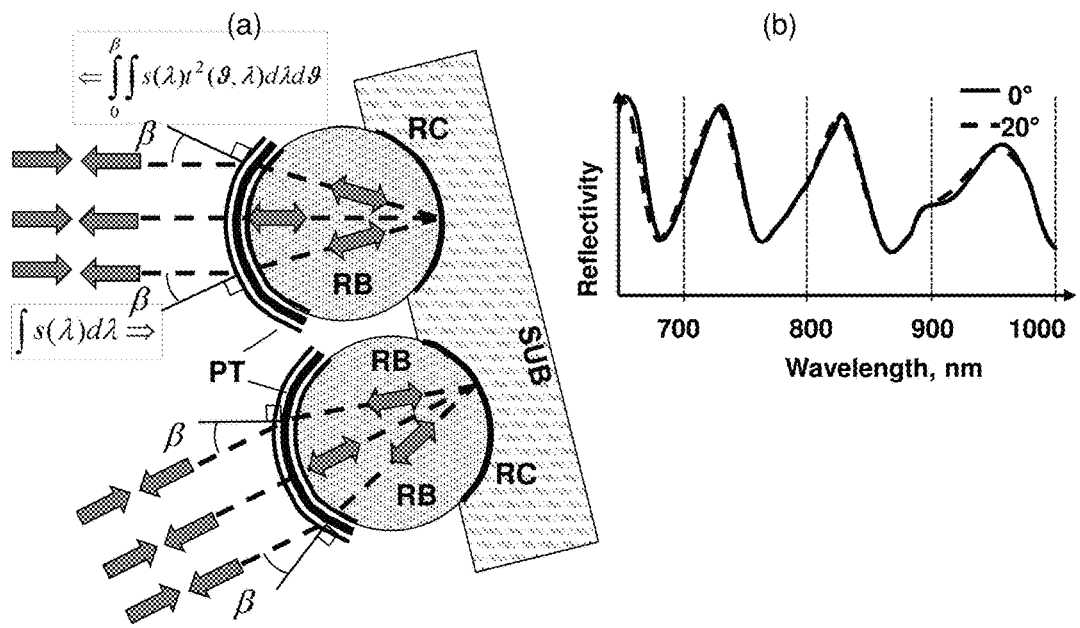
FIG. 24(a) provides a cross-sectional view (not to scale) of an alternative implementation of tagging embodiment TgE2 of the Invention wherein photonic taggant PT is deposited over the front surface of retroreflecting glass beads RB attached to substrate SUB. (b) shows the results of an optical simulation of a tagging aspect of the Invention of FIG. 23 (embodiment TgE2) wherein the spectral signature undergoes little or no change with the angle of observation up to 20°.

An alternative implementation of the same tagging embodiment TgE2 is presented in FIG. 24(a), where photonic taggant PT (preferably, of thin film coating type) having a transmission spectral signature $t(\vartheta,\lambda)$ is deposited over the front surface of retroreflecting glass beads RB embedded in substrate SUB. Depending on the refractive index of the bead and substrate materials, a broadband reflective coating RC may or may not be deposited over the rear surface of beads RB. The two beads in the drawing receive illumination from two different directions, and retro-reflect the spectrally filtered light proportional to superposition $$\int_0^{\beta} \int s(\lambda) t^2(\vartheta, \lambda) d\lambda d\vartheta$$

of the double-pass transmission spectra $t^2(\vartheta,\lambda)$ of taggant PT under illumination over a specific angular range β, the latter being defined by the extent of the PT's coverage of the bead surface. Such a superposition defines an angle-averaged spectral signature $$\int_0^{\beta} t^2(\vartheta, \lambda) d\vartheta$$

that is substantially gonio-independent, i.e., invariant with the angle of observation. This implementation can offer an increased spectral filtering, and a sharper spectral signature, by virtue of the double-pass of the interrogation light through photonic taggant PT.

The simulation of FIG. 24(b) applies both to the tag design of FIG. 23 and FIG. 24(a). It simulate the tag's spectral signature for two angles of illumination/observation (0° and 20°) with taggant PT defined by a photonic-engineered thin film structure. As the bead effectively limits the angular range of light incident on taggant PT, the spectral signature of FIG. 24(b) is substantially gonio-independent, i.e., invariant with the angle of observation (or the tag's angle relative to the camera) within ±20° to normal. In this context, "substantially invariant" is defined as a wavelength blue-shift of <1%, which means that the variation is sufficiently small that the spectral signature is still "readable" and/or not confusable with another signature read in a perpendicular direction. This functionality is highly desirable for tag identification and sensing applications, where tagged entities must be recognized regardless of their orientation to the spectral camera and active illuminator. Furthermore, the retro-reflecting tag configuration allows for high discrimination against ambient light, as the light emitted by co-axial active illuminator AI will return to spectral camera SC with high efficiency.

A further retro-reflecting configuration is disclosed herein as tagging embodiment TgE3 to provide a structural-color tag with a high return efficiency, an extended reading range, and a spectral signature free of angular drift. This embodiment takes advantage of the well-established lenticular printing technology developed for visual and 3D graphics applications and adapts it to create a structural-color tag.

Figure 25:
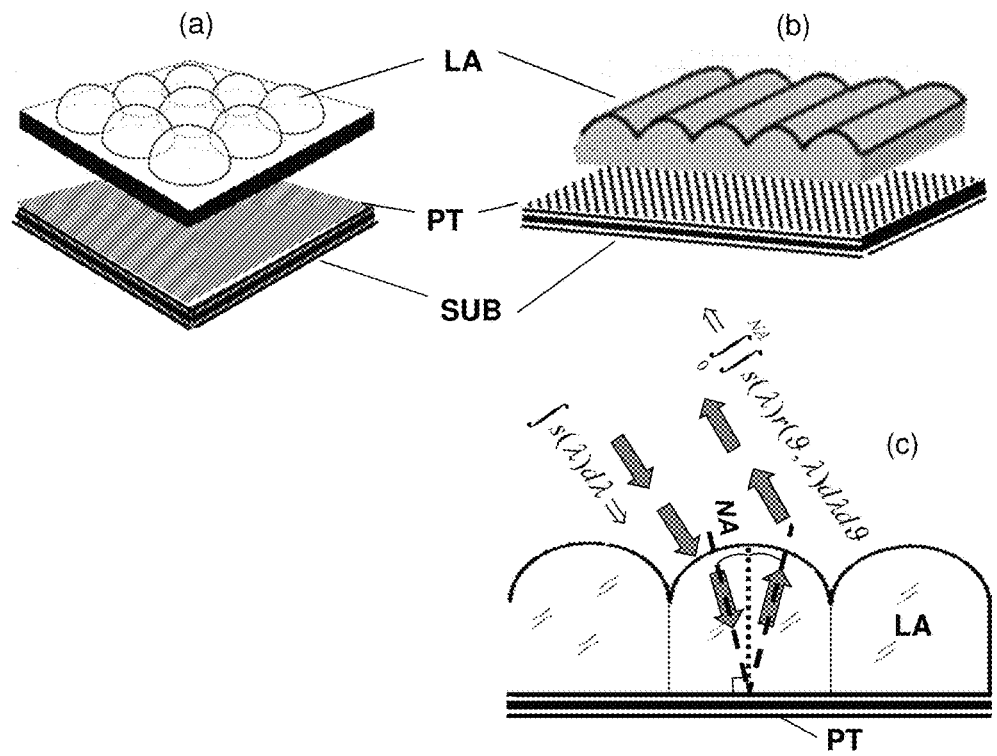
FIG. 25 illustrates two alternative constructions (a) and (b) of tagging embodiment TgE3 of the Invention, wherein photonic taggant PT is disposed onto substrate SUB underneath a lenticular lens or lenticular array LA. A cross-sectional view of both constructions (a) and (b) is given in (c).

Structural-color tags according to tagging embodiment TgE3 are illustrated in FIG. 25 and contain a substrate SUB coated with photonic taggant PT (preferably, of thin film coating type) having a reflective spectral signature $r(\vartheta,\lambda)$ and disposed in the focal plane of a lenticular lens or lenticular array LA. In (a), the lenticular array incorporates fly-eye or dot lens elements, whereas (b) exemplifies cylindrical or rod lens elements. The choice between configurations (a) and (b) can be made on the grounds of manufacturability, cost, and angular interrogation requirements. One may want to use cylindrical configuration (b) if the angular spectral drift only needs to be cancelled in one rotation axis, e.g., to implement a tag for providing gonio-dependence in a specific orientation only. Either configuration (a) or (b) can be produced by lens molding in a plastic substrate. As suggested in [14] and U.S. Pat. No. 6,795,250, the lenticular surface should be conic or elliptical rather than purely spherical to minimize aberrations.

In (c), there is provided a cross-sectional view (not to scale) of lenticular array LA according to either (a) or (b) to illustrate the operation of the embodiment. The ray arrows illustrate the retro-reflection of the spectrally filtered light defined by a superposition $$\int_0^{NA}\int s(\lambda)r(\vartheta,\lambda)d\lambda d\vartheta$$

of the reflection spectra of taggant PT under illumination over the angular range corresponding to the numerical aperture NA of the lens element. As in tagging embodiment TgE2, such a superposition defines a spectral signature $$\int_0^{NA} r(\vartheta,\lambda)d\vartheta$$

that is substantially gonio-independent.

In an alternative implementation, substrate SUB can be a broadband reflector and the photonic taggant PT operated in transmission rather than reflective mode, with a spectral signature defined by $t(\vartheta,\lambda)$. By analogy with an earlier disclosure, the resulting tag's spectral signature will be given by a double-pass transmission through the taggant $$\int_0^{NA} t^2(\vartheta,\lambda)d\vartheta,$$

which is substantially gonio-independent. In a yet further modification, the transmitting photonic taggant PT may overlay the lenticular surface rather than be disposed in the focal plane, which will average the spectral response over an angular range corresponding to the acceptance angle of the lens, by analogy to the operation of FIG. 24(a).

In summary, tagging embodiment TgE3 lends itself to high manufacturability and low cost by virtue of the ease of photonic taggant definition on a planar substrate (e.g., by physical vacuum deposition) and alignment-free attachment of lenticular lenses. At the same time, the adaptation of lenticular printing technology to create a structural-color tag with a spectral signature defined by photonic engineering is non-obvious and has not been reported in the art.

In applications such as imaging embodiments ImE4 and ImE5 where gonio-dependent drift is desirable for angular measurement, it may be advantageous to co-locate a spectral camera and active illuminator. In the example of FIG. 17 described earlier, that would correspond to the location of spectral camera SC1 and active illuminator AI, which are used to establish the angular orientation of object Oa by means of its planar structural-color tag Ta. It is an object of forthcoming tagging embodiment TgE4 disclosed herein to provide a structural-color tag with both a high return efficiency and a spectral signature with enhanced angular drift for high-resolution angle measurement.

Figure 26:
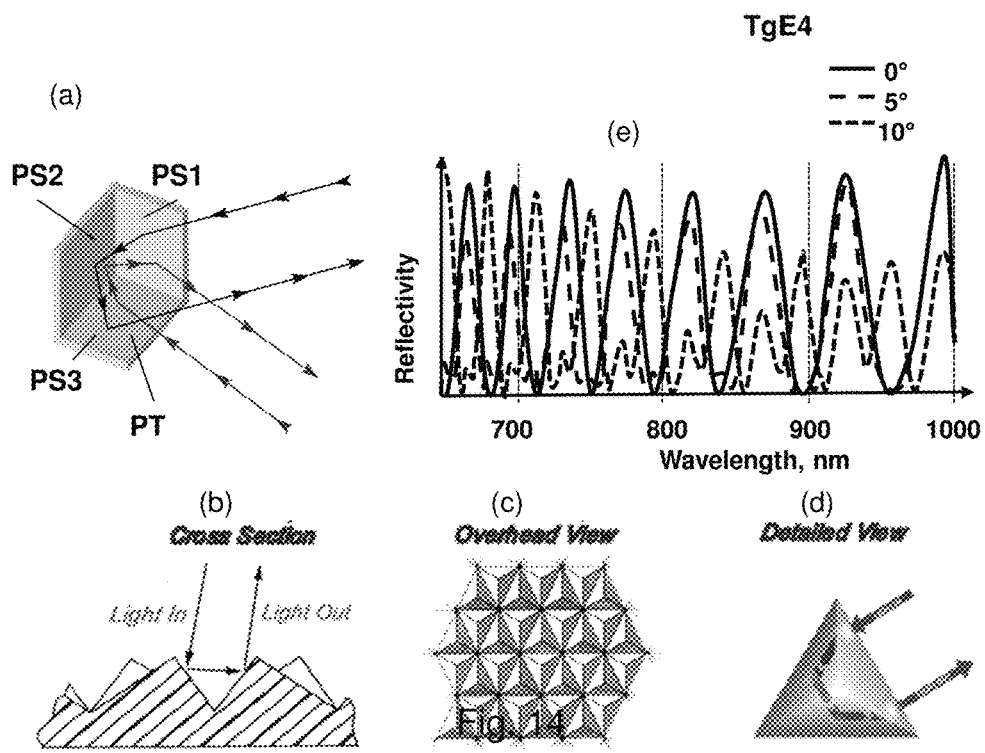
FIG. 26(a) provides a summary of common optical retroreflector designs established in the prior art based on corner-cube (a) and prismatic (b, c, d) configurations. These configurations can be combined with photonic film designs disposed on prismatic surfaces PS1, PS2, PS3 to form a multi-axis angle sensor disclosed as tagging embodiment TgE4. (b) shows the results of an optical simulation, wherein the spectral signature undergoes a significant change even with a small change in the angle of observation in any axis.

In a structural-color tag according to tagging embodiment TgE4 of the Invention depicted in FIG. 26(a), photonic taggant PT is deposited over the prismatic surfaces PS1, PS2, PS3 of a prismatic, or corner-cube retroreflector structure. A prismatic retroreflector such as that disclosed in U.S. Pat. No. 7,703,931 contains cells of orthogonal reflective surfaces that retro-reflect incident rays in three axes. Other prismatic sheeting geometries are possible, e.g., using triangular tiling, as shown in the different views of FIG. 26(b,c,d). Here, too, photonic taggant PT is applied over all optical surfaces, which can be achieved with standard vacuum deposition technology.

The schematic of FIG. 26(a) illustrates the ray retro-reflection through 180° as it strikes the 3 prismatic surfaces, for two different incidence directions. As each reflection occurs at close to 45°, the spectral signature imparted at each reflection is strongly shifted and exhibits high angular sensitivity according to the gonio-spectral plot of FIG. 15(a). On completing the three reflections, the rays carry a convolution of the three different spectral signatures, which is even more sensitive to minor angular shifts.

The strong gonio-dependence of the spectral signature of a spectral tag according to tagging embodiment TgE4 is simulated in FIG. 26(e) for three angles of incidence (0°, 5° and 10°) using a Fabry-Ferot-type photonic taggant PT. It can be seen that even for a small 5° deviation from normal incidence, a very pronounced change in the resulting spectral signature is observed, which allows one to infer the angular orientation of a tagged surface or object with high angular resolution.

In many orientation-sensing applications, angle information is needed for each rotation axis. However, tagging embodiment TgE4 presented above produces a convoluted spectral signature that may only provide partial information about the degree of rotation in each axis.

It is therefore desirable that angle-dependent change be pronounced in one rotation axis only and the spectral signature remain invariant on rotation about the other axes. This need is addressed by a structural-color tag according to tagging embodiment TgE5, which provides a uniaxial rotation sensor.

Figure 27:
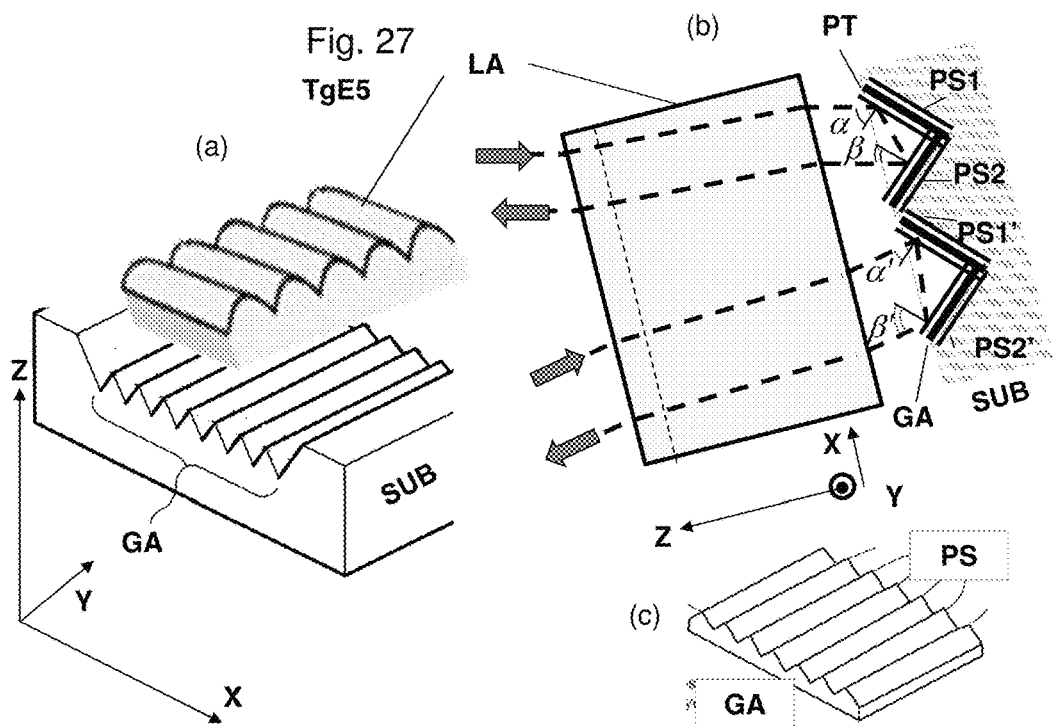
FIG. 27 discloses an uniaxial angle sensor enabled by tagging embodiment TgE5 incorporating photonic taggant PT disposed over the prismatic surfaces PS of groove array GA, defined in substrate SUB overlaid by lenticular array LA. The tag structure is shown in an isometric view in (a), and in a cross-sectional view in (b). The configuration of groove array GA is given in more detail in (c).

Tagging embodiment TgE5 of the Invention is diagrammatically depicted in FIG. 27. It incorporates photonic taggant PT disposed over the prismatic surfaces PS of groove array GA, defined in substrate SUB overlaid by cylindrical lenticular array LA. The tag structure is shown in an isometric view in FIG. 27(a), and in a cross-sectional view in FIG. 27(b). In this geometry, the tag is rotation-sensitive in the Y-axis, and rotation-invariant in the X and Y axes. The configuration of groove array GA is given in more detail in FIG. 27(c) and contains orthogonal prismatic reflection surfaces PS1, PS2 forming isosceles right-angle prisms. The prism vertex should lie in the focal plane of lenticular array LA, with LA and GA being orthogonal to each other. Photonic taggant PT is deposited over the prismatic surfaces PS1, PS2 (or PS1', PS2') defined in substrate SUB.

FIG. 27(b) illustrates the tag operation using a cross-sectional view orthogonal to the Y-axis where a strong angular shift of the spectral signature is desired. The top and bottom grooves in the drawing receive illumination from two different directions, and retro-reflect spectrally filtered light defined by a superposition of the reflection spectra of taggant PT defined by incidence angles $\alpha$, $\beta$ (or $\alpha'$, $\beta'$) at each surface PS1, PS2 (or PS1', PS2'), with $\alpha+\beta=90°$ (or $\alpha'+\beta'=90°$). Since both angles $\alpha$ are $\beta$ (or $\alpha'$, $\beta'$) are close to 45°, the spectral signatures are strongly shifted and have high angular sensitivity according to the gonio-spectral plot of FIG. 15(a). The resulting spectral signature of the top retroreflector PS1, PS2 is the product of the two reflections $r(\alpha,\lambda)r(90°-\alpha,\lambda)$ and has an even higher angular sensitivity. Under illuminating power $\int s(\lambda)d\lambda$, the spectral response $\int s(\lambda)r(\alpha',\lambda)r(90°-\alpha',\lambda)d\lambda$ of the bottom groove formed by PS1', PS2' that is illuminated and observed at a different angle will be very different from the top groove $\int s(\lambda)r(\alpha,\lambda)r(90°-\alpha,\lambda)d\lambda$.

Figure 28:
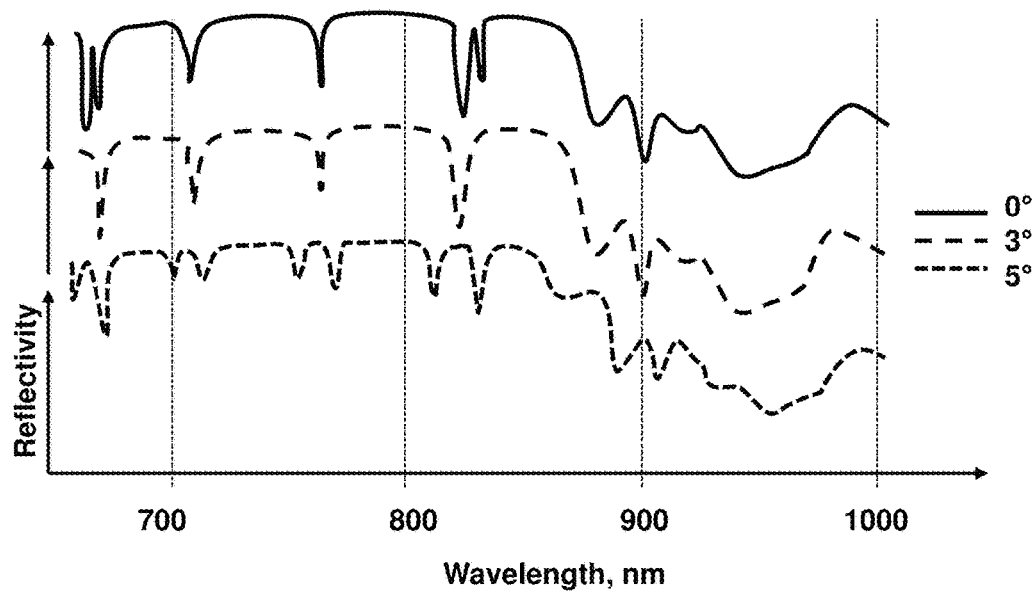
FIG. 28 shows the results of an optical simulation of the embodiment of FIG. 27 (TgE5), wherein the spectral signature undergoes a significant change even with a small change in the angle of observation in one axis.

The strong gonio-dependence of the spectral signature of a spectral tag according to tagging embodiment TgE5 is simulated in FIG. 28 for three angles of incidence (0°, 3° and 5°) versus the underlying substrate SUB obtained by rotating the tag about the Y axis. In the simulation, the taggant PT is defined by a periodic Bragg thin-film structure with a thick "photonic defect" layer, resulting in a sharp comb spectrum as illustrated in FIG. 20(f). The convolution of two comb spectra arising from two reflections, each at a different angle, provides a highly sensitive measure of angular shift, which is akin to dual-comb spectroscopy techniques used for precision spectroscopic characterization.

It can be seen from the graph of FIG. 28 that even for a small 3° deviation from normal incidence, a very pronounced change in the resulting spectral signature is observed, which allows one to infer the angular orientation of a tagged surface or object with high angular resolution in the axis of interest.

Conversely, in a cross-section orthogonal to the angle-invariant X-axis, the tag will look similar to the view of FIG. 25(c) and operate substantially in a gonio-independent fashion in that axis. Indeed, the constant path length of any ray reflected by right-angle prismatic surfaces PS1, PS2 always matches the focal length of cylindrical lenticular array LA thus ensuring retro-reflection of parallel rays. When simulated using the setup of FIG. 28, no angular spectral dependence whatsoever was observed under tag rotation about either of the invariant axes X or Z.

Therefore, tagging embodiment TgE5 provides a highly sensitive uniaxial optical rotation sensor that has a high retro-reflecting light return efficiency and lends itself to many rotation sensing and encoding applications. Several uniaxial optical rotation sensors according to TgE5, each positioned in a different orientation, can provide angular readout in different rotation axes and thus enabling a complete angular characterization solution.

The orientation sensing capabilities demonstrated by the foregoing tagging embodiments TgE4 and TgE5 of the Invention can be extended to include sensing of other parameters of interest such as temperature, humidity, gas or chemical agent concentration, strain and deformation. As with angular sensing, the same operation principle will apply: to translate changes in a parameter of interest into corresponding changes in the tag's spectral signature.

To enable such functionality, tagging embodiment TgE6 is disclosed herein that allows sensing of different parameters of interest. Embodiment TgE6 is substantially similar to retro-reflecting tagging embodiments TgE2 (FIG. 23) and TgE3 (FIG. 25) disclosed earlier with one important difference: replacing or overlaying photonic taggant PT is a sensing layer SL. Sensing layer SL changes its optical properties in response to a parameter of interest and can be implemented using different materials exhibiting such sensitivity.

Figure 29:
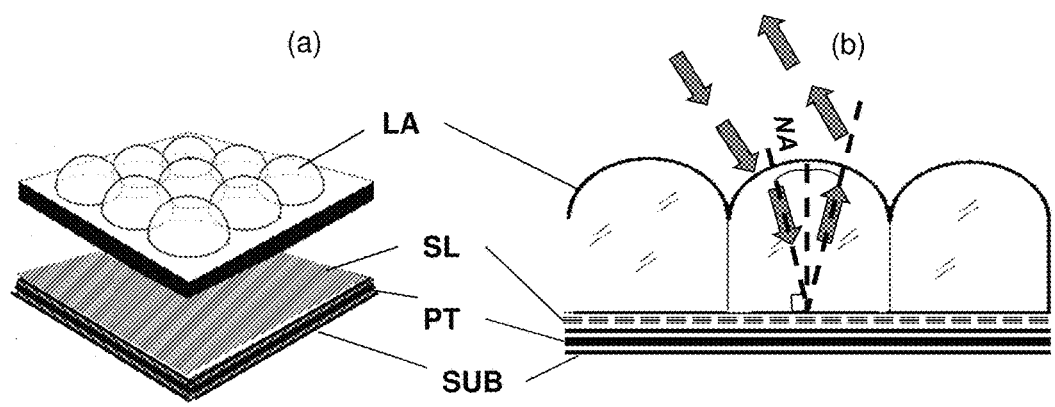
FIG. 29 discloses a sensor design as tagging embodiment TgE6 in a tagging aspect of the Invention, wherein photonic taggant PT and sensing layer SL are disposed onto substrate SUB underneath a lenticular lens or lenticular array LA.

Tagging embodiment TgE6 is exemplified here as a passive, wireless, optical temperature sensor. The tag configuration is preferably that of FIG. 29, which shares a similar design and operating principle with embodiment TgE3, which was explained earlier in reference to FIG. 25. However, shown in FIG. 29 is an additional sensing layer SL that overlays photonic taggant PT and imparts thermal sensitivity to the tag's spectral signature.

In this example, sensing layer SL comprises thermochromatic liquid crystals TLC in a twisted nematic phase that have their molecules oriented in layers with regularly changing orientation, which gives them periodic spacing. The light passing through the crystal undergoes Bragg diffraction on these layers, and the wavelength with the greatest constructive interference is reflected back. A change in the crystal temperature can result in a change of spacing between the layers, or crystal lattice, and therefore in the reflected wavelength.

Microencapsulated TLC material is generally prepared by microencapsulating cholesteryl estercarbonates or chiral nematic aryl compounds in polymeric spheres. Techniques used for microencapsulation are set forth in [15]. Several commercially available TLC materials are sold by Hallcrest Products of Glenview, Ill. These materials are generally transparent at room temperature. Upon heating, the materials selectively reflect light of different colors, beginning with red at low heat, and passing through the other colors of the visible spectrum upon calescence, until the material again becomes transparent at a higher temperature. The apparent color is structural and depends on the observation angle, hence TLC-based thermal indicators should be viewed at normal incidence only.

The spectral changes in TLC with temperature are published in [16] and are given here in the charts of FIG. 30(d), with the spectra blue-shifting with increasing temperature. While spectral analysis has been used in the art to correlate TLC spectra with temperature, no attempt at automatic identification or tracking of a TLC-based thermal sensor tag has been reported. Indeed, such a task would be highly challenging, as the spectral shapes of FIG. 30(d) lack high-contrast characteristic features that would easily differentiate TLC from background materials.

Tagging embodiment TgE6 of FIG. 29 solves the above identification issue by providing a photonic taggant PT exhibiting sharp characteristic spectral features and/or a frequency comb with high spectral modulation depth, preferably using one of the designs of FIG. 20(c,d,e,f). Furthermore, it also solves the gonio-dependence issue of the perceived TLC color by placing TLC in the focal plane of lenticular array LA, which restricts and fixes the angular range of radiation incident upon the TLC layer.

Figure 30:
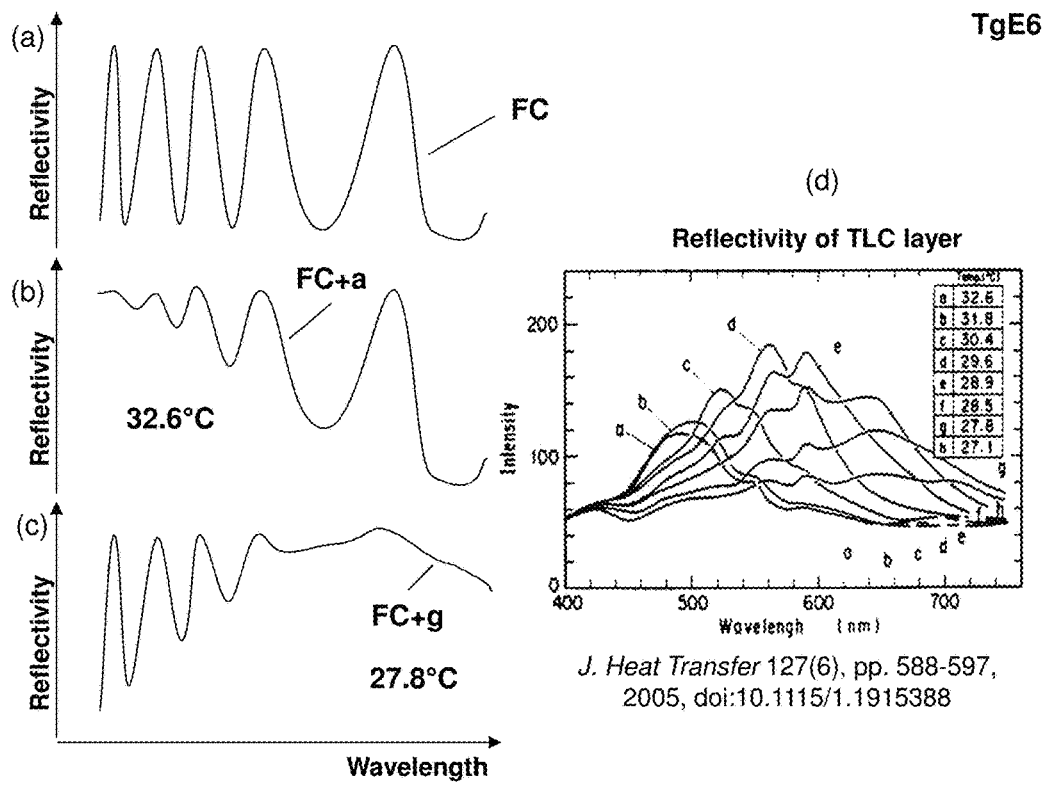
FIG. 30 shows the expected performance of the embodiment TgE6 of FIG. 29, wherein the unperturbed spectral signature (a) undergoes a change commensurate with a change in temperature. The predicted spectral signatures at two different temperatures are illustrated in (b,c). The temperature-dependent spectra of the TLC sensing layer appear in (d).

The expected spectral signatures at different temperatures are illustrated in FIG. 30(a,b,c) and are essentially a convolution between the frequency comb FC of photonic taggant PT and temperature-dependent TLC spectra of FIG. 30(d). With no TLC layer, or where the temperature is either too high or too low and the TLC layer is transparent, an unperturbed FC spectrum can be observed as in FIG. 30(a). At a high temperature, e.g., 32.6° C. in the example of FIG. 30(b), the TLC layer will reflect light according to curve a of FIG. 30(d), which will override and distort the short-wavelength components of the FC pattern. At a low temperature, e.g., 27.8° C. in the example of FIG. 30(c), the TLC layer will reflect light according to curve g of FIG. 30(d), which will override and distort the long-wavelength components of the FC pattern. In this way, the actual temperature on the tagged object can be inferred from the tag's spectral signature. Here, the color change need not lie in the visible range but can also take place in the near-infrared region, as it is analyzed by a spectral camera rather than the human eye.

The disclosed temperature sensor design of TgE6 typically provides one or more of the following advantages:

The use of TLC offers high thermal resolution below 0.5° C.

The retro-reflecting tag construction provides gonio-independent spectral response.

The high spectral modulation afforded by an FC spectral signature allows easy identification and tracking of the sensor tag against most background materials.

Different frequency combs FC with different teeth spacing can be provided according to Eq.1 for TLC compositions with different temperature ranges. By adopting a coding convention, the FC pattern can carry the tag identity and type (e.g., "temperature tag for the 25°-35°

C. range"), whilst its specific distortion by the TLC layer can quantify the temperature itself.

In some applications, a broader temperature range spanning tens of degrees may be required. To address this requirement, most tagging embodiments of the Invention, or their combination, can also be configured to provide stand-off thermal characterization of a tagged object or subject. Using the example of embodiments TgE1, TgE2, and TgE3 where a thin-film, flake or multilayer photonic structures are preferentially used, if the optical thickness D=nd of the structure possesses a temperature dependence due to either a variation of refractive index n with temperature or thermal expansion of the structure's materials (especially epoxies and polymers), a remote temperature measurement or thermal profiling on a tagged object can be performed by the analysis of the spectral signature drift, on similar principles to Fabry-Perot fiber sensor technology as elaborated in [17].

Based on the Fabry-Perot optical thickness definition of Eq.1, the differential fringe order arising from thermal expansion is given by $\Delta M \approx M \times n \times CTE \times \Delta t$, where CTE is the coefficient of thermal expansion and $\Delta t$ is the temperature difference. By selecting a polymer with a high CTE, e.g., polypropylene (aka PP) or ethylene-vinyl acetate (aka EVA or PEVA) that exhibit CTE of up to $200 \times 10^{-6}$ m/(mK) with n~1.5, one can obtain a half-period spectral shift in a Fabry-Perot tag from M=100 to M=100.5 for a temperature difference of 17° C., which would result in a reversal of the tag visibility when imaged through complementary spectral filters according to Eq.2 for similar M'~100. Therefore, the observed spectral shift of a structural-color tag containing a high-CTE photonic structure can be employed for stand-off thermal characterization of tagged objects using imaging embodiments ImE1 and, especially, ImE2.

Beside temperature, other sensing functionalities can be implemented by functionalizing the disclosed tagging embodiments to respond to parameters of interest.

Like the thermal expansion discussed above, mechanical stress, deformation or strain can also induce a change in the Fabry-Perot optical thickness with a resulting spectral shift that can be used to quantify its magnitude. Stretch-thinned polymeric films are highly elastic and routinely manufactured with accurate thickness control. For use as a strain gauge for measuring uniaxial tensile strain, the thickness of a thin-film, flake or multilayer structural-color taggant will decrease commensurate with the film elongation. For an engineering strain of 1% and an optical thickness of M~100 in Eq.1, one can expect a spectral shift to M~99 in the spectral signature, which provides a method of remote strain or deformation measurement using photonic-engineered tags.

To provide further enablement of the sensing capabilities provided by the Invention, an additional tagging embodiment TgE7 is disclosed herein that allows sensing of different parameters of interest. Like embodiment TgE6 described above in FIG. 29 and FIG. 30, it is based on a retro-reflecting tagging design incorporating a sensing layer SL that changes its optical properties in response to a parameter of interest and can be implemented using different materials exhibiting such sensitivity. Advantageously, by disposing sensing layer SL on top of the other tag components, immediate contact with an environmental parameter of interest, such as moisture, chemical agent, or gas, is provided, allowing the tag to quickly respond to said parameter.

Figure 31:
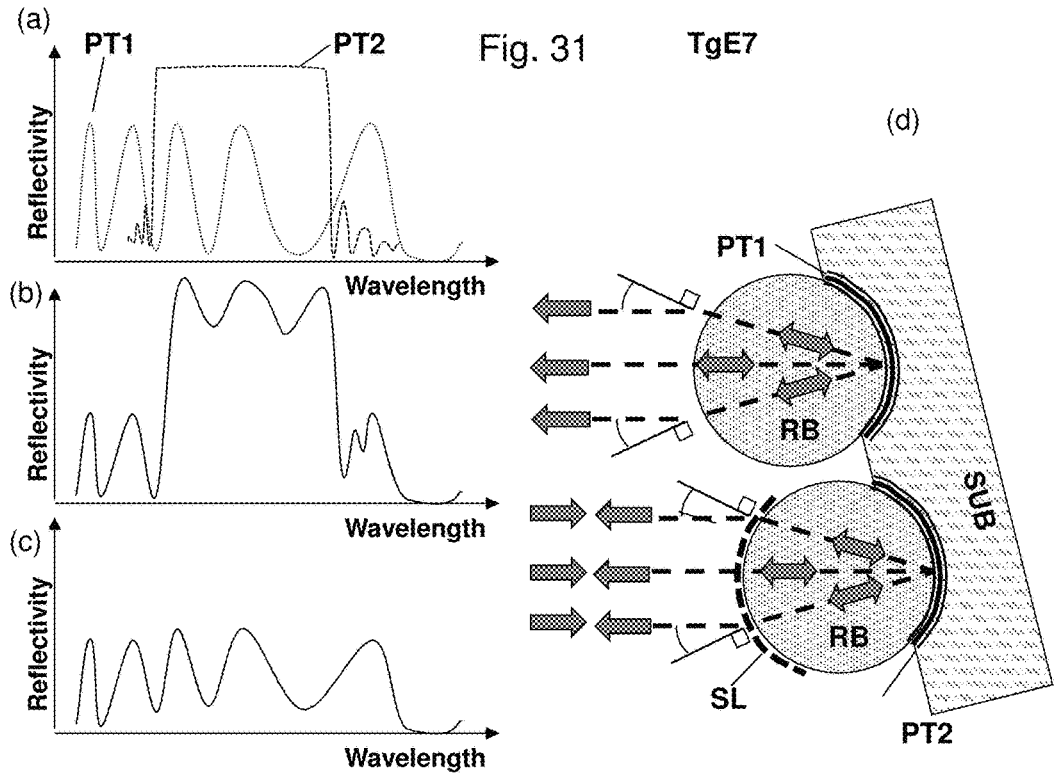
FIG. 31 discloses a further sensor design as tagging embodiment TgE7 in a tagging aspect of the Invention. In a cross-sectional view (d), photonic taggants PT1 and PT2 are deposited over the front surface of retroreflecting glass beads RB attached to substrate SUB. Sensing layer SL is provided over photonic taggant PT2. The spectral signatures are illustrated in (a,b,c).

Tagging embodiment TgE7 is exemplified here as a passive, wireless, optical humidity sensor. The tag configuration is preferably that of FIG. 31, which shares a similar design and operating principle with embodiment TgE2, which was explained earlier in reference to FIG. 23 and FIG. 24. However, shown in FIG. 31(d) are two different photonic taggants PT1 and PT2, the latter bearing an additional sensing layer SL which imparts moisture sensitivity to the tag's spectral signature. The tag is constructed from a large plurality of retro-reflective beads RB containing a portion of those coated with PT1 and those coated with PT2 and SL.

Established technologies can be employed for the manufacturing of such tags. For example, the following process steps can be used:
1. Prepare substrate SUB with a suitable surface profile to accept retro-reflective beads RB;
2. Deposit a coating on SUB to define photonic taggant PT1;
3. Apply a mask (e.g., a stencil or photoresist) over substrate SUB to protect a first area;
4. Optionally, etch away photonic taggant PT1 in a second, exposed area;
5. Deposit a coating on SUB to define photonic taggant PT2 in the second, exposed area;
6. Remove the mask;
7. Apply and embed the beads in substrate SUB;
8. Apply the mask;
9. Deposit sensing layer SL in the second, exposed area;
10. Remove the mask.

In this example, sensing layer SL preferentially comprises a molecular sieve or another porous material that exhibits adsorption for gases or liquids. Examples include many materials used as desiccants such as silica gel, magnesium sulfate, aluminum oxide, calcium oxide, silicon oxide, natural and synthetic zeolite, cobalt chloride, and barium oxide. It may be of benefit to have such a material dispersed in a resin, including thermoplastic resin. Other hydrophilic materials such as dichromated gelatin can be used.

Adsorption of gases or liquids changes the optical properties of sensing layer SL. Such changes may include the transition from an opaque to transparent state across a broad wavelength range. In U.S. Pat. No. 7,743,642, a resin layer containing 5 to 80 Wt % zeolite is used to reveal a character, shape, picture or the like when the resin layer becomes transparent by moisture absorption.

Exemplary spectral signatures associated with photonic taggants PT1 and PT2 are plotted in FIG. 31(a). It is preferable to for the two spectral signatures to be of different shape or spectral modulation period, and at least one of them to be of a frequency comb FC type, which could be achieved using the layer structures of FIG. 20(b) and FIG. 20(e), for example. In a state where sensing layer SL is substantially transparent and the spectral signature of photonic taggant PT2 is unperturbed, the combined spectral response will be a superposition of the PT1 and PT2 spectra as shown in FIG. 31(b). The relative intensity of the PT1 and PT2 spectral components in the combined spectral signature can be controlled by the relative concentration or quantity of the respective beads in the tag. In a state where sensing layer SL is substantially opaque and the spectral signature of photonic taggant PT2 is suppressed, the combined spectral response will be predominantly that of PT1 as shown in FIG. 31(c).

The spectral characterization of the tag response as a grade between the patterns of FIGS. 31(b) and (c) can reveal the degree of the SL transparency and correlated with the relative humidity in the atmosphere. Other adsorbed agents can be sensed by similarity, e.g., liquids, gases, dangerous substrates, etc.

The disclosed sensor design of TgE7 is advantageous for several reasons:

The retro-reflecting tag construction provides gonio-independent spectral response.

The high spectral modulation afforded by an FC spectral signature allows easy identification and tracking of the sensor tag against most background materials.

Different frequency combs FC with different teeth spacing can be provided according to Eq.1 for SL types with different sensitivities or adsorption of different substances, e.g., liquids or gases. By adopting a coding convention, the FC pattern can carry the tag identity and type (e.g., "humidity tag for the 30%-70% RH range"), whilst its specific distortion by the SL layer can quantify the humidity level itself.

It should be noted that exposure to environmental parameters, such as moisture penetration, can be used as a measure of the elapsed time, or tag lifetime, from the beginning of such exposure. If the rate of moisture penetration is known, e.g., in the tag design of TgE6 where a moisture-sensing layer SL is encapsulated within the tag structure, then the spectral changes can be correlated with time, thereby converting the tags into passive, wireless optical clocks or timers. The tag lifetime can also be limited to a specific period, e.g., several days or hours, which may be desirable in time-specific applications such as event admission passes or airport baggage tags. Further uses can be envisaged in expiry date control, storage condition indicators, etc. on food or pharmaceutical items.

The foregoing tagging embodiments TgE1-TgE7 of the Invention are based on light interference within two-dimensional or layered photonic structures, which are used to define spectral signatures by appropriate layer thicknesses. In a case where multiple periodic layers are stacked, photonic bandgaps can be created with unique spectral features. The extension of photonic bandgap engineering to a three-dimensional case is disclosed herein by tagging embodiment TgE8, which covers ordered 3D metamaterials with periodicity on the wavelength scale. Such structures are known as photonic crystals (PhC) and can comprise a variety of materials, including liquid crystals, chiral phase crystals, synthetic opal, inverted/inverse opal, monodisperse spherical particles, silica spheres or beads, latex spheres or beads, colloid crystals, silk particles or silk fibroin, cholesteric polymers or crystals, porous silicon, porous silica, porous glass, and others. Spectral signatures can be encoded in PhC structures by defining their feature size, periodicity, or fill factor, e.g., of nanohole arrays [18]. Multi-bit data encoding in porous silicon by changing its porosity through electrochemical etching is taught in [19].

Figure 32:
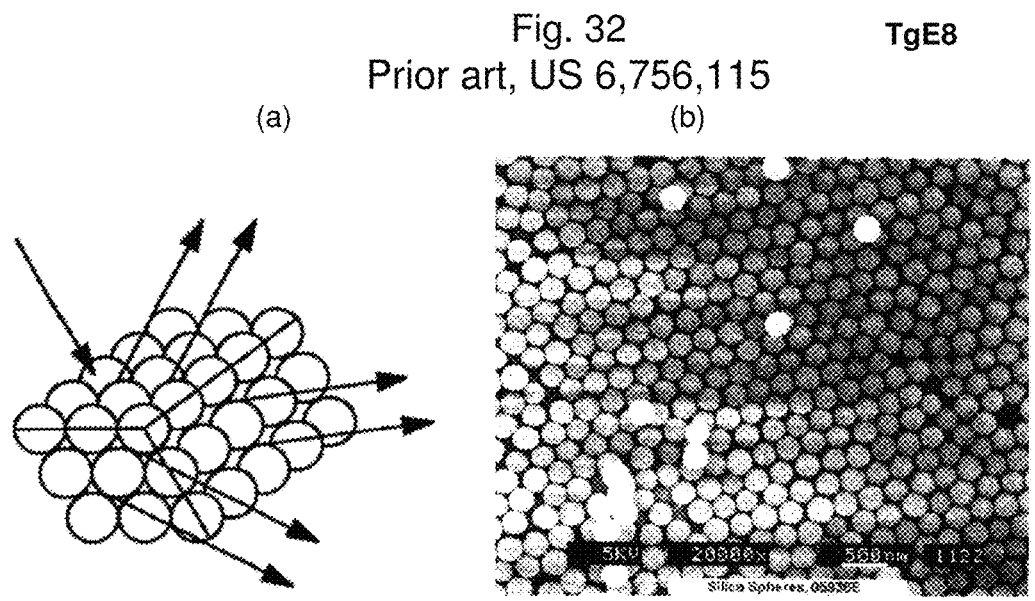
FIG. 32 is an illustration of the prior art showing a photonic crystal based on a siliceous color pigment (according to U.S. Pat. No. 6,756,115), which can be used as a photonic taggant (embodiment TgE8) in a tagging aspect of the Invention. (a) schematically presents a sphere-based 3-D structure and its possible interaction with light, while (b) is an electron micrograph of silica sphere crystals.

In U.S. Pat. No. 6,756,115, solid colloidal crystals of monodispersed spheres are produced and engineered to provide an opalescent effect by the wavelength-selective interaction of light with the PhC matrix as illustrated in FIG. 32(a). Using the same method, structural-color taggants according to embodiment TgE8 can define PhC matrices similar to FIG. 32(b) with larger sphere diameters. Such modification is non-obvious for conventional uses of the visual effect PhC technology, as it would remove the aesthetic opalescent effect while generating a complex spectral signature.

Figure 33:
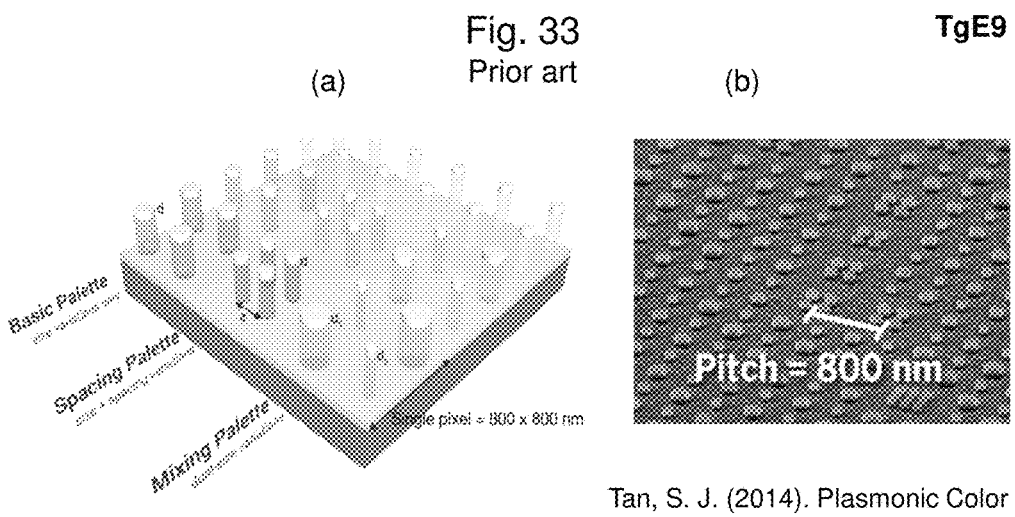
FIG. 33 is an illustration of the prior art showing a metamaterial with a pattern of plasmonic pillar nanostructures [4] for defining structural color, which can be adapted for use as a photonic taggant in embodiment TgE9, in a tagging aspect of the Invention. The method to define a spectral signature of the metamaterial by changing the pillar size, spacing and pattern is illustrated in (a), while (b) shows an electron micrograph of a fabricated aluminum plasmonic structure.

Structural-color tags according to the foregoing embodiments rely on the phenomena of light interference and diffraction (TgE1-TgE8) within a photonic-engineered taggant. It is an object of tagging embodiment TgE9 disclosed herein to provide a metamaterial taggant employing a different physical phenomenon, namely, surface plasmonics. In the context of embodiment TgE9, the terms "taggant and "tag" may be synonymous and refer to a plasmonic metamaterial. Plasmonic effects such as the localized plasmon resonance arise from the interaction between electromagnetic field and free electrons in a metal. Free electrons in a metal can be excited by the electric component of light to have collective oscillations, which can exhibit strong dependence on the frequency (or wavelength) of incident light and surface structure. The spectral properties, or structural color, of a metallic surface can be defined by means of purpose-engineered patterns of nanosized features defined on that surface, e.g., plasmonic pillar nanostructures as illustrated in FIG. 33. In Ref. [4], there is disclosed a method of designing nanoplasmonic features and their arrays to create structural colors in the visible range, which is demonstrated by a pigment-free reproduction of a color image. Nanoplasmonic patterns such as shown in FIG. 33(a) can be designed using the disclosed color generation strategies, with a color gamut covering up to 300 colors. The nanoplasmonic patterns are realized as nanodisks in aluminum or another suitable metal as shown in the photograph of FIG. 33(b). Other technological implementations of plasmonic surface structures have been reported in [20] and [21]. A polymer film coated with silver nanodisks has been reported by FujiFilm, Inc., for applications in solar heat insulation. Various nanostructure feature shapes and types can be employed, including metallic nanocavities, nanodisks, nanopillars, nanoholes, nanogrooves, and nanogratings. Fabrication techniques such as nanoimprint and interference lithography can provide low-cost manufacturing solutions for nanoscale-size PhC and plasmonic structures as reported in [22] and [23].

For the definition of structural-color taggants and tags according to embodiment TgE9, the structural color definition methods need to be adapted from single-peak spectra in the visible towards complex spectral signatures beyond the visible range. This can be achieved by an appropriate design of the nanocavities formed by the nanosized features to support desired oscillation modes, which requires solutions to electromagnetic equations as known in the art. For example, in Ref. [23], computer simulation of the designed structures is performed using a finite difference time domain (FDTD) method to compute the electric field distribution and a rigorous coupled wave analysis is used to calculate the angle-resolved reflection and absorption spectra. The computation-intensive design and simulation to define desired spectral signatures, combined with the high technological requirements for the fabrication of nanoplasmonic patterns, render the taggants and tags of embodiment TgE9 tamper-proof and highly suitable for security and authentication applications.

Various types of metamaterials such as nanostructures and photonic crystals can be employed to engineer specific spectral properties as reviewed in [24]. Several photonic effects such as multilayer interference, light scattering, photonic crystal effects, and combinations thereof, can be employed to create structural coloration according to [25]. High-contrast photonic metastructures can be defined on flexible polymer substrates and the resulting structural colors tuned by stretching, structuring or deforming the supporting substrate as reported in [7]. These emerging technologies are suitable for use with structural-color tags and allow multiple ways of engineering optically encoded metamaterials using the techniques covered by any suitable combination of tagging embodiments of the Invention. All these embodiments share a common method to alter a structural parameter of a metamaterial taggant or tag to define its spectral signature, e.g., period of a grating or photonic crystal, fill factor, size or spacing of layers or nanofeatures, and thickness of thin film or flakes or platelets.

Surface relief features, such as planar diffraction gratings and holograms, can also be used to define spectral signatures by the spatial frequency of their constituent elements.

The embodiments disclosed above can be realized several different materials, including polymer thin-film layers, metal-dielectric layers, liquid crystals, thermochromic liquid crystals, chiral phase crystals, synthetic opal, inverted/inverse opal, monodisperse spherical particles, molecular sieves, silica gel, sol-gel, silica spheres or beads, latex spheres or beads, colloid crystals, silk particles or silk fibroin, cholesteric polymers or crystals, porous silicon, porous silica, porous glass, plasmonic nanostructures, carbon nanostructures, metallic nanocavities, aluminum nanopillars, nanopillar arrays, nanoholes, nanohole arrays, nanodiscs, nanodisc arrays, nanogrooves, nanograting arrays, high-contrast metastructures.

To summarize, several tagging aspects of the Invention can be used individually or collectively to provide optical encoding based on various photonic phenomena. Such optical encoding can then be interpreted by an imaging aspect of the Invention to provide not just the identity of a tagged object or subject but also a remote measurement of its property, e.g., orientation, strain and deformation, gas or chemical agent concentration, and temperature.

APPLICATIONS, RAMIFICATIONS, AND SCOPE

Accordingly the reader will see that, according to the invention, a system capable of remote identification and characterization of physical entities (objects and subjects) based on structural-color tags, markers or labels has been adequately disclosed. Its design and operation principles have been explained in detail, with several embodiments provided for its imaging, tagging and processing aspects to teach a person skilled in the art to practise the Invention in many different applications. While the above description contains many specificities, these should not be construed as limitations on the scope of the invention, but as exemplifications of the presently preferred embodiments thereof. Many other ramifications and variations are possible within the teachings of the Invention to provide its best modes for specific applications as outlined in Table 1 presented earlier.

Figure 34:
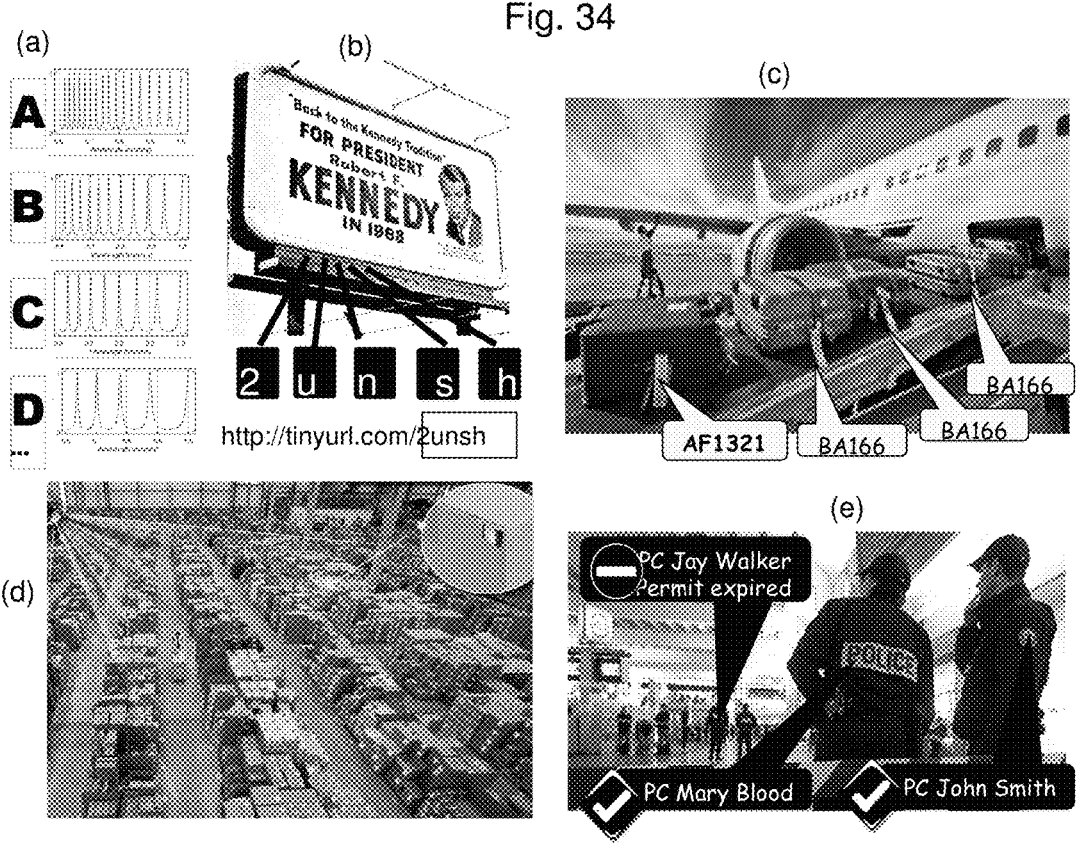
FIG. 34 provides examples of the possible uses of structural-color tags as information carriers. (a) illustrates a spectral character coding scheme. In (b), the tags contain a website address pointing to additional information about the advertisement.

In FIG. 34, examples of the possible uses of structural-color tags as information carriers are provided. Spectral signatures can be assigned to alphanumeric characters and associated with a known coding scheme or lookup table, such as the ASCII or Unicode tables. Various coding schemes could be employed. In the example of FIG. 34(a), which is based on embodiment ImE2, a Fabry-Perot spectral optical coding scheme could be associated with tags of different optical thicknesses defined by parameter M in Eq.1, with every alphanumeric character assigned to a unique M value. Given the fact that fractional M values can be used, an estimated several thousand characters are encodable. Some of the information carried by the one or more tags can be used for error correction, e.g., one of the tags can contain a checksum.

The encodable "characters" need not be alphanumeric but can encompass any codes, indices, symbols, or numerals. One or more tags can also convey an identifier, name, index, reference, code, character, symbol, message, label, command, instruction, sequence, pointer, URL, link, address, barcode, number, quantity, property, condition, brightness, position, coordinates, size, dimensions, angle, orientation, rotation, shape, surface profile, depth, distance, displacement, movement, tracking, direction, speed, temperature, humidity, strain, stress, deformation, time, weight, gas presence or concentration, chemical agent presence or concentration. E.g., a tag on a packaging may indicate the item's weight or grasp location for a robot.

In FIG. 34(b), the tags in the billboard are decoded to form a website address pointing to additional information about the advertisement. In FIG. 34(c), the baggage labels contain structural-color tags associated with flight numbers allowing automatic tracking and verification of baggage prior to loading onto the aircraft, with several baggage items decodable in a common field of view.

In FIG. 34(d), an illustration of a possible deployment of the Invention in a warehouse or distribution center is provided. Here, each item, box or parcel bears a unique spectral tag ID according to a tagging aspect of the Invention, and is remotely scanned according to an imaging aspect of the Invention. The items can be at arbitrary distances from the spectral camera, with substantially focus-free operation only requiring a single pixel for identification. This capability is highly advantageous over incumbent barcode scanners that require a sharp image of a barcode in sufficient spatial resolution. In FIG. 34(e), a possible personnel security application is illustrated, where structural-color tags are integrated in clothing or uniform, allowing the personnel to be identified in real time and at variable distance. By virtue of the nanoscale-sized features they contain, the tags are difficult to replicate or copy, which provides a high level of security.

Figure 35:
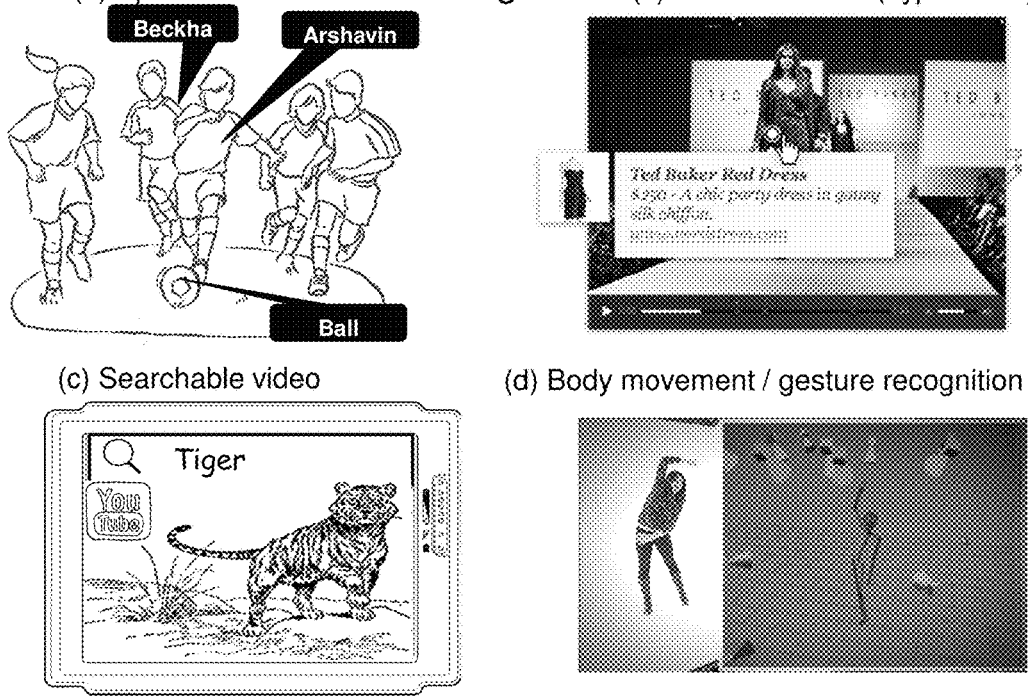
FIG. 35 further illustrates the application scenarios made possible by recording images and videos with optically tagged subjects and objects according to an implementation of the Invention. In (a), player names are automatically identified and displayed in a football broadcast; in (b), a tag-enriched video ("hypervideo") is rendered in a suitable video player to allow object and subject information to be displayed by touching or clicking; in (c), the video stream contains object data captured at the time of filming using tagged objects and subjects allowing the video content to be searched for scenes of interest (e.g., frames relating to a tiger); in (d), structural-color tags on the body of a person provide tracking of body movement, gait analysis, and gesture recognition.

In the examples of FIG. 34, entity identification and characterization can be performed automatically based on the structural-color tags alone without providing a visual image or video output perceptible by human beings. However, the addition of such an image or video output can benefit many applications where a visual interface with humans is required. FIG. 35 illustrates the application scenarios made possible by recording videos with optically tagged subjects and objects, with a spectral camera performing object identification and tracking, and a visible light camera providing viewable video content as per imaging embodiment ImE6 disclosed earlier. In FIG. 35(a), player names are automatically identified and displayed in a football broadcast; in (b), a tag-enriched video ("hypervideo") is rendered in a suitable video player to allow object and subject information to be displayed by touching or clicking (e.g., a user can obtain more details about the dress being advertised); in (c), the video stream contains object data captured at the time of filming using tagged objects and subjects allowing the video content to be searched for scenes of interest (e.g., frames relating to a tiger); in (d), structural-color tags on the body of a person provide tracking of body movement, gait analysis, and gesture recognition. More application examples can be envisaged, e.g., real-time tracking and verification of surgical procedures in operating rooms where surgical instruments and operating staff alike are tagged with structural-color tags and observed by spectral cameras.

Figure 36:
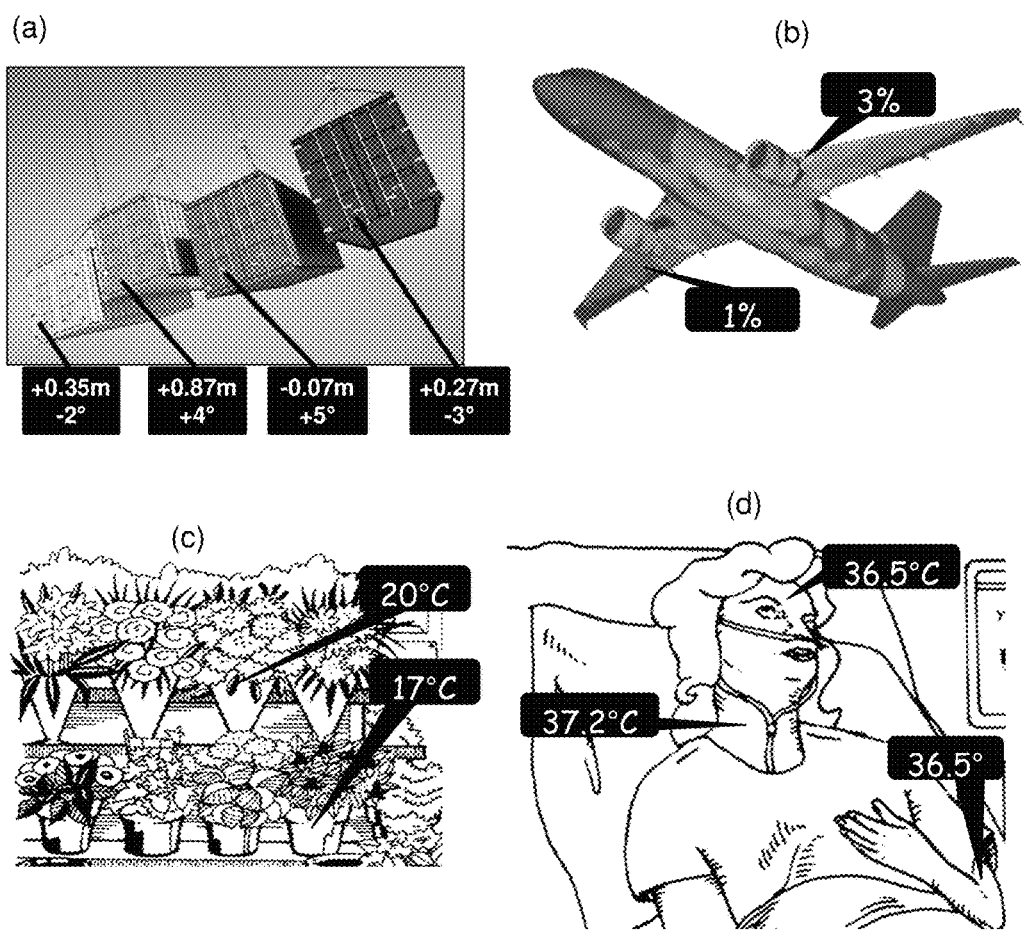
FIG. 36 illustrates possible deployment scenarios of the Invention in wireless sensing and measurement applications: (a) angle and coordinate measurement of tagged containers; (b) strain measurement on an airframe with distributed strain tags; (c) temperature monitoring on tagged flower pots; (d) contactless temperature measurement at specific locations on a patient.

Besides the remote identification examples presented above, there is a host of remote, wireless characterization and sensing applications that can be enabled by parameter-dependent spectral signatures disclosed in the tagging aspect of the Invention. In FIG. 36(a), rotation-sensitive structural-color tags provide remote alignment, orientation and position monitoring for heavy loads, construction parts, containers, etc. Further angle-sensing application examples were provided in FIG. 16 and in FIG. 17. The aerospace application of FIG. 36(b) demonstrates use of the remote strain and deformation gauging capability, with structural-color tags applied onto the airframe. The examples of FIGS. 36(c) and (d) both show the remote temperature sensing and monitoring capability in perishable item storage and medical scenarios, respectively. Many more examples of the applicability of the Invention in various markets and sectors could be provided.

It should be noted that structural-color tags can be provided in a variety of formats to suit application requirements. Since structural-color tags are passive and require no wiring or power supply, they can be single or multiple use and worn on the person as a badge, mark, sign, identifier, decoration, ornament, embellishment, applique, decal, laminate, jewelry, ear-ring, garment, chevron, watch, strap, tag, ribbon, lace, cap, T-shirt, insignia, emblem, vest. Tags can also take the form of objects such as a bookmark, vehicle license plate, traffic sign, road marking, traffic cone sleeve, warning sign, information sign or board, advertising sign or board. Structural-color tags can be applied as paint, paint, dye, pigment, glitter, ink, topcoat, basecoat, epoxy, nail polish, adhesive tape, sticker, applicator, spray, etc.

The non-obvious combination and adaptation of elements from several diverse technical disciplines, such as imaging, computer vision, photonic engineering, materials science, chemistry, and information encoding and processing, endows the Invention with unique capabilities not achievable in the art, as exemplified above. Thus, the scope of the invention should be determined by the appended claims and their legal equivalents, and not by the examples given.

NON-PATENT BIBLIOGRAPHY

[1] Yin, "Iridescence in the neck feathers of domestic pigeons," *Phys. Rev.*, vol. E 74, p. 051916, 2006.

[2] Aly, "Comparative Study of the One Dimensional Dielectric and Metallic Photonic Crystal," *Optics and Photonics Journal*, vol. 2, pp. 105-112, 2012.

[3] V. E. Johansen, L. H. Thamdrup, K. Smistrup, T. Nielsen, O. Sigmund and P. Vukusic, "Designing visual appearance using a structured surface," *Optica*, p. pp. 239-245, Vol. 2, Iss. 3 2015.

[4] Tan and J. Shawn, "Plasmonic Color Palettes for Photorealistic Printing with Aluminum Nanostructures," *Nano Letters*, vol. 14, no. 7, p. 4023-4029, 2014.

[5] I. Woo, "Plasmonic Structural-Color Thin Film With a Wide Reception Angle and Strong Retro-Reflectivity," *IEEE Photonics Journal*, pp. 2183-2188, 2012.

[6] S. Y. Lee, "Plasmon-enhanced structural coloration of metal films with isotropic Pinwheel nanoparticle arrays," *Optics Express*, vol. 19, no. 24, pp. 23818-23830, 2011.

[7] L. Zhu, J. Kapraun, J. Ferrara and J. Chang-Hasnain, "Flexible photonic metastructures for tunable coloration," *Optica, Vol.* 2, *Issue* 3, pp. 255-258, 2015.

[8] J. M. Green, "The 'walk-off' effect in Fabry-Perot etalons-limitations to 'single-shot' linewidth measurements at longer wavelengths," *Journal of Physics E: Scientific Instruments*, pp. 1302-1304, Vol. 13, No. 12, 1980.

[9] H. Muller and e. al, "Multimirror Fabry-Perot interferometers," *J. Opt. Soc. Am. A*, pp. 1363-1370, Vol. 2, No. 8 1985.

[10] J. Dobrowolski, "Handbook of Optics: Volume IV—Optical Properties of Materials, OPTICAL PROPERTIES OF FILMS AND COATINGS, Chapter," in *Handbook of Optics: Volume IV-Optical Properties of Materials, Nonlinear Optics, Quantum Optics, Third Edition*, McGraw-Hill Professional, AccessEngineering, 2010, pp. 42.1-42.130.

[11] E. Pelletier and H. A. Macleod, "Interference filters with multiple peaks," *J. Opt. Soc. Am.*, pp. 683-687, Vol. 72, No. 6 1982.

[12] G. Pfaff, "Special Effect Pigments," in *High Performance Pigments*, Wiley-VCH, 2002, pp. 77-102.

[13] G. A. Klein, Industrial Color Physics, ISBN: 10.1007/978-1-4419-1197-1: Springer-Verlag New York, 2010.

[14] R. B. Johnson and G. A. Jacobsen, "Advances in lenticular lens arrays for visual display," *Proceedings of SPIE, Vol.* 5874, *Paper* 5874-06, 2005.

[15] J. E. Vandegaer, Microencapsulation; Process and Applicationon, Plenum Press, 1974.

[16] M. R. Anderson and J. W. Baughn, "Thermochromic Liquid Crystal Thermography: Illumination Spectral Effects. Part 2," *J. Heat Transfer*, vol. 127(6), no. doi: 10.1115/1.1915388, pp. 588-597, 2005.

[17] B. Yu, A. Wang and G. Pickrell, "Analysis of fiber fabry-Perot interferometric sensors using low-coherence light sources," *IEEE J. Lightwave Technology, vol.* 24, *no.* 4, pp. 1758-1767, 2006.

[18] B. Wang and e. al, "Spectrally encoded photonic crystal nanocavities by independent lithographic mode tuning," *J. Opt. Soc. Am. B*, pp. 721-726, Vol. 28, No. 4 2011.

[19] J. Park and e. al., "Multiple Bit Encodings of Multilayer Porous Silicon," *JOURNAL OF THE KOREAN PHYSICAL SOCIETY, v.* 50, *No.* 3, pp. 695-699, 2007.

[20] I. Woo, S. Yu, J. S. Lee and J. H. Shin, "Plasmonic Structural-Color Thin Film With a Wide Reception Angle and Strong Retro-Reflectivity," *IEEE Photonics Journal*, pp. 2182-2188, Vol. 4, No. 6, 2012.

[21] J. Amanda, Haes and e. al, "Plasmonic Materials for Surface-Enhanced Sensing and Spectrosopy," *MRS Bulletin*, pp. 368-375, Vol. 30 2005.

[22] K. Kumar, "Printing colour at the optical diffraction limit," *Nature Nanotechnology*, 12 Aug. 2012.

[23] Y.-K. R. Wu, "Angle-Insensitive Structural Colours based on Metallic Nanocavities and Coloured Pixels beyond the Diffraction Limit," *Nature Scientific Reports*, p. 3:1194, 1 Feb. 2013.

[24] Y. Yu, "Transmissive/Reflective Structural Color Filters: Theory & Applications," *Journal of Nanomaterials*, p. Article ID 212637, 2014.

[25] T. Xu, H. Shi, Y. Wu, A. Kaplan, J. Ok and L. Guo, "Structural colors: from plasmonic to carbon nanostructures," *Small*, pp. 3128-36, 18 Nov. 2011.

[26] M. R. Ackermann, "A brief examination of optical tagging technologies," Sandia National Laboratories, Albuquerque, N. Mex., 2003.

[27] L. Zhang, N. Subramaniam, S. K. N. R. Lin and a. R. Raskar, "Capturing Images with Sparse Informational Pixels using Projected 3D Tags," *Proceedings of IEEE Virtual Reality*, 2008.

The invention claimed is:

1. A system comprising:
(a) a plurality of structural-color tags, generating a distinct spectral response in a specified spectral range, said distinct spectral response including at least one characteristic spectral feature including at least one transition between a high-intensity level and a low-intensity level, said intensity levels differing by 20% or more and said transition occurring over a spectral bandwidth of 1000 inverse centimeters or less;
(b) a spectral imaging system for capturing a dataset of at least 5 spectrally-filtered digital images of a field of view; and
(c) a processing system comprising at least one processor, said processing system being configured to process the dataset of spectrally-filtered digital images from said spectral imaging system so as to:
(i) identify spatial pixels of said dataset having said characteristic spectral feature in said specified spectral range as spatial pixels corresponding to one of said tags; and
(ii) process spectral data from said dataset for said tag to derive information relating to said tag.

2. The system of claim 1, wherein said processing system is configured to perform said identifying and said processing for each of a plurality of said tags present within a field of view in the dataset of spectrally-filtered digital images.

3. The system of claim 1, wherein said spectral imaging system is a hyperspectral imaging system, and said dataset of spectrally-filtered digital images forms a hyperspectral image cube.

4. The system of claim 1, wherein said plurality of structural-color tags comprises at least 10 structural-color tags, each of said tags having a spectral response distinct from all others of said tags, and wherein said processing system is configured to identify from said spectral data each of said tags that is visible within the field of view.

5. The system of claim 1, wherein said spectral imaging system includes a first filter configuration providing one or more spectral transmission maxima and one or more spectral transmission minima, and a second filter configuration providing one or more spectral transmission maxima and one or more spectral transmission minima, so that the one or more of transmission maxima of said first filter configuration match the one or more transmission minima of said second filter configuration within a specified spectral range.

6. The system of claim 1, which further includes an active illuminator that emits, or is filtered to emit, at wavelengths that at least partly correspond to said at least one characteristic spectral feature.

7. The system of claim 1, wherein said processing system is further configured to actuate at least one action as a function of said information relating to said tag, the at least one action being selected from the group consisting of range-finding, focus adjustment, exposure adjustment, camera rotation, object tracking, image recording, illumination, flash activation; data transmission.

8. The system of claim 1, which further includes a visible-spectrum camera positioned close to, or integrated with said spectral imaging system, so that at least part of the field of view is shared between said visible-spectrum camera and said spectral imaging system.

9. A method for detection of, and obtaining information from, a plurality of structural-color tags comprising the steps of:
(a) employing a spectral imaging system to capture a dataset of at least 5 spectrally-filtered digital images of a field of view;
(b) processing said dataset of spectrally-filtered digital images to identify spatial pixels having characteristic spectral features including at least one transition between a high-intensity level and a low-intensity level, said intensity levels differing by 20% or more and said transition occurring over a spectral bandwidth of 1000 inverse centimeters or less in a specified spectral range as spatial pixels corresponding to a structural-color tag; and
(c) for each detected tag, process spectral data for the corresponding pixels to derive information relating to the tag.

10. The method of claim 9, wherein said dataset of spectrally-filtered digital images is captured by:
(a) capturing a first dataset of spectrally-filtered digital images under active illumination conditions;
(b) capturing a second dataset of spectrally-filtered digital images without active illumination; and
(c) subtracting at least part of said second dataset of spectrally-filtered digital images from at least part of said first dataset of spectrally-filtered digital images.

11. The method of claim 9; wherein at least part of said field of view covers a range greater than three meters from said spectral imaging system.

12. The method of claim 9, wherein said spatial pixels having characteristic spectral features are identified by subtraction of, and/or differentiation between, any two or more images, or portions thereof, within said dataset of spectrally-filtered digital images.

13. The method of claim 9, wherein the information derived from a tag includes either an identity or property, or both, of said tag, and/or of the entity bearing said tag.

14. The method of claim 9, which further includes the steps of:
(a) employing an active illuminator co-located with said spectral imaging system for providing active illumination at wavelengths that at least partly correspond to at least one said characteristic spectral feature;
(b) adding a retro-reflecting element to said tags for redirecting active illumination from said tags towards said spectral imaging system.

15. The method of claim 9, which further includes the steps of:
(a) employing an active illuminator at a different location from said spectral imaging system for providing active illumination at wavelengths that at least partly correspond to at least one said characteristic spectral feature;
(b) deriving angular information relating to said tag, said information including at least one of orientation, angle, displacement, relief, topography, shape, profile, structure, depth of said tag or underlying surface.

16. The method of claim 9, wherein a tag forms a parameter sensor and the information derived from a tag includes a measurement of said parameter.

17. A structural-color tag having a lateral dimension greater than five millimeters and comprising at least one photonic structure selected from the group consisting of interferometric, multilayer, thin-film, quarter-wavelength, Bragg; grating, Fabry-Perot, plasmonic, photonic crystal, structural filter, color-shifting, optically-variable structures, said photonic structure having a distinct spectral response in a specified spectral range, said distinct spectral response associated with
(a) one or more optical phenomena from the group comprising interference, diffraction, refraction, iridescence, scattering, plasmonics; and
(b) at least one characteristic spectral feature, said feature including at least one transition between a high-intensity level and a low-intensity level, said intensity levels differing by 20% or more and said transition occurring over a spectral bandwidth of 1000 inverse centimeters or less.

18. A tag according to claim 17, wherein said at least one photonic structure is integrated as part of a medium selected from the group consisting of taggant, pigment, coating, paint, ink, film, sticker, tape, fabric.

19. A tag according to claim 17 comprising a quantity of material comprising a plurality of flakes distributed in a range of orientation, each of said flakes comprising a layered optical structure configured to generate a distinct spectral response in a specified spectral range.

20. A set of tags comprising a plurality of the tags of claim 17, wherein each of said tags has a spectral response distinct from all others of said tags.

21. A set of tags according to claim 20, wherein each of said tags differs from others of said tags in a value of at least one structural parameter selected from the group consisting of thickness, fill factor, period.

22. A tag according to claim 17 further comprising at least one optical element associated with said photonic structure and configured to enhance a proportion of light incident on said photonic structure which is retro-reflected along a line of incidence of the light.

23. A tag according to claim 22, wherein said at least one optical element is selected from the group consisting of glass beads, corner-cube array, corner reflector, prismatic array, lenticular array, lenticular sheet, cylindrical lens array, fly-eye lens array, dot lens array.

24. A tag according to claim 22, wherein said at least one photonic structure is a layered structure and said at least one optical element is a lens, said layered structure disposed in the focal plane of said lens.

25. A tag according to claim 22, whose distinct spectral response remains substantially invariant with the illumination and observation angle within an angular range of ±10 degrees or greater about a direction normal to said tag.

26. A tag according to claim 22, wherein said tag forms an angle or orientation sensor and said at least one optical element is a retro-reflector, said at least one photonic structure being disposed on a surface of said retro-reflector.

27. A tag according to claim 22, further including a parameter-sensing material that changes its optical properties in response to changes in said parameter, said parameter selected from the group of temperature, humidity, strain, stress, deformation, time, gas presence or concentration, chemical agent presence or concentration.

28. A tag according to claim 22, wherein said tag forms a temperature sensor and further comprises thermochromic liquid crystals for rendering a spectral response indicative of temperature.

* * * * *